US008157639B2

(12) United States Patent
Oomori

(10) Patent No.: US 8,157,639 B2
(45) Date of Patent: Apr. 17, 2012

(54) GAMING MACHINE AND GAMING SYSTEM ACCUMULATING BETTED GAME MEDIA AND METHOD FOR CONTROLLING THE GAMING MACHINE

(75) Inventor: Tomoaki Oomori, Koto-ku (JP)

(73) Assignee: Universal Entertainment Corporation, Tokyo (JP)

( * ) Notice: Subject to any disclaimer, the term of this patent is extended or adjusted under 35 U.S.C. 154(b) by 425 days.

(21) Appl. No.: 12/479,526

(22) Filed: Jun. 5, 2009

(65) Prior Publication Data

US 2010/0120509 A1 May 13, 2010

Related U.S. Application Data

(60) Provisional application No. 61/077,797, filed on Jul. 2, 2008, provisional application No. 61/077,783, filed on Jul. 2, 2008, provisional application No. 61/076,438, filed on Jun. 27, 2008.

(51) Int. Cl.
*G06F 19/00* (2011.01)

(52) U.S. Cl. ........................................................ 463/20

(58) Field of Classification Search ............... 463/16–21
See application file for complete search history.

(56) References Cited

U.S. PATENT DOCUMENTS

2007/0202944 A1* 8/2007 Oomori ........................... 463/27
2008/0207298 A1* 8/2008 Marks et al. .................... 463/16

FOREIGN PATENT DOCUMENTS

WO WO 99/03078 1/1999

* cited by examiner

*Primary Examiner* — William D Coleman
*Assistant Examiner* — Daniel Shook
(74) *Attorney, Agent, or Firm* — Oblon, Spivak, McClelland, Maier & Neustadt, L.L.P.

(57) ABSTRACT

According to a gaming system of the present invention, the control device cumulatively counts a part of the number of game media betted in each of the slot machines, as a cumulative value, and transmits cumulative-value information based on the cumulative value obtained by the counting to the slot machines. The slot machine determines the number of special symbols that can be displayed to the symbol display, based on the received cumulative-value information.

12 Claims, 61 Drawing Sheets

FIG. 7

| Normal symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

FIG. 9

Cumulative value: 250 or less

| Number of special symbols | Probability |
|---|---|
| 3 | 36555/65536 |
| 4 | 18001/65536 |
| 5 | 10980/65536 |

Cumulative value: 251～500

| Number of special symbols | Probability |
|---|---|
| 4 | 36555/65536 |
| 5 | 18001/65536 |
| 6 | 10980/65536 |

Cumulative value: 501～1000

| Number of special symbols | Probability |
|---|---|
| 4 | 16555/65536 |
| 5 | 28001/65536 |
| 6 | 20980/65536 |

Cumulative value: 1001～1500

| Number of special symbols | Probability |
|---|---|
| 5 | 16555/65536 |
| 6 | 28001/65536 |
| 7 | 20980/65536 |

Cumulative value: 1501 or more

| Number of special symbols | Probability |
|---|---|
| 5 | 6555/65536 |
| 6 | 23001/65536 |
| 7 | 20980/65536 |
| 8 | 15000/65536 |

FIG. 11

| Special symbol | Number of rearranged symbols | | | |
|---|---|---|---|---|
| | 3 symbols | 4 symbols | 5 symbols | 6 or more symbols |
| HEART | 3 | 6 | 9 | m × (n−2) (※) |
| STAR | 5 | 10 | 15 | |
| SUN | 10 | 20 | 30 | |
| JEWEL | 15 | 30 | 45 | |
| SMILE | 30 | 60 | 90 | |

※"m" represents the amount of payout when 3 symbols are rearranged.
"n" represents the number of rearranged symbols.

FIG. 12

Cumulative value: 250 or less

| Number of special symbols | Probability |
|---|---|
| 8 | 36555/65536 |
| 9 | 18001/65536 |
| 10 | 10980/65536 |

Cumulative value: 251～500

| Number of special symbols | Probability |
|---|---|
| 9 | 36555/65536 |
| 10 | 18001/65536 |
| 11 | 10980/65536 |

Cumulative value: 501～1000

| Number of special symbols | Probability |
|---|---|
| 9 | 16555/65536 |
| 10 | 28001/65536 |
| 11 | 20980/65536 |

Cumulative value: 1001～1500

| Number of special symbols | Probability |
|---|---|
| 10 | 16555/65536 |
| 11 | 28001/65536 |
| 12 | 20980/65536 |

Cumulative value: 1501 or more

| Number of special symbols | Probability |
|---|---|
| 10 | 6555/65536 |
| 11 | 23001/65536 |
| 12 | 20980/65536 |
| 13 | 15000/65536 |

FIG. 14

| Special symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

FIG. 16

Cumulative value: 250 or less

| Specific number | Probability |
|---|---|
| 3 | 36555/65536 |
| 4 | 18001/65536 |
| 5 | 10980/65536 |

Cumulative value: 251～500

| Specific number | Probability |
|---|---|
| 4 | 36555/65536 |
| 5 | 18001/65536 |
| 6 | 10980/65536 |

Cumulative value: 501～1000

| Specific number | Probability |
|---|---|
| 4 | 16555/65536 |
| 5 | 28001/65536 |
| 6 | 20980/65536 |

Cumulative value: 1001～1500

| Specific number | Probability |
|---|---|
| 3 | 16555/65536 |
| 5 | 28001/65536 |
| 7 | 20980/65536 |

Cumulative value: 1501 or more

| Specific number | Probability |
|---|---|
| 3 | 6555/65536 |
| 5 | 23001/65536 |
| 6 | 20980/65536 |
| 7 | 15000/65536 |

FIG. 27

| Normal symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

FIG. 29

Cumulative value : 250 or less

| To-be increased number of special symbols | Probability |
|---|---|
| 1 | 36555/65536 |
| 2 | 18001/65536 |
| 3 | 10980/65536 |

Cumulative value : 251～500

| To-be increased number of special symbols | Probability |
|---|---|
| 1 | 36555/65536 |
| 3 | 18001/65536 |
| 4 | 10980/65536 |

Cumulative value : 501～1000

| To-be increased number of special symbols | Probability |
|---|---|
| 2 | 16555/65536 |
| 3 | 28001/65536 |
| 4 | 20980/65536 |

Cumulative value : 1001～1500

| To-be increased number of special symbols | Probability |
|---|---|
| 3 | 16555/65536 |
| 4 | 28001/65536 |
| 5 | 20980/65536 |

Cumulative value : 1501 or more

| To-be increased number of special symbols | Probability |
|---|---|
| 4 | 6555/65536 |
| 5 | 23001/65536 |
| 6 | 20980/65536 |
| 7 | 15000/65536 |

FIG. 31

| Special symbol | Number of rearranged symbols | | | |
|---|---|---|---|---|
| | 3 symbols | 4 symbols | 5 symbols | 6 or more symbols |
| HEART | 3 | 6 | 9 | m × (n−2) (※) |
| STAR | 5 | 10 | 15 | |
| SUN | 10 | 20 | 30 | |
| JEWEL | 15 | 30 | 45 | |
| SMILE | 30 | 60 | 90 | |

※"m" represents the amount of payout when 3 symbols are rearranged.
"n" represents the number of rearranged symbols.

FIG. 32

Cumulative value: 250 or less

| To-be increased number of special symbols | Probability |
|---|---|
| 2 | 36555/65536 |
| 3 | 18001/65536 |
| 4 | 10980/65536 |

Cumulative value: 251～500

| To-be increased number of special symbols | Probability |
|---|---|
| 3 | 36555/65536 |
| 4 | 18001/65536 |
| 5 | 10980/65536 |

Cumulative value: 501～1000

| To-be increased number of special symbols | Probability |
|---|---|
| 3 | 16555/65536 |
| 4 | 28001/65536 |
| 5 | 20980/65536 |

Cumulative value: 1001～1500

| To-be increased number of special symbols | Probability |
|---|---|
| 1 | 16555/65536 |
| 4 | 28001/65536 |
| 6 | 20980/65536 |

Cumulative value: 1501 or more

| To-be increased number of special symbols | Probability |
|---|---|
| 1 | 6555/65536 |
| 7 | 23001/65536 |
| 8 | 20980/65536 |
| 10 | 15000/65536 |

FIG. 34

| Special symbol | Number of rearranged symbols | | | |
|---|---|---|---|---|
| | 3 symbols | 4 symbols | 5 symbols | 6 or more symbols |
| RIBBON | 2 | 4 | 6 | m × (n−2) (※) |
| HEART | 3 | 6 | 9 | |
| STAR | 5 | 10 | 15 | |
| MOON | 8 | 16 | 24 | |
| SUN | 10 | 20 | 30 | |
| JEWEL | 15 | 30 | 45 | |
| CROWN | 20 | 40 | 60 | |
| SMILE | 30 | 60 | 90 | |

※"m" represents the amount of payout when 3 symbols are rearranged.
"n" represents the number of rearranged symbols.

FIG. 36

Cumulative value: 250 or less

| To-be increased specific number | Probability |
|---|---|
| 1 | 36555/65536 |
| 2 | 18001/65536 |
| 3 | 10980/65536 |

Cumulative value: 251～500

| To-be increased specific number | Probability |
|---|---|
| 1 | 36555/65536 |
| 2 | 18001/65536 |
| 4 | 10980/65536 |

Cumulative value: 501～1000

| To-be increased specific number | Probability |
|---|---|
| 1 | 16555/65536 |
| 2 | 28001/65536 |
| 4 | 20980/65536 |

Cumulative value: 1001～1500

| To-be increased specific number | Probability |
|---|---|
| 1 | 16555/65536 |
| 3 | 28001/65536 |
| 4 | 20980/65536 |

Cumulative value: 1501 or more

| To-be increased specific number | Probability |
|---|---|
| 1 | 6555/65536 |
| 3 | 23001/65536 |
| 4 | 20980/65536 |
| 5 | 15000/65536 |

FIG. 44

| | First column | Second column | Third column | Fourth column | Fifth column |
|---|---|---|---|---|---|
| Code No. | Symbol | Symbol | Symbol | Symbol | Symbol |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | ORANGE | CHERRY | ORANGE | BELL | PLUM |
| 05 | PLUM | ORANGE | PLUM | PLUM | BLUE 7 |
| 06 | ORANGE | PLUM | ORANGE | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | ORANGE | PLUM |
| 12 | ORANGE | PLUM | BELL | PLUM | BELL |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CHERRY | CHERRY |
| 17 | PLUM | STRAWBERRY | PLUM | BELL | ORANGE |
| 18 | ORANGE | PLUM | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 52

| Prize | Possibility of establishment (%) | Number of payouts (※1) |
|---|---|---|
| Bonus game trigger | 0.5 | (※2) |
| JACKPOT 7 | 0.5 | (※3) |
| BLUE 7 | 0.8 | 10 |
| BELL | 1.1 | 8 |
| STRAWBERRY | 1.5 | 5 |
| PLUM | 1.8 | 4 |
| CHERRY | 3.0 | 2 |
| ORANGE | 7.5 | 1 |

※1 The number of coin-outs per inserted coin
※2 Free game is played for the predetermined times.
※3 JP is offered.

GAMING MACHINE AND GAMING SYSTEM ACCUMULATING BETTED GAME MEDIA AND METHOD FOR CONTROLLING THE GAMING MACHINE

CROSS-REFERENCE TO RELATED APPLICATIONS

This application claims benefit of priority based on U.S. Provisional Patent Application No. 61/077,783 filed on Jul. 2, 2008, U.S. Provisional Patent Application No. 61/077,797 filed on Jul. 2, 2008 and U.S. Provisional Patent Application No. 61/076,438 filed on Jun. 27, 2008. The contents of this application are incorporated herein by reference in their entirety.

BACKGROUND OF THE INVENTION

1. Field of the Invention

The present invention relates to a gaming machine and a gaming system accumulating betted game media and a method for controlling the gaming machine.

2. Discussion of the Background

Among conventional gaming apparatuses such as slot machines, there have existed gaming apparatuses that conduct a payout called a jackpot. Upon winning of a jackpot, a player can acquire a large amount of game media at one time.

There has existed among those jackpots a jackpot called a progressive jackpot in which part of game media inserted by the player is cumulatively accumulated as a cumulative value, as disclosed for example in WO 99/03078-A1.

Those conventional gaming apparatuses conduct a payout of the jackpot, when, for example, the cumulative value of the jackpot has reached the predetermined value; however, since contents of the game do not change according to the cumulative value of the jackpot, the gaming apparatuses have lacked interesting aspects for the player.

Further, in such a conventional gaming machine, a cumulative value of the jackpot is cleared when a payout of the jackpot is once conducted, regardless of the amount of the payout, and the accumulation is made from zero again. Accordingly, the payout of the big jackpot is hardly generated, and therefore, the conventional gaming machine has an unattractive aspect for the player.

The contents of WO 99/03078-A1 are incorporated herein by reference in their entirety.

SUMMARY OF THE INVENTION

The present invention was made in view of the above-described problems, and has an object to provide: a gaming system capable of changing the contents of the game according to the cumulative value of the jackpot and making the player find the game interesting; and a control method of the gaming system; and a gaming machine and a gaming system capable of providing the higher payout to the player and a control method of the gaming machine.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, and (B) transmitting cumulative-value information based on the cumulative value, to the plurality of slot machines, and the controller is programmed to execute the processing of (c) determining the number of the special symbols that can be displayed to the symbol display, based on the cumulative-value information received from the control device, and (d) variably displaying and thereafter stop-displaying, to the symbol display, the symbols including the special symbol in number equal to or less than the number of the special symbols determined in the processing (c).

According to the above gaming system, the control device cumulatively counts a part of the number of game media betted in each of the slot machines, as a cumulative value, and transmits cumulative-value information based on the cumulative value obtained by the counting to the slot machines. The slot machine determines the number of special symbols that can be displayed to the symbol display, based on the received cumulative-value information.

Since the number of special symbols that can be displayed to the symbol display changes based on the cumulative value, the contents of the game change according to the cumulative value; it is therefore possible to make the player find the game interesting.

Further, an increase in the number of special symbols to be displayed to the symbol display generates an advantageous state for the player, and a decrease in the number of special symbols to be displayed to the symbol display generates a disadvantageous state for the player; it is therefore possible to make the player alternate between hope and despair, and to make him or her play the game for a long period of time without making him or her tired of the game.

It is desirable that the gaming system further has the following configuration.

The processor is further programmed to execute the processing of (C) determining whether or not the cumulative value has reached a predetermined value set in advance, and the processing (B) is the processing of transmitting the cumulative-value information based on the cumulative value, to the plurality of slot machines, when it is determined in the processing (C) that the cumulative value has reached the predetermined value.

According to the above gaming system, the number of special symbols that can be displayed to the symbol display changes when the cumulative value has reached the predetermined value. Thus, change in the number of special symbols displayed to the symbol display can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the above gaming system, the number of special symbols that can be displayed to the symbol display changes a plurality of times before a payout of the jackpot. It is possible to make the player alternate between hope and despair every time the number of special symbols changes, and to make the player immersed in the game.

Moreover, it is possible to enhance interesting aspects of the game by allowing the number of special symbols that can be displayed to the symbol display to change a plurality of times.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, (B) determining the number of the special symbols that can be displayed to the symbol display, based on the cumulative value, and (C) transmitting number-of-special-symbols information indicative of the number of the special symbols determined in the processing (B), to the plurality of slot machines, and the controller is programmed to execute the processing of (c) variably displaying and thereafter stop-displaying, to the symbol display, the symbols including the special symbol in number equal to or less than the number of the special symbols indicated by the number-of-special-symbols information received from the control device.

According to the above gaming system, the control device cumulatively counts a part of the number of game media betted in each of the slot machines, and determines the number of special symbols that can be displayed to the symbol display based on the cumulative value obtained by the counting.

Since the number of special symbols that can be displayed to the symbol display changes based on the cumulative value, the contents of the game change according to the cumulative value; it is therefore possible to make the player find the game interesting.

Further, an increase in the number of special symbols to be displayed to the symbol display generates an advantageous state for the player, and a decrease in the number of special symbols to be displayed to the symbol display generates a disadvantageous state for the player; it is therefore possible to make the player alternate between hope and despair, and to make him or her play the game for a long period of time without making him or her tired of the game.

It is desirable that the gaming system further has the following configuration.

The processor is further programmed to execute the processing of (D) determining whether or not the cumulative value has reached a predetermined value set in advance, and the processing (B) is the processing of determining the number of the special symbols that can be displayed to the symbol display, based on the cumulative value, when it is determined in the processing (D) that the cumulative value has reached the predetermined value.

According to the above gaming system, the number of special symbols that can be displayed to the symbol display changes when the cumulative value has reached the predetermined value. Thus, change in the number of special symbols displayed to the symbol display can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further comprises the following configuration.

A plurality of the predetermined values exist.

According to the above gaming system, the number of special symbols that can be displayed to the symbol display changes a plurality of times before a payout of the jackpot. It is possible to make the player alternate between hope and despair every time the number of special symbols changes, and to make the player immersed in the game.

Moreover, it is possible to enhance interesting aspects of the game by allowing the number of special symbols that can be displayed to the symbol display to change a plurality of times.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, and (B) transmitting cumulative-value information based on the cumulative value, to the plurality of slot machines, and the controller is programmed to execute the processing of (c) determining a specific number, based on the cumulative-value information received from the control device, (d) variably displaying and thereafter stop-displaying the symbols to the symbol display, and (e) conducting a payout of game media, when the number of the special symbols out of the symbols stop-displayed to the symbol display in the processing (d) is equal to or more than the specific number determined in the processing (c).

According to the above gaming system, the control device cumulatively counts a part of the number of game media betted in each of the slot machines, as a cumulative value, and transmits cumulative-value information based on the cumulative value obtained by the counting to the slot machines. Then, the slot machine determines the specific number based on the received cumulative-value information. When the number of special symbols out of the symbols stop-displayed to the symbol display is equal to or more than the specific number, the slot machine conducts a payout of game media.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

It is desirable that the gaming system further has the following configuration.

The processor is further programmed to execute the processing of (C) determining whether or not the cumulative value has reached a predetermined value set in advance, and the processing (B) is the processing of transmitting the cumulative-value information based on the cumulative value, to the plurality of slot machines, when it is determined in the processing (C) that the cumulative value has reached the predetermined value.

According to the above gaming system, the specific number changes when the cumulative value has reached the predetermined value. Thus, change in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the gaming system, the specific number changes a plurality of times before a payout of the jackpot. It is possible to make the player alternate between hope and despair every time the specific number changes, and to make the player immersed in the game.

Moreover, it is possible to further enhance interesting aspects of the game by allowing the specific number to change a plurality of times.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, (B) determining a specific number, based on the cumulative value, and (C) transmitting specific-number information indicative of the specific number determined in the processing (B), to the plurality of slot machines, and the controller is programmed to execute the processing of (c) variably displaying and thereafter stop-displaying the symbols to the symbol display, and (d) conducting a payout of game media, when the number of the special symbols out of the symbols stop-displayed to the symbol display in the processing (c) is equal to or more than the specific number indicated by the specific-number information received from the control device.

According to the above gaming system, the control device cumulatively counts a part of the number of game media betted in each of the slot machines, as a cumulative value, and determines a specific number based on the cumulative value obtained by the counting. When the number of special symbols out of the symbols stop-displayed to the symbol display is equal to or more than the specific number, the slot machine conducts a payout of game media.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

It is desirable that the gaming system further has the following configuration.

The processor is further programmed to execute the processing of (D) determining whether or not the cumulative value has reached a predetermined value set in advance, and the processing (B) is the processing of determining the specific number, based on the cumulative value, when it is determined in the processing (D) that the cumulative value has reached the predetermined value.

According to the above gaming system, the specific number changes when the cumulative value has reached the predetermined value. Thus, change in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the above gaming system, the specific number changes a plurality of times before a payout of the jackpot. It is possible to make the player alternate between hope and despair every time the specific number changes, and to make the player immersed in the game.

Moreover, it is possible to further enhance interesting aspects of the game by allowing the specific number to change a plurality of times.

The present invention further provides a game control method having the following configuration.

Namely, the game control method comprises the steps of: (a) a plurality of slot machines each accepting abet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device transmitting cumulative-value information based on the cumulative value, to the plurality of slot machines, (c) the slot machine determining the number of special symbols that can be displayed to a symbol display capable of variably displaying symbols including the special symbol, based on the cumulative-value information received from the control device, and (d) the slot machine variably displaying and thereafter stop-displaying, to the symbol display, the symbols including the special symbol in number equal to or less than the number of the special symbols determined in the step (c).

According to the above game control method, the control device cumulatively counts a part of the number of game media betted in each of the slot machines, as a cumulative value, and transmits cumulative-value information based on the cumulative value obtained by the counting to the slot machines. The slot machine determines the number of special symbols that can be displayed to the symbol display, based on the received cumulative-value information.

Since the number of special symbols that can be displayed to the symbol display changes based on the cumulative value, the contents of the game change according to the cumulative value; it is therefore possible to make the player find the game interesting.

Further, an increase in the number of special symbols to be displayed to the symbol display generates an advantageous state for the player, and a decrease in the number of special symbols to be displayed to the symbol display generates a disadvantageous state for the player; it is therefore possible to make the player alternate between hope and despair, and to make him or her play the game for a long period of time without making him or her tired of the game.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device determining the number of special symbols that can be displayed to a symbol display capable of variably displaying symbols including the special symbol, based on the cumulative value, (C) the control device transmitting number-of-special-symbols information indicative of the number of the special symbols determined in the step (B), to the plurality of slot machines, and (c) the slot machine variably displaying and thereafter stop-displaying, to the symbol display, the symbols including the special symbol in number equal to or less than the number of the special symbols indicated by the number-of-special-symbols information received from the control device.

According to the above game control method, the control device cumulatively counts a part of the number of game media betted in each of the slot machines, and determines the number of special symbols that can be displayed to the symbol display based on the cumulative value obtained by the counting.

Since the number of special symbols that can be displayed to the symbol display changes based on the cumulative value, the contents of the game change according to the cumulative value; it is therefore possible to make the player find the game interesting.

Further, an increase in the number of special symbols to be displayed to the symbol display generates an advantageous state for the player, and a decrease in the number of special symbols to be displayed to the symbol display generates a disadvantageous state for the player; it is therefore possible to make the player alternate between hope and despair, and to make him or her play the game for a long period of time without making him or her tired of the game.

The present invention further provides a game control method having the following configuration.

Namely, the game control method comprises the steps of: (a) a plurality of slot machines each accepting abet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device transmitting cumulative-value information based on the cumulative value, to the plurality of slot machines, (c) the slot machine determining a specific number, based on the cumulative-value information received from the control device, (d) the slot machine variably displaying and thereafter stop-displaying symbols to a symbol display capable of variably displaying the symbols including a special symbol, and (e) the slot machine conducting a payout of game media, when the number of the special symbols out of the symbols stop-displayed to the symbol display in the step (d) is equal to or more than the specific number determined in the step (c).

According to the above game control method, the control device cumulatively counts a part of the number of game media betted in each of the slot machines, as a cumulative value, and transmits cumulative-value information based on the cumulative value obtained by the counting to the slot machines. Then, the slot machine determines the specific number based on the received cumulative-value information. When the number of special symbols out of the symbols stop-displayed to the symbol display is equal to or more than the specific number, the slot machine conducts a payout of game media.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device determining a specific number, based on the cumulative value, (C) the control device transmitting specific-number information indicative of the specific number determined in the step (B), to the plurality of slot machines, (c) the slot machine variably displaying and thereafter stop-displaying symbols to a symbol display capable of variably displaying the symbols including a special symbol, and (d) the slot machine conducting a payout of game media, when the number of the special symbols out of the symbols stop-displayed to the symbol display in the step (c) is equal to or more than the specific number indicated by the specific-number information received from the control device.

According to the above game control method, the control device cumulatively counts a part of the number of game media betted in each of the slot machines, as a cumulative value, and determines a specific number based on the cumulative value obtained by the counting. When the number of special symbols out of the symbols stop-displayed to the symbol display is equal to or more than the specific number, the slot machine conducts a payout of game media.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, and (B) transmitting cumulative-value information based on the cumulative value, to the plurality of slot machines, and the controller is programmed to execute the processing of (c) increasing the number of the special symbols that can be displayed to the symbol display, based on the cumulative-value information received from the control device, and (d) variably displaying and thereafter stop-displaying, to the symbol display, the symbols including the special symbol in number equal to or less than the number of the special symbols increased in the processing (c).

According to the above gaming system, the control device cumulatively counts a part of the number of game media betted in each of the slot machines, as a cumulative value, and transmits cumulative-value information based on the cumulative value obtained by the counting to the slot machines. The slot machine increases the number of special symbols that can be displayed to the symbol display, based on the received cumulative-value information.

Since the number of special symbols that can be displayed to the symbol display increases based on the cumulative value, the contents of the game change according to the cumulative value; it is therefore possible to make the player find the game interesting.

Further, an increase in the number of special symbols to be displayed to the symbol display generates an advantageous state for the player; it is therefore possible to make the player play the game for a long period of time.

It is desirable that the gaming system further has the following configuration.

The processor is further programmed to execute the processing of (C) determining whether or not the cumulative value has reached a predetermined value set in advance, and the processing (B) is the processing of transmitting the cumulative-value information based on the cumulative value, to the plurality of slot machines, when it is determined in the processing (C) that the cumulative value has reached the predetermined value.

According to the above gaming system, the number of special symbols that can be displayed to the symbol display increases when the cumulative value has reached the predetermined value. Thus, an increase in the number of special symbols displayed to the symbol display can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the above gaming system, the number of special symbols that can be displayed to the symbol display increases a plurality of times before a payout of the jackpot. It is possible to excite the player every time the number of special symbols increases, and to make the player immersed in the game.

Moreover, it is possible to enhance interesting aspects of the game by allowing the number of special symbols that can be displayed to the symbol display to increase a plurality of times.

In addition, since the number of special symbols increases in stages before a payout of the jackpot, an advantageous state for the player is generated in stages, thereby fueling the player's hope.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting abet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, (B) increasing the number of the special symbols that can be displayed to the symbol display, based on the cumulative value, and (C) transmitting number-of-special-symbols information indicative of the number of the special symbols increased in the processing (B), to the plurality of slot machines, and the controller is programmed to execute the processing of (c) variably displaying and thereafter stop-displaying, to the symbol display, the symbols including the special symbol in number equal to or less than the number of the special symbols indicated by the number-of-special-symbols information received from the control device.

According to the above gaming system, the control device cumulatively counts a part of the number of game media betted in each of the slot machines, and increases the number of special symbols that can be displayed to the symbol display based on the cumulative value obtained by the counting.

Since the number of special symbols that can be displayed to the symbol display increases based on the cumulative value, the contents of the game change according to the cumulative value; it is therefore possible to make the player find the game interesting.

Further, an increase in the number of special symbols to be displayed to the symbol display generates an advantageous state for the player; it is therefore possible to make the player play the game for a long period of time.

It is desirable that the gaming system further has the following configuration.

The processor is further programmed to execute the processing of (D) determining whether or not the cumulative value has reached a predetermined value set in advance, and the processing (B) is the processing of increasing the number of the special symbols that can be displayed to the symbol display, based on the cumulative value, when it is determined in the processing (D) that the cumulative value has reached the predetermined value.

According to the above gaming system, the number of special symbols that can be displayed to the symbol display increases when the cumulative value has reached the predetermined value. Thus, an increase in the number of special symbols displayed to the symbol display can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further comprises the following configuration.

A plurality of the predetermined values exist.

According to the above gaming system, the number of special symbols that can be displayed to the symbol display increases a plurality of times before a payout of the jackpot. It is possible to excite the player every time the number of special symbols increases, and to make the player immersed in the game.

Moreover, it is possible to enhance interesting aspects of the game by allowing the number of special symbols that can be displayed to the symbol display to increase a plurality of times.

In addition, since the number of special symbols increases in stages before a payout of the jackpot, an advantageous state for the player is generated in stages, thereby fueling the player's hope.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting a bet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, and (B) transmitting cumulative-value information based on the cumulative value, to the plurality of slot machines, and the controller is programmed to execute the processing of (c) increasing a specific number, based on the cumulative-value information received from the control device, (d) variably displaying and thereafter stop-displaying the symbols to the symbol display, and (e) conducting a payout of game media, when the number of the special symbols out of the symbols stop-displayed to the symbol display in the processing (d) is equal to or more than the specific number increased in the processing (c).

According to the above gaming system, the control device cumulatively counts a part of the number of game media betted in each of the slot machines, as a cumulative value, and transmits cumulative-value information based on the cumulative value obtained by the counting to the slot machines. Then, the slot machine increases the specific number based on the received cumulative-value information. When the number of special symbols out of the symbols stop-displayed to the symbol display is equal to or more than the specific number, the slot machine conducts a payout of game media.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is steadily approaching a payout of the jackpot; it is therefore possible to make the player play the game for a long period of time.

It is desirable that the gaming system further has the following configuration.

The processor is further programmed to execute the processing of (C) determining whether or not the cumulative value has reached a predetermined value set in advance, and the processing (B) is the processing of transmitting the cumulative-value information based on the cumulative value, to the plurality of slot machines, when it is determined in the processing (C) that the cumulative value has reached the predetermined value.

According to the above gaming system, the specific number increases when the cumulative value has reached the predetermined value. Thus, an increase in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the gaming system, the specific number increases a plurality of times before a payout of the jackpot. It is possible to further enhance interesting aspects of the game by allowing the specific number to change a plurality of times.

The present invention provides a gaming system having the following configuration.

Namely, the gaming system comprises: a plurality of slot machines each including a symbol display capable of variably displaying symbols including a special symbol, and a controller; a control device including a processor; and a network enabling communication between the plurality of slot machines and the control device, wherein the controller is programmed to execute the processing of (a) accepting abet of a game medium, and (b) transmitting number-of-game-media information about the number of game media betted as the bet accepted in the processing (a), to the control device, the processor is programmed to execute the processing of (A) cumulatively counting a part of the number of betted game media, as a cumulative value, based on the number-of-game-media information received from the slot machine, (B) increasing a specific number, based on the cumulative value, and (C) transmitting specific-number information indicative of the specific number increased in the processing (B), to the plurality of slot machines, and the controller is programmed to execute the processing of (c) variably displaying and thereafter stop-displaying the symbols to the symbol display, and (d) conducting a payout of game media, when the number of the special symbols out of the symbols stop-displayed to the symbol display in the processing (c) is equal to or more than the specific number indicated by the specific-number information received from the control device.

According to the above gaming system, the control device cumulatively counts a part of the number of game media betted in each of the slot machines, as a cumulative value, and increases a specific number based on the cumulative value obtained by the counting. When the number of special symbols out of the symbols stop-displayed to the symbol display is equal to or more than the specific number, the slot machine conducts a payout of game media.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is steadily approaching a payout of the jackpot; it is therefore possible to make the player play the game for a long period of time.

It is desirable that the gaming system further has the following configuration.

The processor is further programmed to execute the processing of (D) determining whether or not the cumulative value has reached a predetermined value set in advance, and the processing (B) is the processing of increasing the specific number, based on the cumulative value, when it is determined in the processing (D) that the cumulative value has reached the predetermined value.

According to the above gaming system, the specific number increases when the cumulative value has reached the predetermined value. Thus, an increase in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

It is desirable that the gaming system further has the following configuration.

A plurality of the predetermined values exist.

According to the above gaming system, the specific number increases a plurality of times before a payout of the jackpot. It is possible to further enhance interesting aspects of the game by allowing the specific number to change a plurality of times.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device transmitting cumulative-value information based on the cumulative value, to the plurality of slot machines, (c) the slot machine increasing the number of special symbols that can be displayed to a symbol display capable of variably displaying symbols including the special symbol, based on the cumulative-value information received from the control device, and (d) the slot machine variably displaying and thereafter stop-displaying, to the symbol display, the symbols including the special symbol in number equal to or less than the number of the special symbols increased in the step (c).

According to the above game control method, the control device cumulatively counts a part of the number of game media betted in each of the slot machines, as a cumulative value, and transmits cumulative-value information based on the cumulative value obtained by the counting to the slot machines. The slot machine increases the number of special symbols that can be displayed to the symbol display, based on the received cumulative-value information.

Since the number of special symbols that can be displayed to the symbol display increases based on the cumulative value, the contents of the game change according to the cumulative value; it is therefore possible to make the player find the game interesting.

Further, an increase in the number of special symbols to be displayed to the symbol display generates an advantageous state for the player; it is therefore possible to make the player play the game for a long period of time.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device increasing the number of special symbols that can be displayed to a symbol display capable of variably displaying symbols including the special symbol, based on the cumulative value, (C) the control device transmitting number-of-special-symbols information indicative of the number of the special symbols increased in the step (B), to the plurality of slot machines, and (c) the slot machine variably displaying and thereafter stop-displaying, to the symbol display, the symbols including the special symbol in number equal to or less than the number of the special symbols indicated by the number-of-special-symbols information received from the control device.

According to the above game control method, the control device cumulatively counts a part of the number of game media betted in each of the slot machines, and increases the number of special symbols that can be displayed to the symbol display based on the cumulative value obtained by the counting.

Since the number of special symbols that can be displayed to the symbol display increases based on the cumulative value, the contents of the game change according to the cumulative value; it is therefore possible to make the player find the game interesting.

Further, an increase in the number of special symbols to be displayed to the symbol display generates an advantageous state for the player; it is therefore possible to make the player play the game for a long period of time.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device transmitting cumulative-value information based on the cumulative value, to the plurality of slot machines, (c) the slot machine increasing a specific number, based on the cumulative-value information received from the control device, (d) the slot machine variably displaying and thereafter stop-displaying symbols to a symbol display capable of variably displaying the symbols including a special symbol, and (e) the slot machine conducting a payout of game media, when the number of the special symbols out of the symbols stop-displayed to the symbol display in the step (d) is equal to or more than the specific number increased in the step (c).

According to the above game control method, the control device cumulatively counts a part of the number of game media betted in each of the slot machines, as a cumulative value, and transmits cumulative-value information based on the cumulative value obtained by the counting to the slot machines. Then, the slot machine increases the specific number based on the received cumulative-value information. When the number of special symbols out of the symbols stop-displayed to the symbol display is equal to or more than the specific number, the slot machine conducts a payout of game media.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is approaching a payout of the jackpot; it is therefore possible to make the player play the game for a long period of time.

The present invention further provides a game control method having the following configuration.

Namely, the game control method comprises the steps of: (a) a plurality of slot machines each accepting a bet of a game medium, (b) the slot machine transmitting number-of-game-media information about the number of game media betted as the bet accepted in the step (a), to a control device, (A) the control device cumulatively counting a part of the number of betted game media, as a cumulative value, based on the number-of-game-media information received from the slot machine, (B) the control device increasing a specific number, based on the cumulative value, (C) the control device transmitting specific-number information indicative of the specific number increased in the step (B), to the plurality of slot machines, (c) the slot machine variably displaying and thereafter stop-displaying symbols to a symbol display capable of variably displaying the symbols including a special symbol, and (d) the slot machine conducting a payout of game media, when the number of the special symbols out of the symbols stop-displayed to the symbol display in the step (c) is equal to or more than the specific number indicated by the specific-number information received from the control device.

According to the above game control method, the control device cumulatively counts a part of the number of game media betted in each of the slot machines, as a cumulative value, and increases a specific number based on the cumulative value obtained by the counting. When the number of special symbols out of the symbols stop-displayed to the symbol display is equal to or more than the specific number, the slot machine conducts a payout of game media.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is approaching a payout of the jackpot; it is therefore possible to make the player play the game for a long period of time.

The present invention provides a gaming machine having the following configuration.

Namely, the gaming machine comprises: an input device; and a controller. The controller is programmed to execute processing of (a) accepting a bet from the input device, (b) cumulatively accumulating a predetermined percentage of a game medium betted in the processing (a), (c) determining whether or not to generate a specific winning for offering a payout out of the game media cumulatively accumulated in the processing (b), and (d) subtracting a payout value indicative of the payout to be offered along with the generation of the specific winning from a cumulative accumulation value indicative of an amount of the game media cumulatively accumulated in the processing (b), when determining to generate the specific winning in the processing (c).

According to the gaming machine, the gaming machine cumulatively accumulates a predetermined percentage of the game media betted by the input device (e.g. a BET button) and determines whether or not to generate a specific winning (e.g. jackpot) to be offered out of the game media. In the case of determining to generate the specific winning, the gaming machine subtracts the payout value indicative of the payout to be offered for the specific winning from the cumulative accumulation value indicative of the amount of the accumulated game media.

Namely, when the specific winning such as the jackpot (hereinafter, also referred to as JP) is generated, the cumulative accumulation value indicative of the amount of the accumulated game media is not cleared to zero, but the accumulation of the game media is continued after the payout value corresponding to the payout to be offered for the specific winning is subtracted. Accordingly, it is possible to carry over a part of the accumulated game media until the next time the specific winning is generated, when the payout value is smaller than the cumulative accumulation value. It is therefore possible to provide a possibility of the offer of the larger amount of game media as the payout for the specific winning, compared with the case in which the cumulative accumulation value is cleared to zero every time the specific winning is generated. Consequently, it becomes possible to increase an interest in the game and an expectation for the high payout of the player.

It is desirable that the gaming machine further has the following configuration.

Namely, the controller is further programmed to execute the processing of (e) determining the payout to be offered along with the generation of the specific winning, and the processing (d) is the processing of subtracting the payout value indicative of the payout determined in the processing (e) from the cumulative accumulation value, when determining to generate the specific winning in the processing (c).

According to the gaming machine, the gaming machine determines not only whether or not to generate the specific winning, but also the payout (payout amount) for the specific winning in each case. Accordingly, it is possible to vary the payout to be offered, thereby preventing the game from becoming monotonous.

It is desirable that the gaming machine further has the following configuration.

Namely, the controller is further programmed to execute the processing of (f) determining whether or not the payout value is equal to or less than the cumulative accumulation value, and the processing (d) is the processing of subtracting the payout value from the cumulative accumulation value, when determining to generate the specific winning in the processing (c) and determining that the payout value is equal to or less than the cumulative accumulation value in the processing (f).

According to the gaming machine, the gaming machine subtracts the payout value from the cumulative accumulation value when the payout value for the specific winning is equal to or less than the cumulative accumulation value. It is therefore possible to prevent the offering of the payout larger than the amount of the accumulated game media for the specific winning.

The present invention further provides a gaming system having the following configuration.

Namely, the gaming system comprising: a plurality of gaming machines each provided with a controller; and a control device provided with a processor and capable of communicating with the plurality of gaming machines through a communication line. The controller is programmed to execute processing of (a) accepting a bet from an input device, and the processor is programmed to execute processing of (A) cumulatively accumulating a predetermined percentage of a game medium betted in the processing (a), (B) determining whether or not to generate a specific winning for offering a payout out of the game media cumulatively accumulated in the processing (A), and (C) subtracting a payout value indicative of the payout to be offered along with the generation of the specific winning from a cumulative accumulation value indicative of an amount of the game media cumulatively accumulated in the processing (A), when determining to generate the specific winning in the processing (B).

According to the gaming system, the gaming system is provided with a plurality of gaming machines and a control device (e.g. server) capable of communicating with the gaming machines. The control device cumulatively accumulates a predetermined percentage of the game media betted in each gaming machine and determines whether or not to generate the specific winning (e.g. jackpot) for offering a payout out of the game media. Then, when determining to generate the specific winning, the controller subtracts the payout value indicative of the payout to be offered for the specific winning from the cumulative accumulation value indicative of the amount of the accumulated game media.

Namely, when the specific winning such as the jackpot is generated, the cumulative accumulation value indicative of the amount of the accumulated game media is not cleared to zero, but the accumulation of the game media is continued after the payout value corresponding to the payout to be offered for the specific winning is subtracted. Accordingly, it is possible to carry over a part of the accumulated game media until the next time the specific winning is generated, when the payout value is smaller than the cumulative accumulation value. It is therefore possible to provide a possibility of the offer of the larger amount of game media as the payout for the specific winning, compared with the case in which the cumulative accumulation value is cleared to zero every time the specific winning is generated. Consequently, it becomes possible to increase an interest in the game and an expectation for the high payout of the player.

Further, by cumulatively accumulating in the server the game media betted in the plurality of gaming machines, it becomes possible to make the cumulative accumulation value larger, compared with the case where the value is accumulated in each gaming machine.

It is desirable that the gaming system further has the following configuration.

Namely, the processor is further programmed to execute the processing of (D) determining the payout to be offered along with the generation of the specific winning, and the processing (C) is the processing of subtracting the payout value indicative of the payout determined in the processing (D) from the cumulative accumulation value, when determining to generate the specific winning in the processing (D).

According to the gaming system, the gaming system determines not only whether or not to generate the specific winning, but also the payout (payout amount) for the specific winning in each case. Accordingly, it is possible to vary the payout to be offered, thereby preventing the game from becoming monotonous.

It is desirable that the gaming system further has the following configuration.

Namely, the processor is further programmed to execute the processing of (E) determining whether or not the payout value is equal to or less than the cumulative accumulation value, and the processing (C) is the processing of subtracting the payout value from the cumulative accumulation value, when determining to generate the specific winning in the processing (B) and determining that the payout value is equal to or less than the cumulative accumulation value in the processing (E).

According to the gaming system, the gaming system subtracts the payout value from the cumulative accumulation value when the payout value for the specific winning is equal to or less than the cumulative accumulation value. It is therefore possible to prevent the offering of the payout larger than the amount of the accumulated game media for the specific winning.

The present invention further provides a method for controlling a gaming machine, the method having the following configuration.

Namely, the method for controlling a gaming machine comprises steps of: (a) accepting a bet from an input device; (b) cumulatively accumulating a predetermined percentage of a game medium betted in the step (a); (c) determining whether or not to generate a specific winning to be offered out of the game media cumulatively accumulated in the step (b); and (d) subtracting a payout value indicative of the payout to be offered along with the generation of the specific winning from a cumulative accumulation value indicative of an amount of the game media cumulatively accumulated in the step (b), when determining to generate the specific winning in the step (c).

According to the method for controlling a gaming machine, the gaming machine cumulatively accumulates a predetermined percentage of the game media betted by the input device (e.g. a BET button) and determines whether or not to generate a specific winning (e.g. jackpot) to be offered out of the game media. In the case of determining to generate the specific winning, the gaming machine subtracts the payout value indicative of the payout to be offered for the specific winning from the cumulative accumulation value indicative of the amount of the accumulated game media.

Namely, when the specific winning such as the jackpot is generated, the cumulative accumulation value indicative of the amount of the accumulated game media is not cleared to zero, but the accumulation of the game media is continued after the payout value corresponding to the payout to be offered for the specific winning is subtracted. Accordingly, it is possible to carry over a part of the accumulated game media until the next time the specific winning is generated, when the payout value is smaller than the cumulative accumulation value. It is therefore possible to provide a possibility of the offer of the larger amount of game media as the payout for the specific winning, compared with the case in which the cumulative accumulation value is cleared to zero every time the specific winning is generated. Consequently, it becomes possible to increase an interest in the game and an expectation for the high payout of the player.

It is desirable that the method for controlling the gaming machine further has the following configuration.

Namely, the method for controlling a gaming machine according to claim 7 further comprises the step of: (e) determining the payout to be offered along with the generation of the specific winning, and the step (d) is the step of subtracting the payout value indicative of the payout determined in the step (e) from the cumulative accumulation value, when determining to generate the specific winning in the step (c).

According to the method for controlling a gaming machine, the gaming machine determines not only whether or not to generate the specific winning, but also the payout (payout amount) for the specific winning in each case. Accordingly, it is possible to vary the payout to be offered, thereby preventing the game from becoming monotonous.

It is desirable that the method for controlling the gaming machine further has the following configuration.

Namely, the method for controlling a gaming machine according to claim 7 further comprises the step of: (f) determining whether or not the payout value is equal to or less than the cumulative accumulation value, and the step (d) is the step of subtracting the payout value from the cumulative accumulation value, when determining to generate the specific winning in the step (c) and determining that the payout value is equal to or less than the cumulative accumulation value in the step (f).

According to the method for controlling the gaming machine, the gaming machine subtracts the payout value from the cumulative accumulation value when the payout value for the specific winning is equal to or less than the cumulative accumulation value. It is therefore possible to prevent the offering of the payout larger than the amount of the accumulated game media.

BRIEF DESCRIPTION OF THE DRAWINGS

FIG. 7 is a view illustrating correspondence relationships among types and the numbers of rearranged normal symbols and amounts of payouts, in the first embodiment.

FIG. 9 is a view illustrating number-of-special-symbols determination table in the first embodiment.

FIG. 11 is a view illustrating correspondence relationships among types and the numbers of rearranged normal symbols and amounts of payouts, in the second embodiment.

FIG. 12 is a view illustrating number-of-special-symbols determination table in the second embodiment.

FIG. 14 is a view illustrating correspondence relationships among types and the numbers of rearranged normal symbols and amounts of payouts, in the third embodiment.

FIG. 16 is a view illustrating specific-number determination table in the third embodiment.

FIG. 27 is a view illustrating correspondence relationships among types and the numbers of rearranged normal symbols and amounts of payouts, in the seventh embodiment.

FIG. 29 is a view illustrating to-be-increased number-of-special-symbols determination table in the seventh embodiment.

FIG. 31 is a view illustrating correspondence relationships among types and the numbers of rearranged normal symbols and amounts of payouts, in the eighth embodiment.

FIG. 32 is a view illustrating to-be-increased number-of-special-symbols determination table in the eighth embodiment.

FIG. 34 is a view illustrating correspondence relationships among types and the numbers of rearranged normal symbols and amounts of payouts, in the ninth embodiment.

FIG. 36 is a view illustrating to-be-increased specific-number determination table in the ninth embodiment.

FIG. 44 is a schematic view illustrating a column of symbols displayed to respective display blocks.

FIG. 52 is a view illustrating a relationship between a plurality of prizes, and possibilities of establishment and numbers of payouts of respective prizes.

DESCRIPTION OF THE EMBODIMENTS

Embodiments of the present invention are described based on the drawings.

First Embodiment

Figure 1:
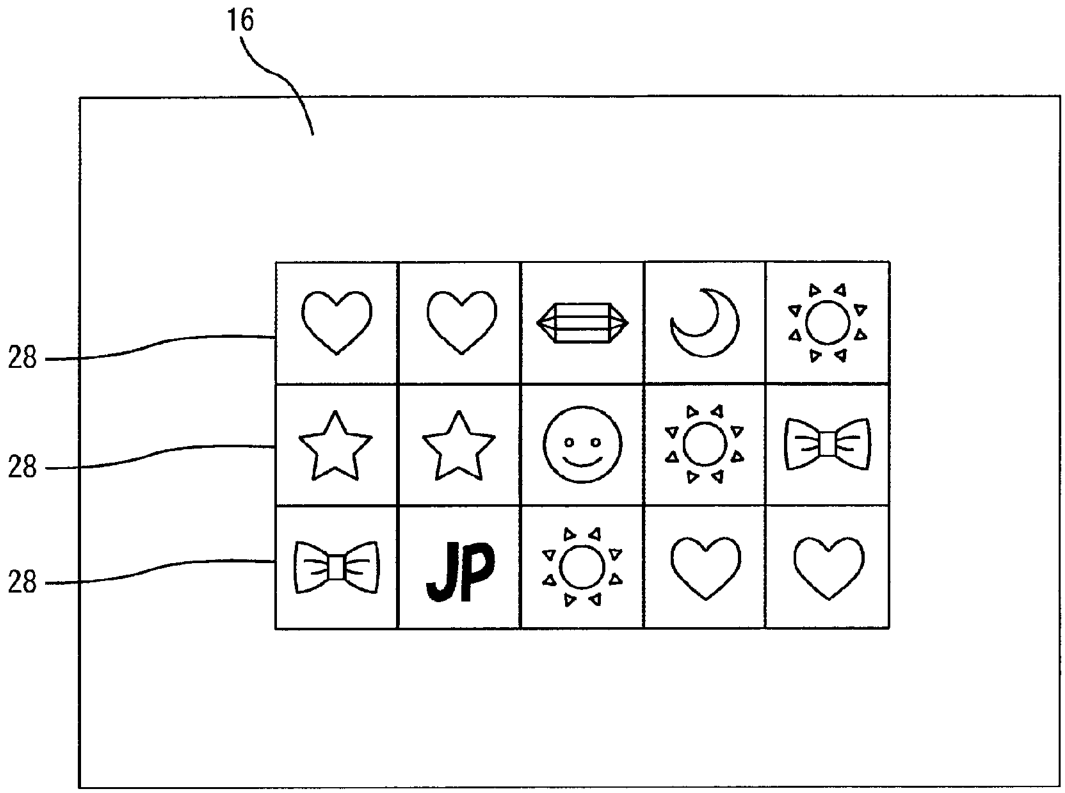
FIG. 1 is a view illustrating an example of symbols rearranged to display blocks.

FIG. 1 is a view illustrating an example of symbols rearranged to display blocks.

In the first embodiment, eight types of normal symbols of “RIBBON”, “HEART”, “STAR”, “MOON”, “SUN”, “JEWEL”, “CROWN”, and “SMILE” exist. For a special symbol, there exists a symbol of “JP” being a jackpot trigger symbol.

An example of FIG. 1 shows a state in which one symbol of “JP” being a special symbol is rearranged to display blocks 28 that are displayed to a lower image display panel 1016.

It is to be noted that the normal symbols and the special symbols, together, are described as “symbols” hereinbelow.

In a gaming system 100 according to the first embodiment, a part of coins betted in each slot machine 10 are cumulatively counted as a cumulative value. When the cumulative value obtained by the counting reaches a predetermined value, the number of special symbols that can be rearranged to the display blocks 28 displayed to the lower image display panel 1016 provided in each slot machine 10 (maximum number of special symbols) is determined. Then, when the number of special symbols rearranged to the display blocks 28 after scroll-display of symbols in the display blocks 28 is three or more, payout of coins is conducted as a jackpot.

It is to be noted that the maximum number of special symbols is the maximum number of special symbols that can be rearranged to the display blocks 28. Namely, when the maximum number of special symbols is five, five special symbols are scroll-displayed at the time of scroll-display of symbols in the display blocks 28. Thus, after the symbols are scroll-displayed in the display blocks 28, the number of special symbols to be rearranged to the display blocks 28 is equal to or less than five.

As just described, in the first embodiment, the number of special symbols that can be rearranged to the display blocks 28 changes based on the cumulative value obtained by the counting.

Figure 2:
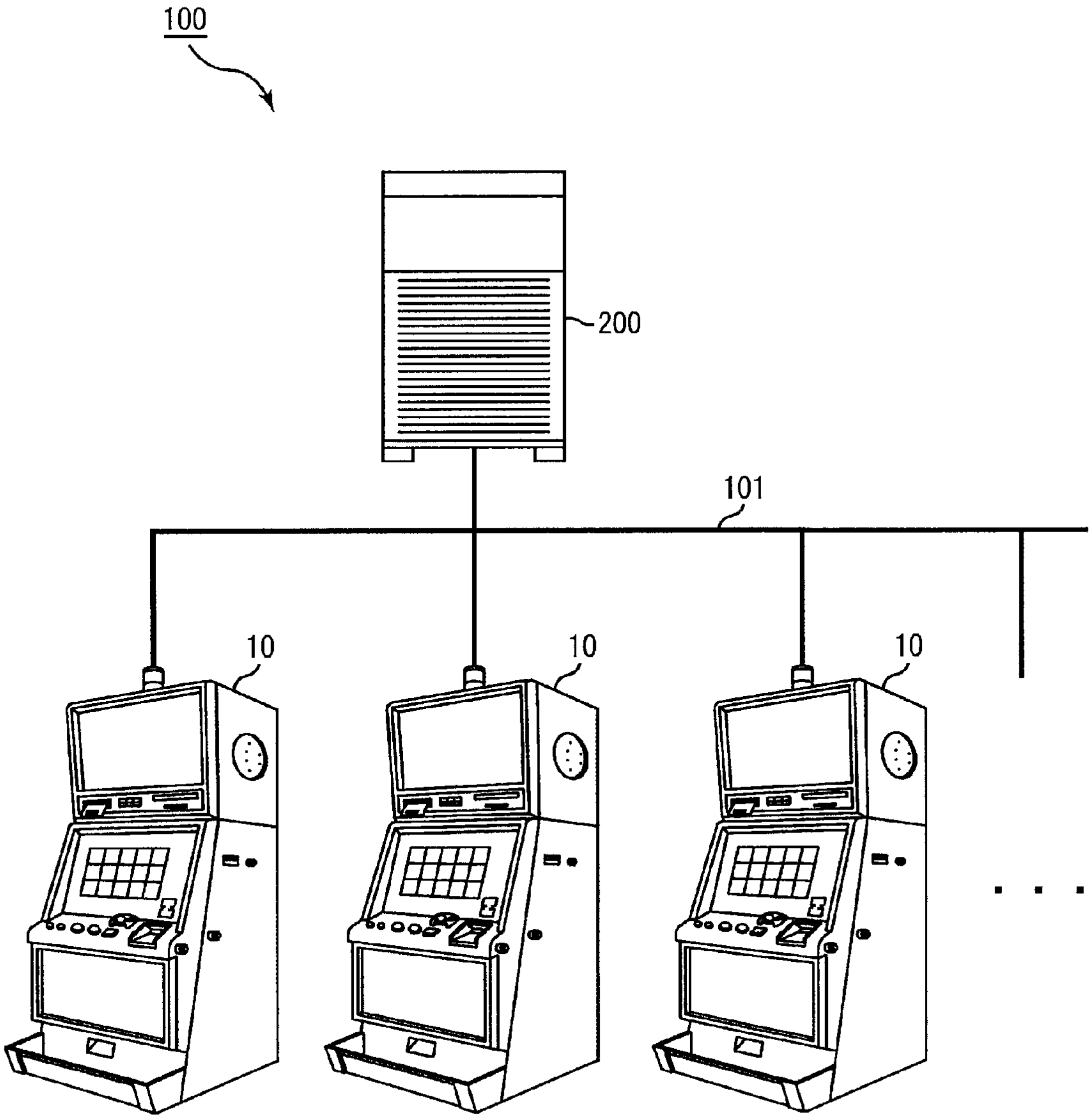
FIG. 2 is a diagrammatic view illustrating an entire configuration of a gaming system according to a first embodiment.

FIG. 2 is a diagrammatic view illustrating an entire configuration of a gaming system according to the first embodiment.

As shown in FIG. 2, the gaming system 100 is provided with a control device 200. The control device 200 is connected, through communication lines 101, with a plurality of (five in the first embodiment) slot machines 10. The plurality of respective slot machines 10 are capable of transmitting and receiving data to and from the control device 200, through the communication lines 101. Further, the respective slot machines 10 are connected to one another in a manner enabling communication there among, through the communication lines 101.

In the present embodiment, a case will be described where the slot machines 10 and the control device 200 are connected through wired connections. However, the present invention is not limited to this example, and may wirelessly conduct transmission and reception of data. Namely, a communication line (network) in the present invention includes wired and wireless transmission lines.

Moreover, in the present embodiment, a case will be described where the gaming system 100 is installed in a single game hall or the like; however, in the present invention, respective gaming apparatuses may be installed in different facilities.

Next, a configuration of the slot machine 10 is described.

Figure 3:
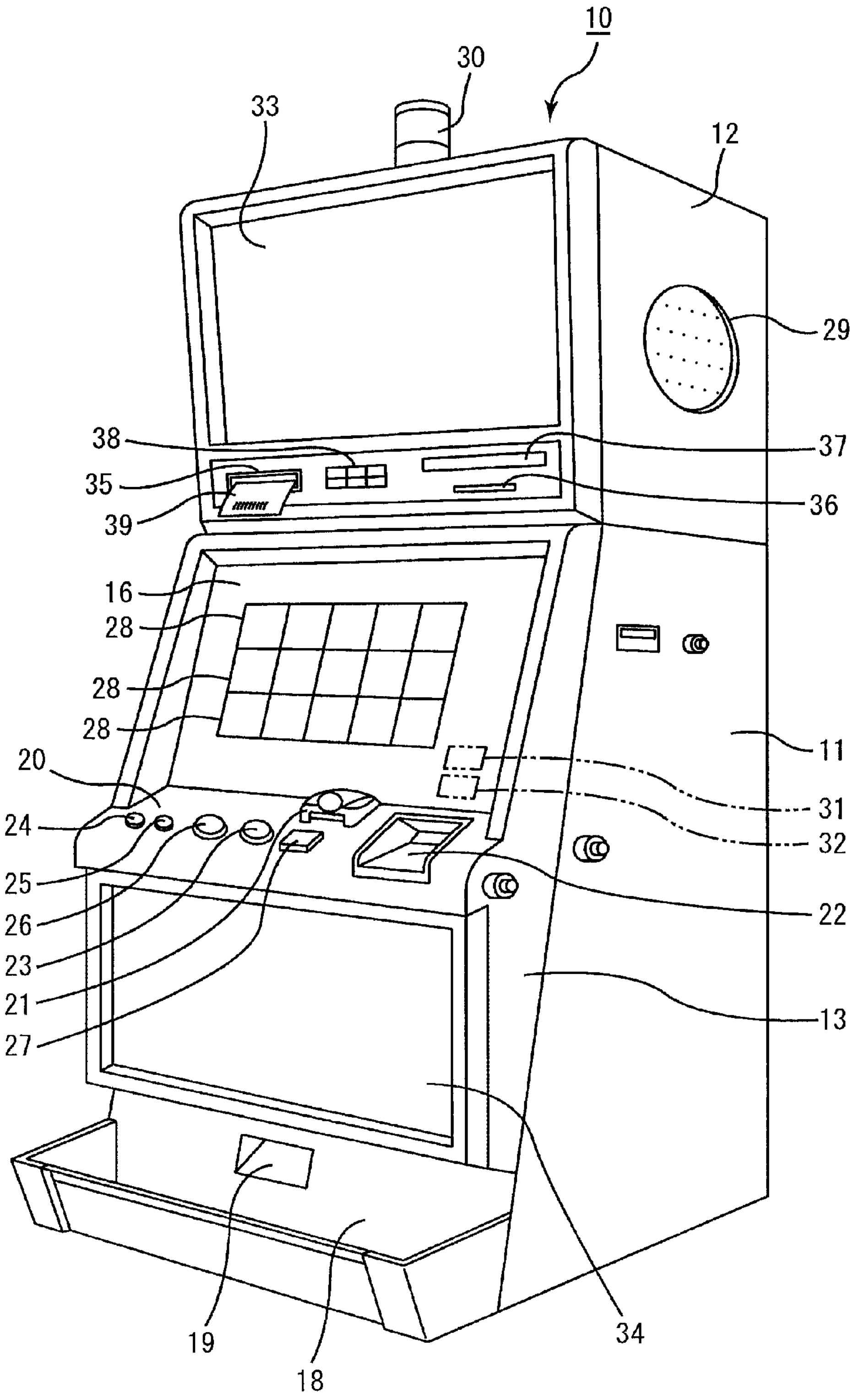
FIG. 3 is a perspective view illustrating an external view of a slot machine forming the gaming system according to the first embodiment.

FIG. 3 is a perspective view illustrating an external view of a slot machine forming a gaming system according to the first embodiment.

In the slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 10 comprises a cabinet 11, a top box 12 installed on the upper side of the cabinet 11, and a main door 13 provided at the front face of the cabinet 11.

On the main door 13, there is provided a lower image display panel 1016 as a display. The lower image display panel 1016 includes a transparent liquid crystal panel which displays fifteen display blocks 28 along five columns and three rows. A single symbol is displayed in each display block 28. Further, although not illustrated, various types of images relating to an effect, as well as the aforementioned images, are displayed to the lower image display panel 1016.

The lower image display panel 1016 corresponds to the symbol display in the present invention.

Further, a number-of-credits display portion 31 and a number-of-payouts display portion 32 are provided on the lower image display panel 1016. The number-of-credits display portion 31 displays an image indicative of the number of credited coins. The number-of-payouts display portion 32 displays an image indicative of the number of coins to be paid out.

Moreover, although not shown, a touch panel 69 is provided at the front face of the lower image display panel 1016. The player can operate the touch panel 69 to input a variety of commands.

Below the lower image display panel 1016, there are provided a control panel 20 including a plurality of buttons 23 to 27 with each of which a command according to game progress is inputted by the player, a coin receiving slot 21 through which a coin is accepted into the cabinet 11, and a bill validator 22.

The control panel 20 is provided with a start button 23, a change button 24, a CASHOUT button 25, a 1-BET button 26 and a maximum BET button 27. The start button 23 is used for inputting a command to start scrolling of symbols. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (50 coins in the present embodiment) out of credited coins.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely, below the control panel 20, there is provided a belly glass 34 on which a character or the like of the slot machine 10 is drawn.

On the front surface of the top box 12, there is provided an upper image display panel 33. The upper image display panel 33 includes a liquid crystal panel, which displays, for example, images indicative of introductions of the contents of games and explanations about the rules of games.

Further, a speaker 29 is provided in the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 includes a fluorescent display and the like, and displays, for example, data read by the card reader 36 or data inputted by the player via the key pad 38. The key pad 38 is used for inputting a command and data concerning issuing of a ticket, and the like.

Figure 4:
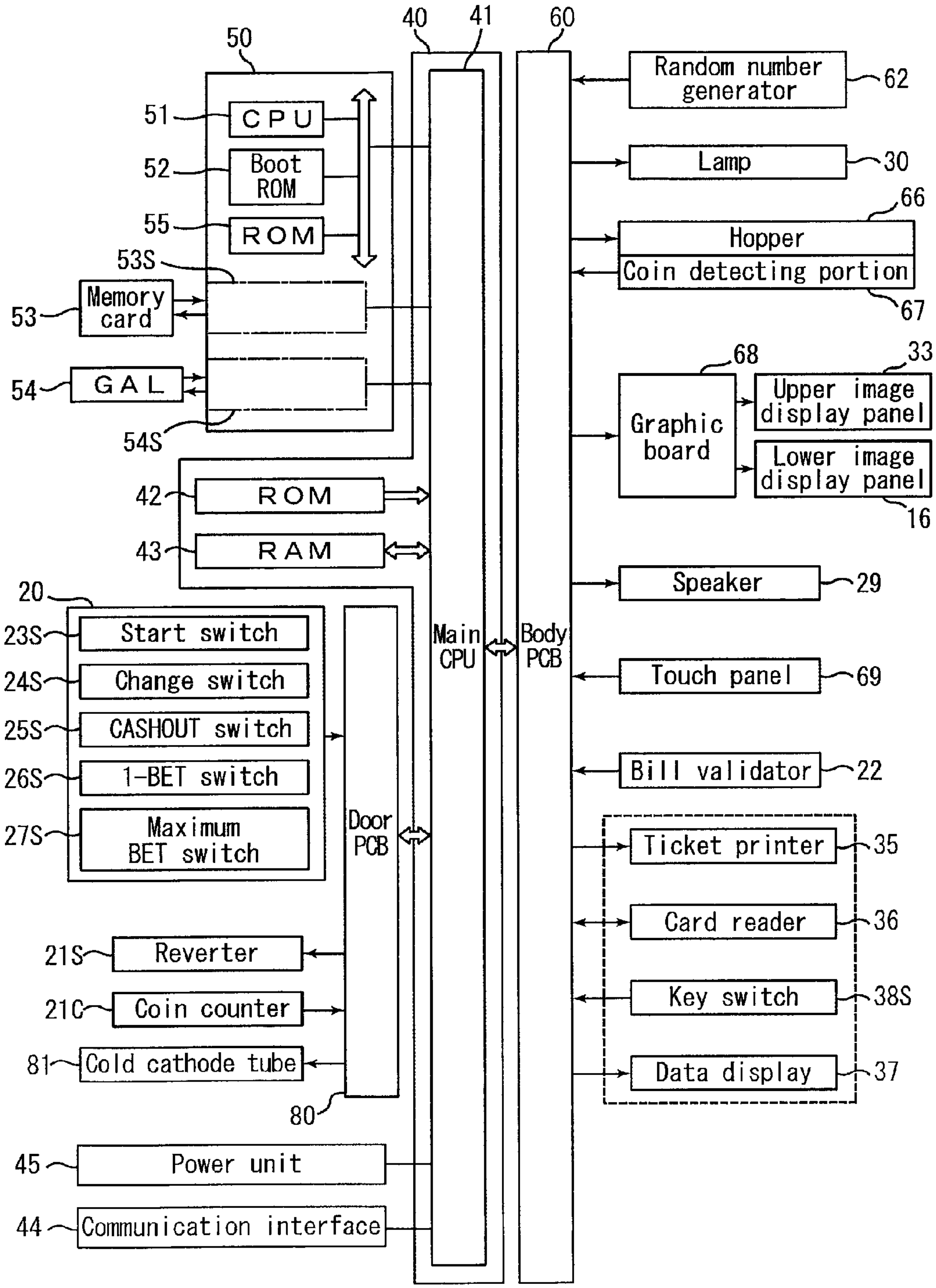
FIG. 4 is a block diagram illustrating an internal configuration of the slot machine shown in FIG. 3.

FIG. 4 is a block diagram showing an internal configuration of the slot machine shown in FIG. 3.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 includes a nonvolatile memory such as CompactFlash (registered trade mark), and stores a game program. The game program includes a symbol determination program. The symbol determination program is a program for determining symbols to be rearranged in the display blocks 28.

Further, the card slot 53S is configured so as to allow the memory card 53 to be inserted thereinto or removed therefrom, and is connected to the mother board 40 by an IDE bus. Therefore, the type and contents of a game played on the slot machine 10 can be changed by removing the memory card 53 from the card slot 53S, writing another game program into the memory card 53, and inserting the memory card 53 into the card slot 53S. The game program includes a program according to progress of the game. Further, the game program includes image data and sound data to be outputted during the game.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50.

The mother board 40 is configured using a commercially available general-purpose mother board (a print wiring board on which fundamental components of a personal computer are mounted), and provided with a main CPU 41, a ROM (Read Only Memory) 42, a RAM (Random Access Memory) 43, and a communication interface 44. The mother board 40 corresponds to the controller of the present invention.

The ROM 42 comprises a memory device such as a flash memory, and stores a program such as a BIOS (Basic Input/

Output System) executed by the main CPU 41 and permanent data. When the BIOS is executed by the main CPU 41, processing for initializing a predetermined peripheral device is conducted, concurrently with start of processing for loading the game program stored in the memory card 53 via the gaming board 50. It is to be noted that, in the present invention, the ROM 42 may or may not be data rewritable one.

The ROM 42 stores odds data indicative of correspondence relationships among types and the numbers of rearranged normal symbols and amounts of payouts (see FIG. 7), and the like.

The RAM 43 stores data and a program to be used at the time of operation of the main CPU 41. Further, the RAM 43 is capable of storing a game program.

Moreover, the RAM 43 stores data of the number of credits, the numbers of coin-ins and coin-outs in one game, and the like. The RAM 43 also stores a maximum number of special symbols.

Moreover, the mother board 40 is connected with a later-described body PCB (Printed Circuit Board) 60 and a door PCB 80 through respective USBs. Further, the mother board 40 is connected with a power supply unit 45 and the communication interface 44.

The body PCB 60 and the door PCB 80 are connected with an instrument and a device that generate an input signal to be inputted into the main CPU 41 and an instrument and a device operations of which are controlled by a control signal outputted from the main CPU 41. The main CPU 41 executes the game program stored in the RAM 43 based on the input signal inputted into the main CPU 41, and thereby executes the predetermined arithmetic processing, stores the result thereof into the RAM 43, or transmits a control signal to each instrument and device as processing for controlling each instrument and device.

The body PCB 60 is connected with a lamp 30, a hopper 66, a coin detecting portion 67, a graphic board 68, the speaker 29, the touch panel 69, the bill validator 22, the ticket printer 35, the card reader 36, a key switch 38S, the data display 37, and a random number generator 62. The lamp 30 is lighted in a predetermined pattern based on control signals outputted from the main CPU 41.

The hopper 66 is installed inside the cabinet 11, and pays out a predetermined number of coins from a coin payout exit 19 to the coin tray 18, based on the control signal outputted from the main CPU 41. The coin detecting portion 67 is provided inside the coin payout exit 19, and outputs an input signal to the main CPU 41 in the case of detecting payout of the predetermined number of coins from the coin payout exit 19.

The random number generator 62 generates a random number at a predetermined timing.

The graphic board 68 controls image display to the upper image display panel 33 and the lower image display panel 1016 based on the control signal outputted from the main CPU 41. In the respective display blocks 28 on the lower image display panel 1016, symbols are displayed in a scrolling manner or in a stopped state. The number of credits stored in the RAM 43 is displayed to the number-of-credits display portion 31 of the lower image display panel 1016. Further, the number of coin-outs is displayed to the number-of-payouts display portion 32 of the lower image display panel 1016.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

Based on the control signal outputted from the main CPU 41, the ticket printer 35 prints on a ticket a barcode as coded data of the number of credits stored in the RAM 43, a date, and an identification number of the slot machine 10, and the like, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38, based on the control signal outputted from the main CPU 41.

The door PCB 80 is connected with the control panel 20, a reverter 21S, a coin counter 21C, and a cold cathode tube 81. The control panel 20 is provided with a start switch 23S corresponding to the start button 23, a change switch 24S corresponding to the change button 24, a CASHOUT switch 25S corresponding to the CASHOUT button 25, a 1-BET switch 26S corresponding to the 1-BET button 26, and a maximum BET switch 27S corresponding to the maximum BET button 27. Each of the switches 23S to 27S outputs an input signal to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 1016 and the upper image display panel 33, and lighted up based on the control signal outputted from the main CPU 41.

Figure 5:
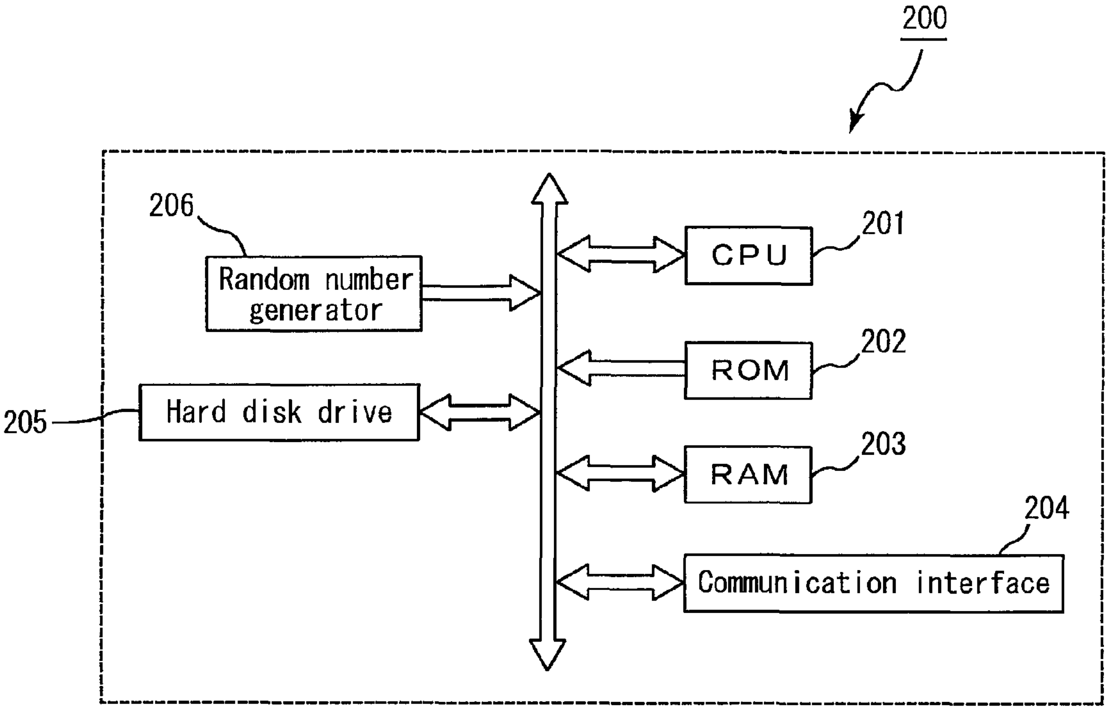
FIG. 5 is a block diagram illustrating an internal configuration of a control device forming the gaming system according to the first embodiment of the present invention.

FIG. 5 is a block diagram illustrating an internal configuration of a control device forming the gaming system according to the first embodiment of the present invention.

The control device 200 includes a CPU 201, a ROM 202, a RAM 203, a communication interface 204, a random number generator 206, and a hard disk drive 205 as a memory. The random number generator 206 generates a random number at a predetermined timing. The communication interface 204 is connected, through communication lines 101, to the communication interfaces 44 in the respective slot machines 10. The ROM 202 stores a system program for controlling the operation of a processor, permanent data, and the like. Further, the RAM 203 temporarily stores cumulative-value data indicative of the cumulative value, data received from each of the slot machines 10, and the like.

The CPU 201 corresponds to the processor in the present invention.

In the hard disk drive 205, there is stored number-of-special-symbols determination table data to be referred to in determination of the number of special symbols.

Further, in the hard disk drive 205, data indicative of the predetermined value is stored.

It is to be noted that the predetermined values in the first embodiment are 100, 200, 300, 400, 500, 600, 700, 800, 900, 1000, 1100, 1200, 1300, 1400, 1500, 1600, 1700, 1800, 1900, and 2000.

Figure 6:
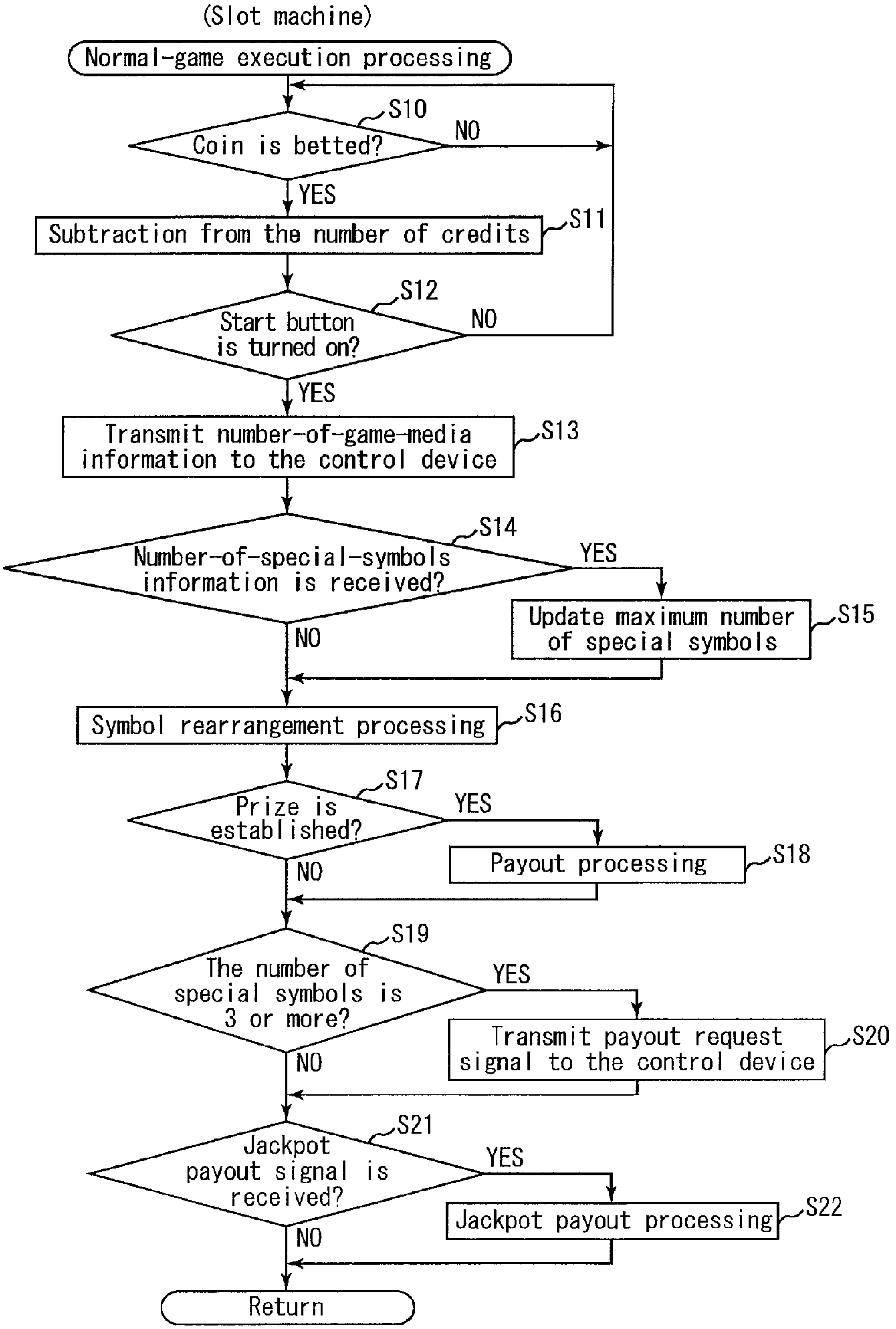
FIG. 6 is a flowchart illustrating a subroutine of normal-game execution processing in the first embodiment.

FIG. 6 is a flowchart illustrating a subroutine of normal-game execution processing in the first embodiment.

FIG. 7 is a view illustrating correspondence relationships among types and the numbers of rearranged normal symbols and amounts of payouts, in the first embodiment.

First, the main CPU 41 determines whether or not a coin has been betted (step S10). In this processing, the main CPU 41 determines whether or not it has received an input signal that is outputted from the 1-BET switch 26S when the 1-BET button 26 is operated, or an input signal that is outputted from the maximum BET switch 27S when the maximum BET button 27 is operated. When determining that the coin has not been betted, the CPU 41 returns the processing to step S10.

On the other hand, when determining that the coin has been betted in step S10, the main CPU 41 conducts processing for making a subtraction from the number of credits stored in the RAM 43 according to the number of betted coins (step S11). It is to be noted that, when the number of coins to be betted is larger than the number of credits stored in the RAM 43, the main CPU 41 returns the processing to step S10 without conducting the processing for making a subtraction from the number of credits stored in the RAM 43. Further, when the number of coins to be betted exceeds the upper limit of the number of coins that can be betted in one game (50 coins in the present embodiment), the main CPU 41 advances the processing to step S12 without conducting the processing for making a subtraction from the number of credits stored in the RAM 43.

Next, the main CPU 41 determines whether or not the start button 23 has been turned on (step S12). In this processing, the main CPU 41 determines whether or not it has received an input signal that is outputted from the start switch 23S when the start button 23 is pressed.

When the main CPU 41 determines that the start button 23 has not been turned on, the processing is returned to step S10.

It is to be noted that, when the start button 23 is not turned on (e.g. when the start button 23 is not turned on and a command to end the game is inputted), the main CPU 41 cancels a subtraction result in step S11.

On the other hand, when determining in step S12 that the start button 23 has been turned on, the main CPU 41 transmits the number-of-game-media information indicative of the number of betted coins to the control device 200 (step S13). The number-of-game-media information includes the identification number of the slot machine 10.

The main CPU 41 then determines whether or not it has received number-of-special-symbols information from the control device 200 (step S14). When determining that the main CPU 41 has not received number-of-special-symbols information from the control device 200, the main CPU 41 shifts the processing to step S16. The number-of-special-symbols information is information indicative of the maximum number of special symbols, which has been determined by the control device 200 and is the maximum number of the special symbols that can be rearranged to the display blocks 28.

On the other hand, when determining in step S14 that the main CPU 41 has received number-of-special-symbols information from the control device 200, the main CPU 41 stores the numeric value indicated by the received number-of-special-symbols information into the RAM 43, as the maximum number of special symbols (step S15).

Next, the main CPU 41 executes symbol rearrangement processing (step S16).

In this processing, the main CPU 41 starts with determination of the number of special symbols to be scroll-displayed in the display blocks 28, based on the maximum number of special symbols stored in the RAM 43. Namely, when the maximum number of special symbols is five, the main CPU 41 determines that the number of special symbols to be scroll-displayed is five. The main CPU 41 then starts scroll-display of normal symbols and special symbols of the determined number, in the display blocks 28. Then, the main CPU 41 executes the aforementioned symbol determination program, so as to determine the symbols to be rearranged, and then rearranges the symbols in the display blocks 28.

Next, the main CPU 41 determines whether or not a prize has been established (step S17). Here, the establishment of a prize refers to a rearrangement of at least one combination of three or more normal symbols of the same type out of "RIBBON", "HEART", "STAR", "MOON", "SUN", "JEWEL", "CROWN", and "SMILE", in the display blocks 28 (see FIG. 7). In this processing, the main CPU 41 counts the number of normal symbols for each type out of the symbols rearranged in step S16. Then, the main CPU 41 determines whether or not the counted number is three or more.

When determining that a prize has been established, the main CPU 41 executes processing relating to the payout of coins (step S18). In the processing, the main CPU 41 determines the amount of payout based on the numbers of rearranged normal symbols with reference to the odds data stored in the ROM 42.

The odds data is data indicative of the correspondence relationships between the numbers of normal symbols rearranged in the display blocks 28 and the amounts of payouts (see FIG. 7).

For example, in the case that two coins have been betted, when three symbols of "SUN" are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

When determining in step S17 that a prize has not been established, or after executing the processing of step S18, the main CPU 41 determines whether or not the number of special symbols out of the symbols rearranged in step S16 is three or more (step S19). When determining that the number of special symbols is not three or more, the main CPU 41 shifts the processing to step S21.

On the other hand, when determining in step S19 that the number of special symbols is three or more, the main CPU 41 transmits a payout request signal to the control device 200 (step S20). A payout request signal is a signal requesting the control device 200 to pay out the jackpot. A payout request signal includes the number of rearranged special symbols and the identification number of the slot machine 10.

Next, the main CPU 41 determines whether or not it has received a jackpot payout signal from the control device 200 (step S21). When determining that the main CPU 41 has received a jackpot payout signal from the control device 200, the main CPU 41 executes jackpot payout processing (step S22). In the processing, the main CPU 41 determines an amount of payout, based on the number of payouts included in the received jackpot payout signal.

In the case of accumulating coins, the main CPU 41 conducts the processing of adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

When determining that the main CPU 41 has not received a jackpot payout signal from the control device 200 in step S21 or after executing the processing of step S22, the main CPU 41 completes the present subroutine.

Next, there is described processing performed in the control device 200.

Figure 8:
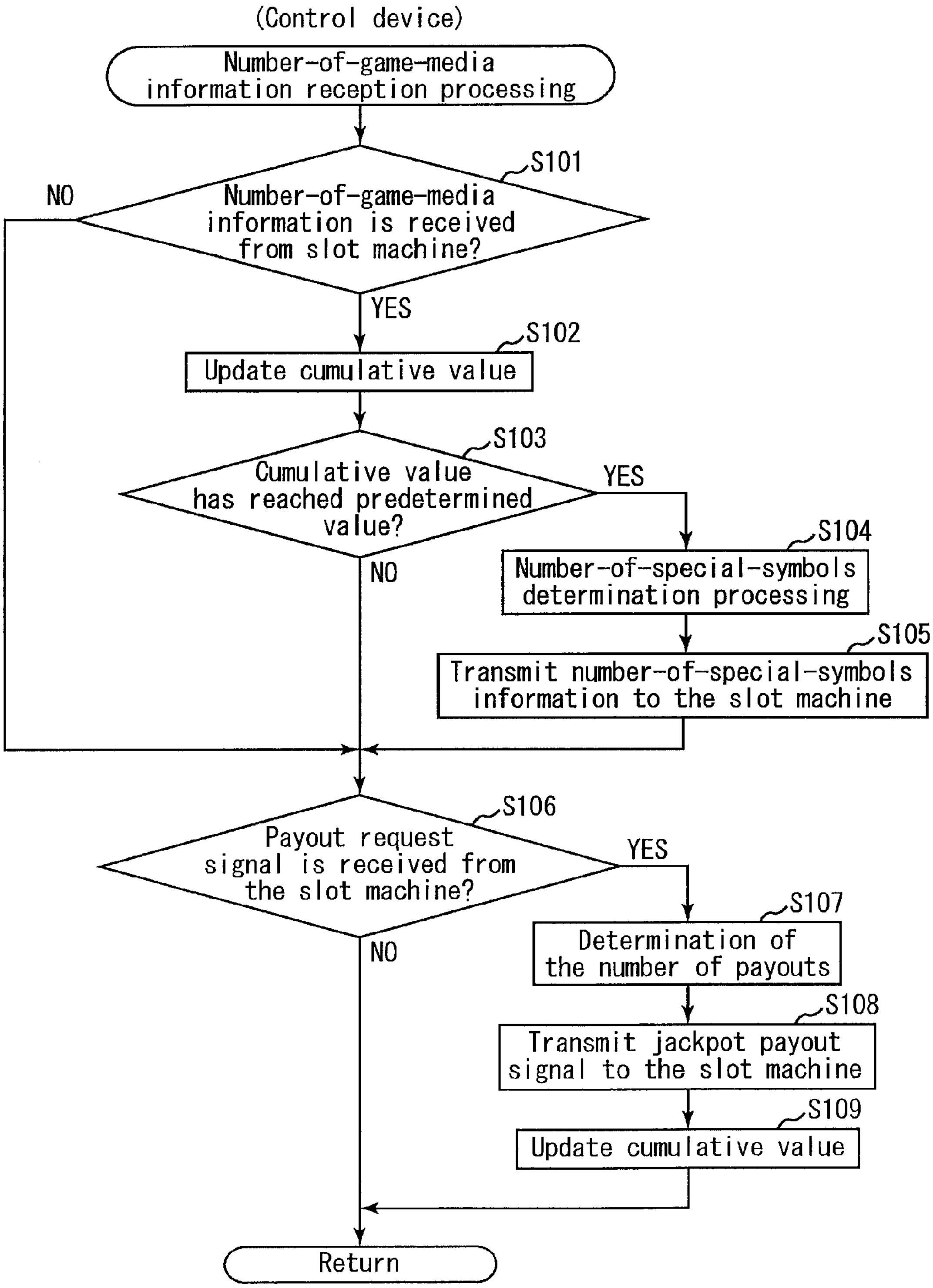
FIG. 8 is a flowchart illustrating a subroutine of number-of-game-media information reception processing in the first embodiment.

FIG. 8 is a flowchart illustrating a subroutine of number-of-game-media information reception processing in the first embodiment.

First, the CPU 201 determines whether or not it has received number-of-game-media information from the slot machine 10 at a predetermined timing (step S101).

When determining that the CPU 201 has not received number-of-game-media information, the CPU 201 shifts the processing to step S106.

On the other hand, when determining that the CPU 201 has received number-of-game-media information, the CPU 201 adds a part (10% in the present embodiment) of the number of coins indicated by the received number-of-game-media information, to the cumulative value indicated by the cumulative-value data stored in the RAM 203, sets the numeric value obtained by the addition as an updated cumulative value, and stores the cumulative-value data indicative of the updated cumulative value into the RAM 203 (step S102). It is to be noted that the digits after the decimal point are truncated in the processing.

Next, the CPU 201 determines whether or not the cumulative value has reached the predetermined value, based on the cumulative-value data stored in the RAM 203 (step S103). When determining that the cumulative value has not reached the predetermined value, the CPU 201 shifts the processing to step S106.

It is to be noted that, as already described, the predetermined values in the first embodiment are 100, 200, 300, 400, 500, 600, 700, 800, 900, 1000, 1100, 1200, 1300, 1400, 1500, 1600, 1700, 1800, 1900, and 2000. Namely, the number of special symbols changes every time the cumulative value accumulates by 100.

On the other hand, when determining that the cumulative value has reached the predetermined value, the CPU 201 executes number-of-special-symbols determination processing (step S104). In the processing, the CPU 201 first extracts the random number generated by the random number generator 206. The CPU 201 then determines the number of special symbols, based on the extracted random number, the cumulative value indicated by the cumulative-value data stored in the RAM 203, and a number-of-special-symbols determination table (see FIG. 9) stored in the hard disk drive 205. The number of special symbols determined in step S104 corresponds to the aforementioned maximum number of special symbols.

FIG. 9 is a view illustrating number-of-special-symbols determination table in the first embodiment.

As illustrated in FIG. 9, there are five types of number-of-special-symbols determination tables. The number-of-special-symbols determination table to be selected changes according to the cumulative value; the tables are set such that the number of special symbols increases easily as the cumulative value becomes larger.

As illustrated in FIG. 9, random number values to be used in the number-of-special-symbols determination tables are 65536 numeric values that fall in the numerical range of 0 to 65535, and each of the numeric values is associated with one of the numbers of special symbols. When for example a random number associated with the number-of-special-symbols "3" is extracted, the number of special symbols is determined to be three. It is to be noted that the figure shows the probabilities for the respective numbers of special symbols to be selected.

Further, the number of special symbols not only increases but also decreases or stays constant, as is obvious from FIG. 9. As thus described, since changes of the number of special symbols are not easily predicted by the player, it is possible to enhance interesting aspects of the game.

Returning to FIG. 8, the CPU 201 transmits to the slot machines 10 the number-of-special-symbols information indicative of the maximum number of special symbols, which is the number of special symbols determined in step S104 (step S105).

Next, the CPU 201 determines whether or not it has received a payout request signal from the slot machine 10 (step S106). When determining that the CPU 201 has not received a payout request signal, the CPU 201 completes the present subroutine.

On the other hand, when determining that the CPU 201 has received a payout request signal, the CPU 201 determines the number of payouts based on the received payout request signal (step S107). In the processing, the CPU 201 determines the number of payouts, based on the number of rearranged special symbols included in the payout request signal and on the cumulative value indicated by the cumulative-value data stored in the RAM 203. More specifically, when the number of rearranged special symbols is three, the CPU 201 determines that the number of payouts is to be 30% of the cumulative value indicated by the cumulative-value data stored in the RAM 203. When the number of rearranged special symbols is four, the CPU 201 determines that the number of payouts is to be 60% of the cumulative value indicated by the cumulative-value data stored in the RAM 203. When the number of rearranged special symbols is five, the CPU 201 determines that the number of payouts is to be 80% of the cumulative value indicated by the cumulative-value data stored in the RAM 203. When the number of rearranged special symbols is six or more, the CPU 201 determines that the number of payouts is to be the whole cumulative value indicated by the cumulative-value data stored in the RAM 203. It is to be noted that digits after the decimal point are truncated in this processing.

The CPU 201 transmits a jackpot payout signal to the slot machine 10 that has transmitted the payout request signal received in step S106 (step S108). The jackpot payout signal includes the number of payouts determined in step S107.

The CPU 201 then sets as an updated cumulative value a value obtained by subtracting the number of payouts determined in step S107 from the cumulative value indicated by the cumulative-value data stored in the RAM 203, and stores the cumulative-value data indicative of the updated cumulative value into the RAM 203 (step S109).

When determining in step S106 that the CPU 201 has not received a payout request signal or after executing the processing of step S109, the CPU 201 completes the present subroutine.

As described above, according to the gaming system 100 relating to the first embodiment, the control device 200 cumulatively counts as the cumulative value a part of the game media betted in the respective slot machines 10, and determines the number of special symbols that can be displayed to the display blocks 28 based on the cumulative value obtained by the counting.

Since the number of special symbols that can be displayed to the display blocks 28 changes based on the cumulative value, the contents of the game change according to the cumulative value; it is therefore possible to make the player find the game interesting.

Further, an increase in the number of special symbols to be displayed to the display blocks 28 generates an advantageous state for the player, and a decrease in the number of special symbols to be displayed to the display blocks 28 generates a disadvantageous state for the player; it is therefore possible to make the player alternate between hope and despair, and to make him or her play the game for a long period of time without making him or her tired of the game.

According to the gaming system 100 relating to the first embodiment, the number of special symbols that can be displayed to the display blocks 28 changes when the cumulative value reaches the predetermined value. Thus, change in the number of special symbols displayed to the display blocks 28 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the first embodiment, the number of special symbols that can be displayed to the display blocks 28 changes a plurality of times before a payout of the jackpot. It is possible to make the player alternate between hope and despair every time the number of special symbols changes, and to make the player immersed in the game.

Moreover, it is possible to further enhance interesting aspects of the game by allowing the number of special symbols that can be displayed to the display blocks 28 to change a plurality of times.

In the first embodiment, there has been described a case where the normal symbols rearranged in the display blocks 28 are all scatter symbols. However, normal symbols in the present invention are not limited to the scatter symbols. For example, a pay line may be provided and a prize may be established when a certain combination of a plurality of symbols is rearranged along the pay line. Also, for example, symbols which cause establishment of a prize based on the pay line may be combined with scatter symbols.

In the first embodiment, a case has been described where the main CPU 41 transmits the number-of-game-media information indicative of the number of betted coins to the control device 200, and the CPU 201 adds the value corresponding to a part (10% in the present embodiment) of the number of coins indicated by the received number-of-game-media information, to the cumulative value indicated by the cumulative-value data stored in the RAM 203, sets as an updated cumulative value the numeric value obtained by the addition, and stores the cumulative-value data indicative of the updated cumulative value into the RAM 203. However, in the present invention, a configuration may be adopted where the main CPU 41 calculates the value corresponding to 10% of the betted coins and transmits the number-of-game-media information indicative of the calculated numeric value to the control device 200, and the CPU 201 adds the numeric value indicated by the received number-of-game-media information to the cumulative value indicated by the cumulative-value data stored in the RAM 203, sets as an updated cumulative value the numeric value obtained by the addition, and stores the cumulative-value data indicative of the updated cumulative value.

In the first embodiment, a case has been described where the predetermined values are set at every 100 values. However, in the present invention, the way of setting the predetermined values is not particularly limited, and the predetermined values may be 100, 300, 600, 1000, and 1500.

In the first embodiment, a case has been described where the CPU 201 adds the value corresponding to a part (10% in the present embodiment) of the number of coins indicated by the received number-of-game-media information, to the cumulative value indicated by the cumulative-value data stored in the RAM 203. However, in the present invention, the ratio for a part of the number of betted game media is not particularly limited, and may be, for example, 20% of the number of betted game media.

Second Embodiment

In the first embodiment described above, a case has been described where eight types of normal symbols of "RIBBON", "HEART", "STAR", "MOON", "SUN", "JEWEL", "CROWN", and "SMILE" are all scatter symbols, and where a symbol of "JP", being a jackpot trigger symbol, is a special symbol.

In a second embodiment, five types of symbols of "HEART", "STAR", "SUN", "JEWEL", and "SMILE" are special symbols, and three types of symbols of "RIBBON", "MOON", and "CROWN" are normal symbols irrelative to payouts, and a symbol of "JP" is a jackpot trigger symbol. It is to be noted that the special symbols are scatter symbols, in the second embodiment.

Further, it is to be noted that constituent elements corresponding to those of the gaming system 100 according to the aforementioned first embodiment will be provided with the same signs, in descriptions given below.

Furthermore, omitted are descriptions of the parts to which the descriptions in the aforementioned first embodiment are applicable in the second embodiment described below.

Figure 10:
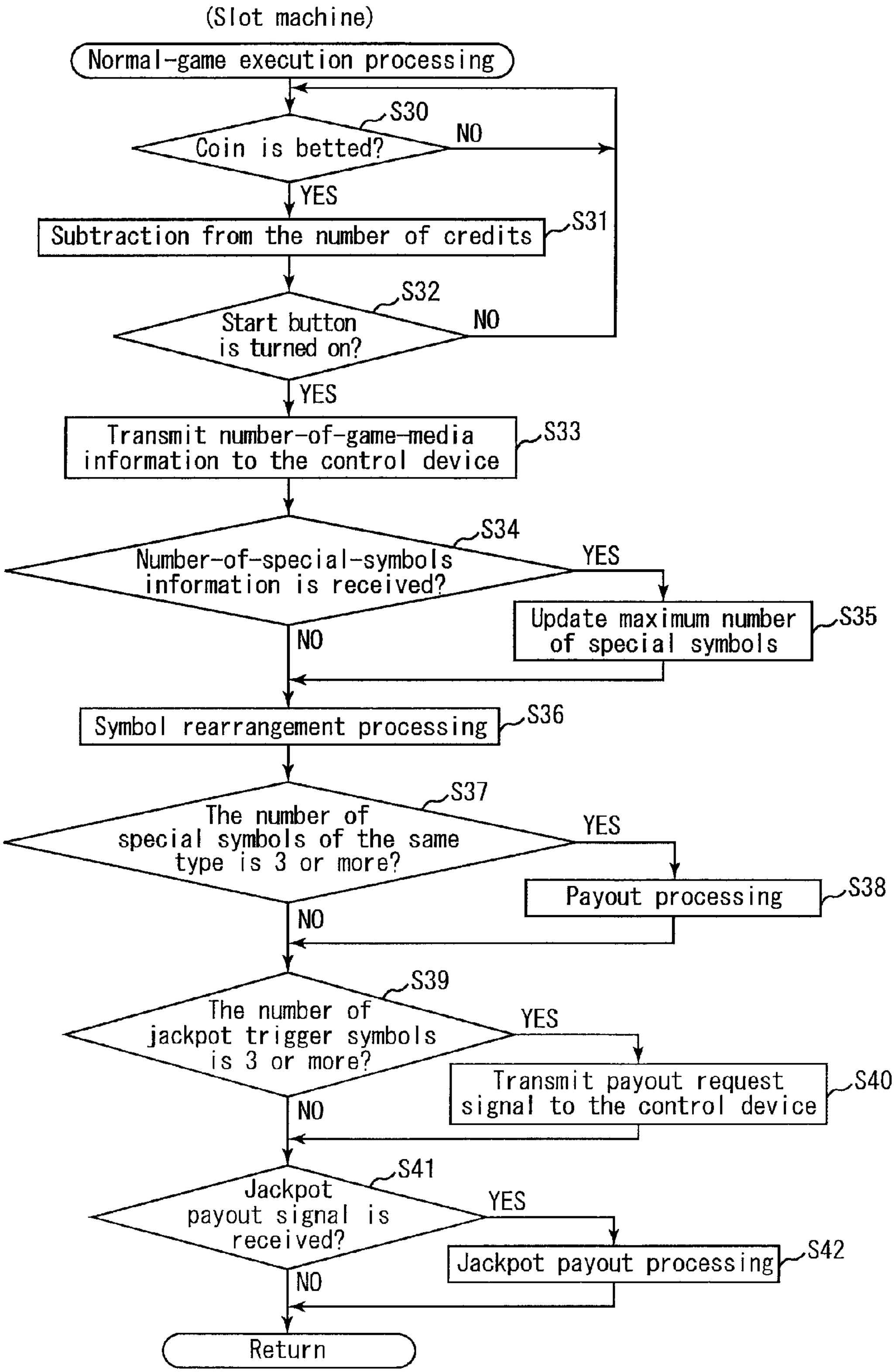
FIG. 10 is a flowchart illustrating a subroutine of normal-game execution processing in a second embodiment.

FIG. 10 is a flowchart illustrating a subroutine of normal-game execution processing in the second embodiment.

FIG. 11 is a view illustrating correspondence relationships among types and the numbers of rearranged special symbols and amounts of payouts, in the second embodiment.

Since the processing of step S30 to step S35 is similar to the processing of step S10 to step S15, descriptions thereof are omitted.

Next, the main CPU 41 executes symbol rearrangement processing (step S36).

In this processing, the main CPU 41 starts with determination of the number of special symbols of each type to be scroll-displayed in the display blocks 28, based on the maximum number of special symbols stored in the RAM 43. Namely, when the maximum number of special symbols is five, the main CPU 41 determines that the number of special symbols of each type to be scroll-displayed is five. The main CPU 41 then starts scroll-display of normal symbols, special symbols of the determined number and the symbols of "JP" being jackpot trigger symbols, in the display blocks 28. Then, the main CPU 41 executes the aforementioned symbol determination program, so as to determine the symbols to be rearranged, and then rearranges the symbols in the display blocks 28.

Next, the main CPU 41 determines whether or not three or more special symbols of the same type are rearranged (step S37). Namely, the main CPU 41 determines whether or not at least one combination of three or more special symbols of the same type out of "HEART", "STAR", "SUN", "JEWEL", and "SMILE", is rearranged in the display blocks 28 (see FIG. 11). In this processing, the main CPU 41 counts the number of special symbols for each type out of the symbols rearranged in step S36. Then, the main CPU 41 determines whether or not the counted number is three or more.

When determining that three or special symbols of the same type are rearranged, the main CPU 41 executes processing relating to the payout of coins (step S38). In the processing, the main CPU 41 determines the amount of payout based on the numbers of rearranged special symbols with reference to the odds data stored in the ROM 42. The odds data is data indicative of the correspondence relationships between the numbers of special symbols rearranged in the display blocks 28 and the amounts of payouts (see FIG. 11).

For example, when two coins have been betted and thereafter three symbols of "SUN" are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

It is to be noted that the odds data indicative of the correspondence relationships among the types and the numbers of rearranged special symbols and the amounts of payouts (see FIG. 11) is stored in the ROM 42.

When determining in step S37 that three or more special symbols of the same type are not rearranged or after executing the processing of step S38, the main CPU 41 determines whether or not the number of symbols of "JP" being jackpot trigger symbols out of the symbols rearranged in step S36 is three or more (step S39). When determining that the number of symbols of "JP" being jackpot trigger symbols is not three or more, the main CPU 41 shifts the processing to step S41.

On the other hand, when determining in step S39 that the number of symbols of "JP" being jackpot trigger symbols is three or more, the main CPU 41 transmits a payout request signal to the control device 200 (step S40). A payout request signal is a signal requesting the control device 200 to pay out the jackpot. A payout request signal includes the number of rearranged symbols of "JP" being jackpot trigger symbols and the identification number of the slot machine 10.

Since the processing of step S41 to step S42 is similar to the processing of step S21 to step S22 in FIG. 6, descriptions thereof are omitted.

Number-of-game-media information reception processing in the second embodiment is substantially the same as the number-of-game-media information reception processing in the first embodiment, but is different in the point described below.

In step S107 in the first embodiment, the number of payouts is determined based on the number of rearranged special symbols included in the payout request signal; however, in step S107 in the second embodiment, the number of payouts is determined based on the number of rearranged jackpot trigger symbols included in the payout request signal.

Further, in the second embodiment, the number-of-special-symbols determination table data stored in the hard disk drive 205, being the data to be referred in the number-of-game-media information reception processing, is different from the number-of-special-symbols determination table data stored in the hard disk drive 205 in the first embodiment.

FIG. 12 is a view illustrating number-of-special-symbols determination table in the second embodiment.

As illustrated in FIG. 12, there are five types of number-of-special-symbols determination tables. The number-of-special-symbols determination table to be selected changes according to the cumulative value; the tables are set such that the number of special symbols increases easily as the cumulative value becomes larger.

As illustrated in FIG. 12, random number values to be used in the number-of-special-symbols determination tables are 65536 numeric values that fall in the numerical range of 0 to 65535, and each of the numeric values is associated with one of the numbers of special symbols. When for example a random number associated with the number-of-special-symbols "8" is extracted, the number of special symbols is determined to be eight. It is to be noted that the figure shows the probabilities for the respective numbers of special symbols to be selected.

Further, the number of special symbols not only increases but also decreases or stays constant, as is obvious from FIG. 12. As thus described, since changes of the number of special symbols are not easily predicted by the player, it is possible to enhance interesting aspects of the game.

As described above, according to the gaming system 100 relating to the second embodiment, the control device 200 cumulatively counts as the cumulative value a part of the game media betted in the respective slot machines 10, and determines the number of special symbols that can be displayed to the display blocks 28 based on the cumulative value obtained by the counting.

Since the number of special symbols that can be displayed to the display blocks 28 changes based on the cumulative value, the contents of the game change according to the cumulative value; it is therefore possible to make the player find the game interesting.

Further, an increase in the number of special symbols to be displayed to the display blocks 28 generates an advantageous state for the player, and a decrease in the number of special symbols to be displayed to the display blocks 28 generates a disadvantageous state for the player; it is therefore possible to make the player alternate between hope and despair, and to make him or her play the game for a long period of time without making him or her tired of the game.

According to the gaming system 100 relating to the second embodiment, the number of special symbols that can be displayed to the display blocks 28 changes when the cumulative value reaches the predetermined value. Thus, change in the number of special symbols displayed to the display blocks 28 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the second embodiment, the number of special symbols that can be displayed to the display blocks 28 changes a plurality of times before a payout of the jackpot. It is possible to make the player alternate between hope and despair every time the number of special symbols changes, and to make the player immersed in the game.

Moreover, it is possible to further enhance interesting aspects of the game by allowing the number of special symbols that can be displayed to the display blocks 28 to change a plurality of times.

Third Embodiment

In the first embodiment described above, a case has been described where eight types of normal symbols of "RIBBON", "HEART", "STAR", "MOON", "SUN", "JEWEL", "CROWN", and "SMILE" are all scatter symbols, and where a symbol of "JP", being a jackpot trigger symbol, is a special symbol.

In a third embodiment, eight types of symbols of "RIBBON", "HEART", "STAR", "MOON", "SUN", "JEWEL", "CROWN", and "SMILE" are special symbols, and a symbol of "JP" is a jackpot trigger symbol. It is to be noted that the special symbols are scatter symbols, in the third embodiment.

In the first embodiment described above, a case has been described where the number of special symbols changes based on the cumulative value. However, in the third embodiment, a specific number indicative of the minimum number of special symbols required for establishment of a prize changes based on the cumulative value.

It is to be noted that constituent elements corresponding to those of the gaming system 100 according to the aforementioned first embodiment will be provided with the same signs, in descriptions given below.

Further, omitted are descriptions of the parts to which the descriptions in the aforementioned first embodiment are applicable in the third embodiment described below.

Figure 13:
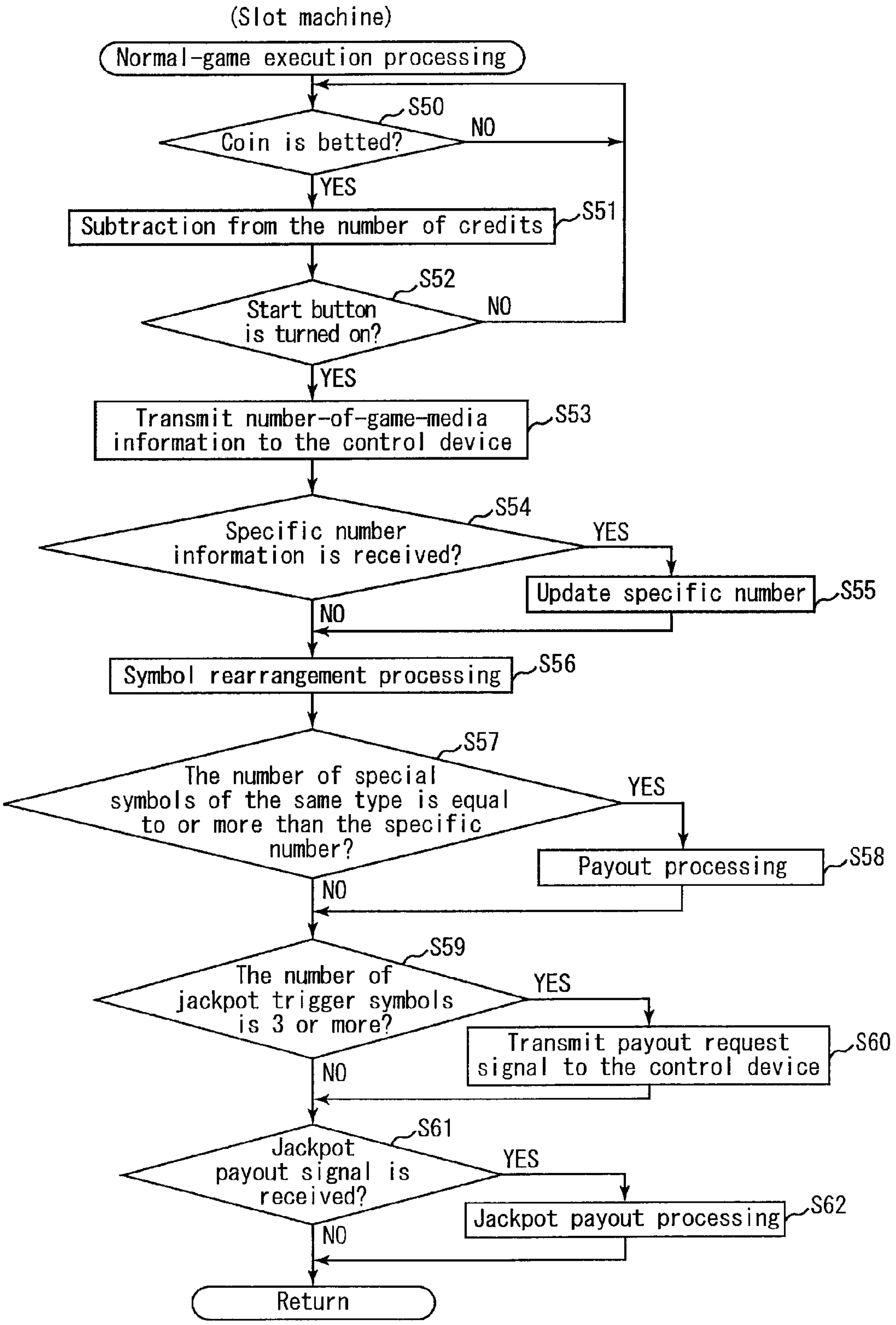
FIG. 13 is a flowchart illustrating a subroutine of normal-game execution processing in a third embodiment.

FIG. 13 is a flowchart illustrating a subroutine of normal-game execution processing in the third embodiment.

FIG. 14 is a view illustrating correspondence relationships among types and the numbers of rearranged special symbols and amounts of payout, in the third embodiment.

Since the processing of step S50 to step S53 is similar to the processing of step S10 to step S13 in FIG. 6, descriptions thereof are omitted.

The main CPU 41 then determines whether or not it has received specific-number information from the control device 200 (step S54). When determining that the main CPU 41 has not received specific-number information from the control device 200, the main CPU 41 shifts the processing to step S56. The specific-number information is information indicative of the specific number, which is the minimum number of special symbols required for establishment of a prize.

On the other hand, when determining in step S54 that the main CPU 41 has received specific-number information from the control device 200, the main CPU 41 stores the numeric value indicated by the received specific-number information into the RAM 43, as the specific number (step S55).

Next, the main CPU 41 executes symbol rearrangement processing (step S56).

In this processing, the main CPU 41 starts with scroll-display of special symbols and symbols of "JP" being jackpot trigger symbols, in the display blocks 28. Then, the main CPU 41 executes the aforementioned symbol determination program, so as to determine the symbols to be rearranged, and then rearranges the symbols in the display blocks 28.

Next, the main CPU 41 determines whether or not special symbols of the same type in number equal to or more than the specific number are rearranged (step S57). In this processing, the main CPU 41 determines whether or not at least one combination of special symbols of the same type in number equal to or more than the specific number out of "RIBBON", "HEART", "STAR", "MOON", "SUN", "JEWEL", "CROWN", and "SMILE" is rearranged in the display blocks 28. In this processing, the main CPU 41 counts the number of special symbols for each type out of the symbols rearranged in step S56. Then, the main CPU 41 determines whether or not the counted number is equal to or more than the specific number stored in the RAM 43.

When special symbols of the same type are rearranged in number equal to or more than the specific number, the main CPU 41 executes processing relating to the payout of coins (step S58). In the processing, the main CPU 41 determines the amount of payout based on the numbers of rearranged special symbols with reference to the odds data stored in the ROM 42. The odds data is data indicative of the correspondence relationships between the numbers of special symbols rearranged in the display blocks 28 and the amounts of payouts (see FIG. 14).

For example, in a case where the specific number is three, when two coins have been betted and thereafter three symbols of "SUN" are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

It is to be noted that the odds data indicative of the correspondence relationships among the types and the numbers of rearranged special symbols and the amounts of payouts (see FIG. 14) is stored in the ROM 42.

When determining in step S57 that special symbols of the same type in number equal to or more than the specific number are not rearranged, or after executing the processing of step S58, the main CPU 41 determines whether or not the number of symbols of "JP" being jackpot trigger symbols out of the symbols rearranged in step S56 is three or more (step S59). When determining that the number of symbols of "JP" being jackpot trigger symbols is not three or more, the main CPU 41 shifts the processing to step S61.

On the other hand, when determining in step S59 that the number of symbols of "JP" being jackpot trigger symbols is three or more, the main CPU 41 transmits a payout request signal to the control device 200 (step S60). A payout request signal is a signal requesting the control device 200 to pay out the jackpot. A payout request signal includes the number of rearranged symbols of "JP" being jackpot trigger symbols and the identification number of the slot machine 10.

Since the processing of step S61 to step S62 is similar to the processing of step S21 to step S22, descriptions thereof are omitted.

Next, there is described processing performed in the control device 200.

Figure 15:
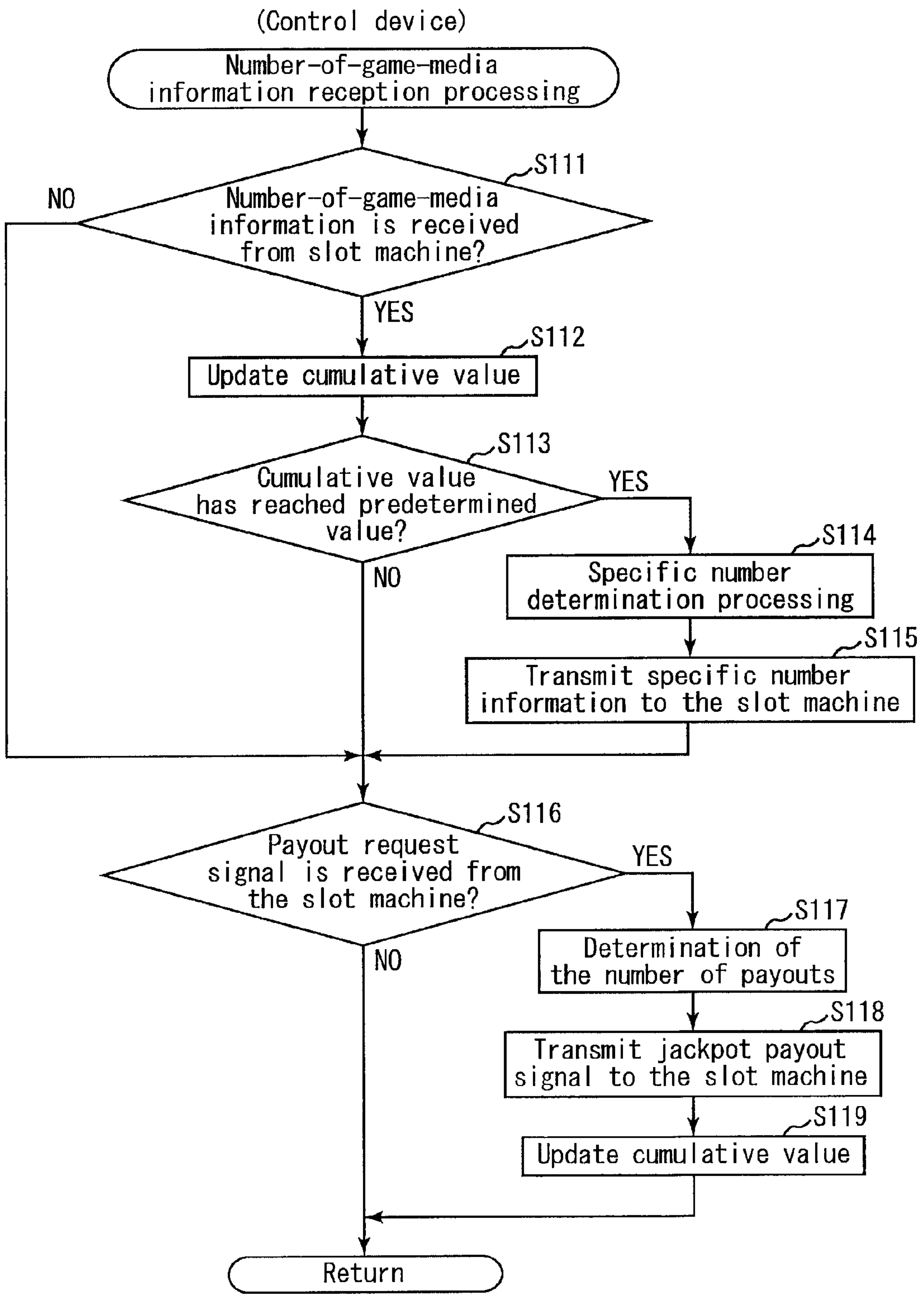
FIG. 15 is a flowchart illustrating a subroutine of number-of-game-media information reception processing in the third embodiment.

FIG. 15 is a flowchart illustrating a subroutine of number-of-game-media information reception processing in the third embodiment.

Since the processing of step S111 to step S112 is similar to the processing of step S101 to step S102 in FIG. 8, descriptions thereof are omitted.

Next, the CPU 201 determines whether or not the cumulative value has reached the predetermined value based on the cumulative-value data stored in the RAM 203 (step S113). When determining that the cumulative value has not reached the predetermined value, the CPU 201 shifts the processing to step S116.

It is to be noted that the predetermined values in the third embodiment are 100, 200, 300, 400, 500, 600, 700, 800, 900, 1000, 1100, 1200, 1300, 1400, 1500, 1600, 1700, 1800, 1900, and 2000.

Namely, the specific number changes every time the cumulative value accumulates by 100.

On the other hand, when determining that the cumulative value has reached the predetermined value, the CPU 201 executes specific-number determination processing (step S114). In the processing, the CPU 201 first extracts the random number generated by the random number generator 206. The CPU 201 then determines the specific number, based on the extracted random number, the cumulative value indicated by the cumulative-value data stored in the RAM 203, and a specific-number determination table (see FIG. 16) stored in the hard disk drive 205.

FIG. 16 is a view illustrating specific-number determination table in the third embodiment.

The specific-number determination table is stored in the hard disk drive 205.

As illustrated in FIG. 16, there are five types of specific-number determination tables. The specific-number determination table to be selected changes according to the cumulative value; and the tables are set such that the specific number increases easily as the cumulative value becomes larger.

As illustrated in FIG. 16, random number values to be used in the specific-number determination tables are 65536 numeric values that fall in the numerical range of 0 to 65535, and each of the numeric values is associated with one of the specific numbers. When for example a random number associated with the specific number "3" is extracted, the specific number is determined to be three. It is to be noted that the figure shows the probabilities for the respective specific numbers to be selected.

Further, the specific number not only increases but also decreases or stays constant, as is obvious from FIG. 9. As thus described, since changes of the specific number are not easily predicted by the player, it is possible to enhance interesting aspects of the game.

Returning to FIG. 15, the CPU 201 transmits to the slot machines 10 the specific-number information indicative of the specific number determined in step S114 (step S115).

Next, the CPU 201 determines whether or not it has received a payout request signal from the slot machine 10 (step S116). When determining that the CPU 201 has not received a payout request signal, the CPU 201 completes the present subroutine.

On the other hand, when determining that the CPU 201 has received a payout request signal, the CPU 201 determines the number of payouts based on the received payout request signal (step S117). In the processing, the CPU 201 determines the number of payouts, based on the number of rearranged jackpot trigger symbols included in the payout request signal and on the cumulative value indicated by the cumulative-value data stored in the RAM 203. More specifically, when the number of rearranged jackpot trigger symbols is three, the CPU 201 determines that the number of payouts is to be 30% of the cumulative value indicated by the cumulative-value data stored in the RAM 203. When the number of rearranged jackpot trigger symbols is four, the CPU 201 determines that the number of payouts is to be 60% of the cumulative value indicated by the cumulative-value data stored in the RAM 203. When the number of rearranged jackpot trigger symbols is five, the CPU 201 determines that the number of payouts is to be 80% of the cumulative value indicated by the cumulative-value data stored in the RAM 203. When the number of rearranged jackpot trigger symbols is six or more, the CPU 201 determines that the number of payouts is to be the whole cumulative value indicated by the cumulative-value data stored in the RAM 203. It is to be noted that digits after the decimal point are truncated in this processing.

The CPU 201 transmits a jackpot payout signal to the slot machine 10 that has transmitted the payout request signal received in step S116 (step S118). The jackpot payout signal includes the number of payouts determined in step S117.

The CPU 201 then sets as an updated cumulative value a value obtained by subtracting the number of payouts determined in step S117 from the cumulative value indicated by the cumulative-value data stored in the RAM 203, and stores the cumulative-value data indicative of the updated cumulative value into the RAM 203 (step S119).

When determining in step S116 that the CPU 201 has not received a payout request signal or after executing the processing of step S119, the CPU 201 completes the present subroutine.

As described above, according to the gaming system 100 relating to the third embodiment, the control device 200 cumulatively counts as the cumulative value a part of the game media betted in the respective slot machines 10, and determines the specific number based on the cumulative value obtained by the counting. The slot machine 10 then conducts a payout of game media when the number of special symbols out of the symbols stop-displayed to the display blocks 28 is equal to or more than the specific number.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

According to the gaming system 100 relating to the third embodiment, the specific number changes when the cumulative value reaches the predetermined value. Thus, change in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the third embodiment, the specific number changes a plurality of times before a payout of the jackpot. It is possible to make the player alternate between hope and despair every time the specific number changes, and to make the player immersed in the game.

Moreover, it is possible to further enhance interesting aspects of the game by allowing the specific number to change a plurality of times.

Fourth Embodiment

In the first embodiment described above, a case has been described where the control device 200 determines the number of special symbols based on the cumulative value.

In a fourth embodiment, each of the slot machines 10 determines the number of special symbols based on the cumulative value.

In the fourth embodiment, in common with the first embodiment, it is to be noted that eight types of normal symbols of “RIBBON”, “HEART”, “STAR”, “MOON”, “SUN”, “JEWEL”, “CROWN”, and “SMILE” are all scatter symbols, and a symbol of “JP”, being a jackpot trigger symbol, is a special symbol.

It is to be noted that, although the number-of-special-symbols determination table (see FIG. 9) is stored in the hard disk drive 205 included in the control device 200 in the first embodiment, the number-of-special-symbols determination table (see FIG. 9) is stored in the ROM 42 included in the slot machine 10 in the fourth embodiment.

In the descriptions below, constituent elements corresponding to those of the gaming system 100 according to the aforementioned first embodiment will be provided with the same signs.

Further, omitted are descriptions of the parts to which the descriptions in the aforementioned first embodiment are applicable in the fourth embodiment described below.

Figure 17A:
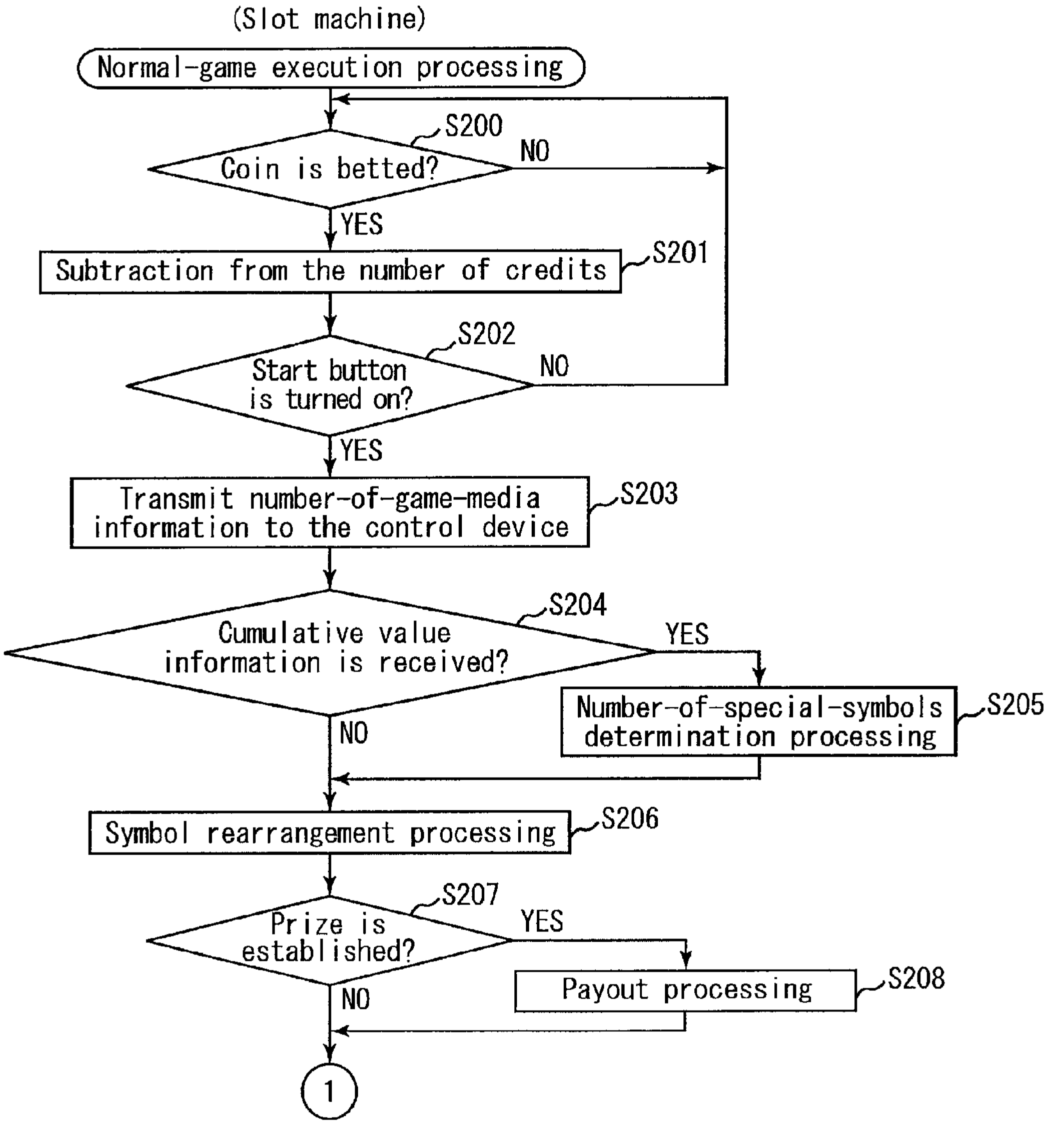
FIG. 17A is a flowchart illustrating a subroutine of normal-game execution processing in a fourth embodiment.
Figure 17B:
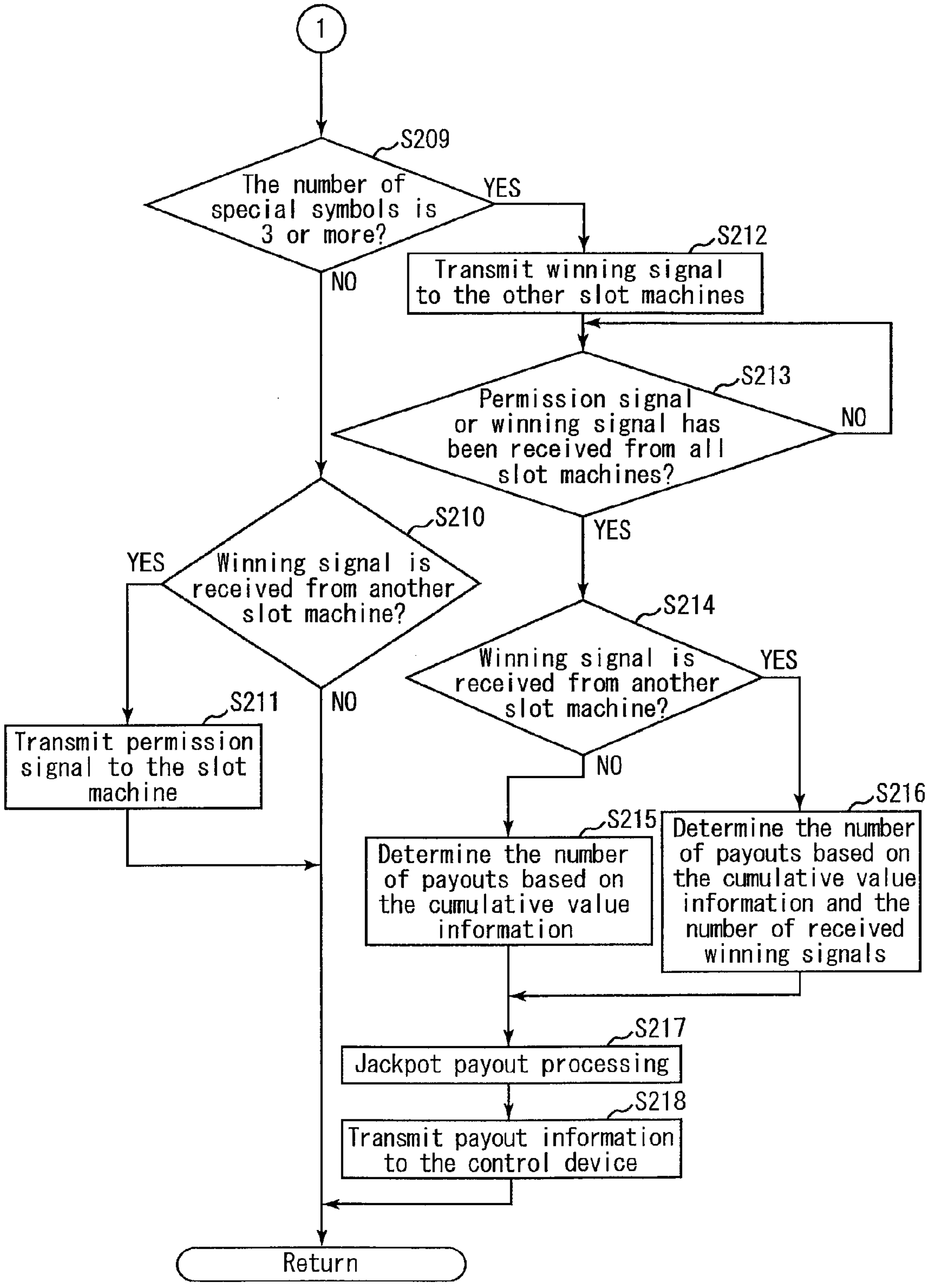
FIG. 17B is a flowchart illustrating a subroutine of the normal-game execution processing in the fourth embodiment.

FIG. 17 is a flowchart illustrating a subroutine of normal-game execution processing in the fourth embodiment.

Since the processing of step S200 to step S203 is similar to the processing of step S10 to step S13, descriptions thereof are omitted.

The main CPU 41 then determines whether or not it has received cumulative-value information from the control device 200 (step S204). When determining that the main CPU 41 has not received cumulative-value information from the control device 200, the main CPU 41 shifts the processing to step S206. The cumulative-value information is information indicative of the cumulative value indicated by the cumulative-value data stored in the RAM 203 included in the control device 200.

On the other hand, when determining in step S204 that the main CPU 41 has received cumulative-value information from the control device 200, the main CPU 41 conducts number-of-special-symbols determination processing (step S205). In the processing, the main CPU 41 first extracts the random number generated by the random number generator 62. Then, the main CPU 41 determines the number of special symbols, based on the extracted random number, the cumulative value indicated by the received cumulative-value information, and the number-of-special-symbols determination table (see FIG. 9) stored in the ROM 42. The main CPU 41 stores as the maximum number of special symbols the number of special symbols determined in step S205, into the RAM 43.

Next, the main CPU 41 executes symbol rearrangement processing (step S206).

In this processing, the main CPU 41 starts with determination of the number of special symbols to be scroll-displayed in the display blocks 28, based on the maximum number of special symbols stored in the RAM 43. Namely, when the maximum number of special symbols is five, the main CPU 41 determines that the number of special symbols to be scroll-displayed is five. The main CPU 41 then starts scroll-display of normal symbols and special symbols of the determined number, in the display blocks 28. Then, the main CPU 41 executes the aforementioned symbol determination program, so as to determine the symbols to be rearranged, and then rearranges the symbols in the display blocks 28.

Next, the main CPU 41 determines whether or not a prize has been established (step S207). Here, the establishment of a prize refers to a rearrangement of at least one combination of three or more normal symbols of the same type out of “RIBBON”, “HEART”, “STAR”, “MOON”, “SUN”, “JEWEL”, “CROWN”, and “SMILE”, in the display blocks 28 (see FIG. 7). In this processing, the main CPU 41 counts the number of normal symbols for each type out of the symbols rearranged in step S206. Then, the main CPU 41 determines whether or not the counted number is three or more.

When determining that a prize has been established, the main CPU 41 executes processing relating to the payout of coins (step S208). In the processing, the main CPU 41 determines the amount of payout based on the numbers of rearranged normal symbols with reference to the odds data stored in the ROM 42. The odds data is data indicative of the correspondence relationships between the numbers of normal symbols rearranged in the display blocks 28 and the amounts of payouts (see FIG. 7).

For example, when two coins have been betted and thereafter three symbols of “SUN” are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

When determining in step S207 that a prize has not been established, or after executing the processing of step S208, the main CPU 41 determines whether or not the number of special symbols out of the symbols rearranged in step S206 is three or more (step S209). When determining that the number of special symbols is not three or more, the main CPU 41 determines whether or not it has received a winning signal from another slot machine 10 (step S210). A winning signal is a signal transmitted from a slot machine 10 in which the number of special symbols out of the rearranged symbols is three or more, to the other slot machines 10.

When determining in step S210 that the main CPU 41 has received a winning signal from another slot machine 10, the main CPU 41 transmits a permission signal to the slot machine 10 that has transmitted the winning signal (step S211).

On the other hand, when determining in step S209 that the number of special symbols is three or more, the main CPU 41 transmits a winning signal to the other slot machines 10 (step S212). A winning signal includes the number of rearranged special symbols and an identification number of the slot machine 10.

Next, the main CPU 41 determines whether or not it has received a permission signal or a winning signal from all the slot machines 10 (step S213). When determining that the main CPU 41 has not received a permission signal or a winning signal from all the slot machines 10, the main CPU 41 returns the processing to step S213.

On the other hand, when determining in step S213 that the main CPU 41 has received a permission signal or a winning signal from all the slot machines 10, the main CPU 41 determines whether or not it has received a winning signal from another slot machine 10 (step S214).

When determining in step S214 that the main CPU 41 has not received a winning signal from another slot machine 10, the main CPU 41 determines the number of payouts based on the cumulative value indicated by the cumulative-value information received from the control device 200 (step S215). In the processing, the main CPU 41 determines the number of payouts, based on the number of special symbols rearranged in step S206 and on the cumulative value indicated by the cumulative-value information received from the control device 200. More specifically, when the number of rearranged special symbols is three, the main CPU 41 determines that the number of payouts is to be 30% of the cumulative value indicated by the received cumulative-value information. When the number of rearranged special symbols is four, the main CPU 41 determines that the number of payouts is to be 60% of the cumulative value indicated by the received cumulative-value information. When the number of rearranged special symbols is five, the main CPU 41 determines that the number of payouts is to be 80% of the cumulative value indicated by the received cumulative-value information. When the number of rearranged special symbols is six or more, the main CPU 41 determines that the number of payouts is to be the whole cumulative value indicated by the received cumulative-value information. It is to be noted that the digits after the decimal point are truncated in the processing.

On the other hand, when determining in step S214 that the main CPU 41 has received a winning signal from another slot machine 10, the main CPU 41 determines the number of payouts based on the cumulative value indicated by the cumulative-value information received from the control device 200, and on the number of winning signals received from the other slot machines 10 (step S216). In the processing, the main CPU 41 first divides the cumulative value indicated by the cumulative-value information received from the control device 200, by a numeric value obtained by adding one to the number of winning signals received from the other slot machines 10. Then, the main CPU 41 determines the number of payouts based on the numeric value obtained by the division and on the number of special symbols rearranged in step S206. More specifically, when the number of rearranged special symbols is three, the main CPU 41 determines that the number of payouts is to be 30% of the numeric value obtained by the division. When the number of rearranged special symbols is four, the main CPU 41 determines that the number of payouts is to be 60% of the numeric value obtained by the division. When the number of rearranged special symbols is five, the main CPU 41 determines that the number of payouts is to be 80% of the numeric value obtained by the division. When the number of rearranged special symbols is six or more, the main CPU 41 determines that the number of payouts is to be the whole numeric value obtained by the division. It is to be noted that the digits after the decimal point are truncated in the processing.

Next, the main CPU 41 executes jackpot payout processing (step S217). In the processing, the main CPU 41 determines an amount of payout, based on the number of payouts determined in step S215 or step S216.

In the case of accumulating coins, the main CPU 41 conducts the processing of adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

Next, the main CPU 41 transmits payout information to the control device 200 (step S218). In the processing, the main CPU 41 transmits payout information indicative of the number of payouts determined in step S215 or step S216, to the control device 200.

When determining in step S210 that the main CPU 41 has not received a winning signal from another slot machine 10, or after executing the processing of step S211 or after executing the processing of step S218, the main CPU 41 completes the present subroutine.

Next, there is described processing performed in the control device 200.

Figure 18:
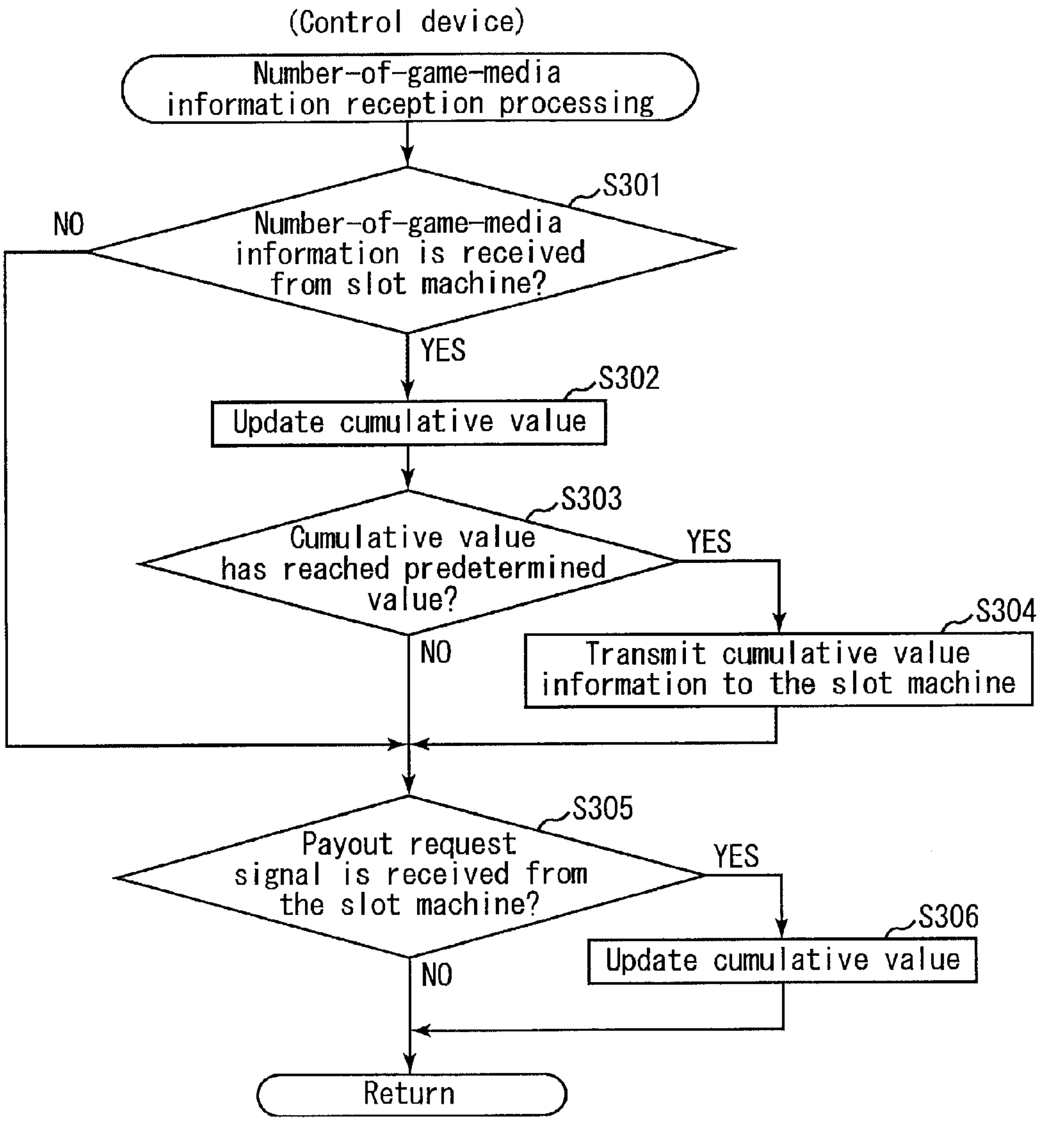
FIG. 18 is a flowchart illustrating a subroutine of number-of-game-media information reception processing in the fourth embodiment.

FIG. 18 is a flowchart illustrating a subroutine of number-of-game-media information reception processing in the fourth embodiment.

Since the processing of step S301 to step S303 is similar to the processing of step S101 to step S103, descriptions thereof are omitted.

Then, when determining in step S303 that the cumulative value has reached the predetermined value, the CPU 201 transmits cumulative-value information to the slot machines 10 (step S304). The cumulative-value information is information indicative of the cumulative value indicated by the cumulative-value data stored in the RAM 203.

Next, the CPU 201 determines whether or not it has received payout information from the slot machine 10 (step S305). When the CPU 201 determines that it has received payout information from the slot machine 10, the CPU 201 updates the cumulative value (step S306). In the processing, the CPU 201 sets as an updated cumulative value a numeric value obtained by subtracting the number of payouts indicated by the received payout information, from the cumulative value indicated by the cumulative-value data stored in the RAM 203, and stores the cumulative-value data indicative of the updated cumulative value into the RAM 203.

When the CPU 201 determines in step S305 that it has not received payout information from the slot machine 10, or after executing the processing of step S306, the CPU 201 completes the present subroutine.

As described above, according to the gaming system 100 relating to the fourth embodiment, the control device 200 cumulatively counts as the cumulative value a part of the game media betted in the respective slot machines 10, and transmits cumulative-value information based on the cumulative value obtained by the counting to the slot machines 10. Each of the slot machines 10 then determines the number of special symbols that can be displayed to the display blocks 28, based on the received cumulative-value information.

Since the number of special symbols that can be displayed to the display blocks 28 changes based on the cumulative value, the contents of the game change according to the cumulative value; it is therefore possible to make the player find the game interesting.

Further, an increase in the number of special symbols to be displayed to the display blocks 28 generates an advantageous state for the player, and a decrease in the number of special symbols to be displayed to the display blocks 28 generates a disadvantageous state for the player; it is therefore possible to make the player alternate between hope and despair, and to make him or her play the game for a long period of time without making him or her tired of the game.

According to the gaming system 100 relating to the fourth embodiment, the number of special symbols that can be displayed to the display blocks 28 changes when the cumulative value reaches the predetermined value. Thus, change in the number of special symbols displayed to the display blocks 28 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the fourth embodiment, the number of special symbols that can be displayed to the display blocks 28 changes a plurality of times before a payout of the jackpot. It is possible to make the player alternate between hope and despair every time the number of special symbols changes, and to make the player immersed in the game.

Moreover, it is possible to further enhance interesting aspects of the game by allowing the number of special symbols that can be displayed to the display blocks 28 to change a plurality of times.

According to the gaming system 100 relating to the fourth embodiment, since each of the slot machines 10 determines the number of special symbols, the numbers of special symbols are different in the respective slot machines 10. The players therefore care how well other players are playing, and use strategies to get the better of other players; hence, it is possible to make the players immersed in the game.

Fifth Embodiment

In the second embodiment described above, a case has been described where the control device 200 determines the number of special symbols based on the cumulative value.

In a fifth embodiment, each of the slot machines 10 determines the number of special symbols based on the cumulative value.

In the fifth embodiment, in common with the second embodiment, five types of symbols of "HEART", "STAR", "SUN", "JEWEL", and "SMILE" are special symbols, and three types of symbols of "RIBBON", "MOON", and "CROWN" are normal symbols irrelative to payouts, and a symbol of "JP" is a jackpot trigger symbol. Further, the special symbols are scatter symbols.

It is to be noted that, although the number-of-special-symbols determination table (see FIG. 12) is stored in the hard disk drive 205 included in the control device 200 in the second embodiment, the number-of-special-symbols determination table (see FIG. 12) is stored in the ROM 42 included in the slot machine 10 in the fifth embodiment.

Further, constituent elements corresponding to those of the gaming system 100 according to the aforementioned second embodiment will be provided with the same signs, in descriptions given below.

Furthermore, omitted are descriptions of the parts to which the descriptions in the aforementioned second embodiment are applicable in the fifth embodiment described below.

Figure 19A:
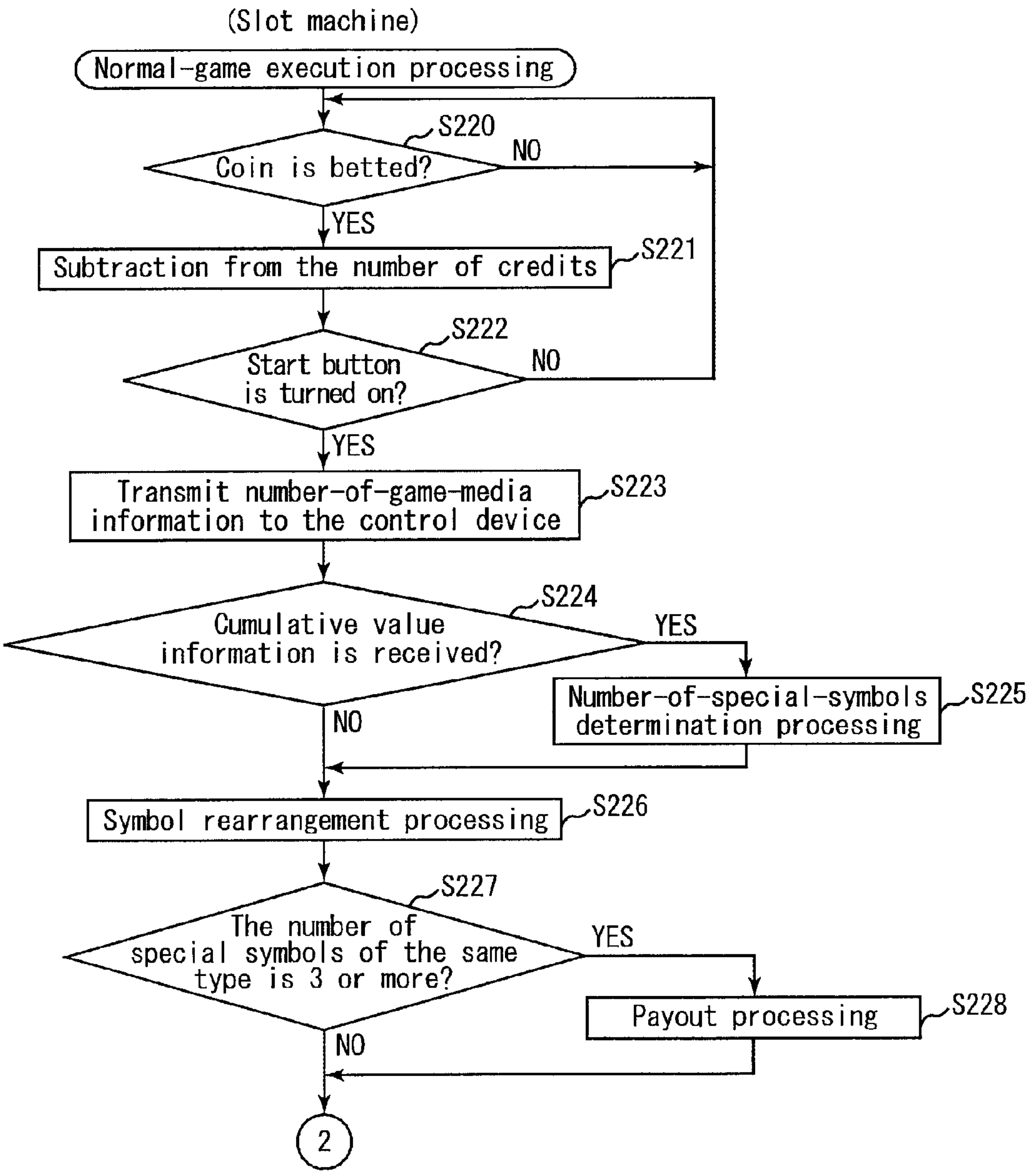
FIG. 19A is a flowchart illustrating a subroutine of normal-game execution processing in a fifth embodiment.
Figure 19B:
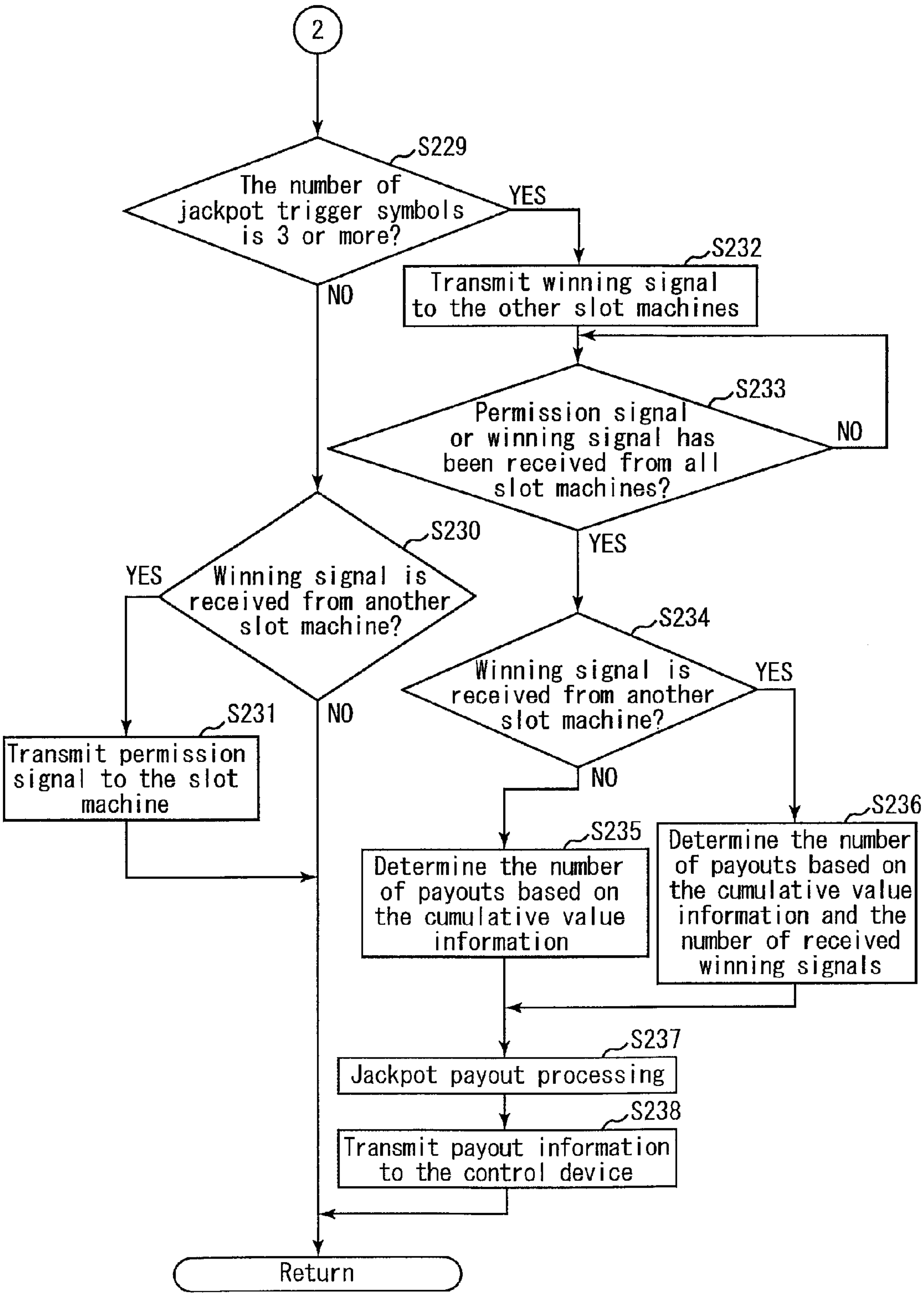
FIG. 19B is a flowchart illustrating a subroutine of the normal-game execution processing in the fifth embodiment.

FIG. 19 is a flowchart illustrating a subroutine of normal-game execution processing in the fifth embodiment.

Since the processing of step S220 to step S223 is similar to the processing of step S30 to step S33, descriptions thereof are omitted.

Next, the main CPU 41 determines whether or not it has received cumulative-value information from the control device 200 (step S224). When the main CPU 41 determines that it has not received cumulative-value information from the control device 200, the main CPU 41 shifts the processing to step S226. The cumulative-value information is information indicative of the cumulative value indicated by the cumulative-value data stored in the RAM 203 included in the control device 200.

On the other hand, when the main CPU 41 determines that it has received cumulative-value information from the control device 200, the main CPU 41 executes number-of-special-symbols determination processing (step S225). In the processing, the main CPU 41 first extracts the random number generated by the random number generator 62. The main CPU 41 then determines the number of special symbols, based on the extracted random number, the cumulative value indicated by the received cumulative-value information, and the number-of-special-symbols determination table (see FIG. 12) stored in the ROM 42. The main CPU 41 stores as the maximum number of special symbols the number of special symbols determined in step S225, into the RAM 43.

Next, the main CPU 41 executes symbol rearrangement processing (step S226).

In this processing, the main CPU 41 starts with determination of the number of special symbols of each type to be scroll-displayed in the display blocks 28, based on the maximum number of special symbols stored in the RAM 43. Namely, when the maximum number of special symbols is five, the main CPU 41 determines that the number of special symbols of each type to be scroll-displayed is five. The main CPU 41 then starts scroll-display of normal symbols, special symbols of the determined number and the symbols of "JP" being jackpot trigger symbols, in the display blocks 28. Then, the main CPU 41 executes the aforementioned symbol determination program, so as to determine the symbols to be rearranged, and then rearranges the symbols in the display blocks 28.

Next, the main CPU 41 determines whether or not three or more special symbols of the same type are rearranged (step S227). Namely, the main CPU 41 determines whether or not at least one combination of three or more special symbols of the same type out of "HEART", "STAR", "SUN", "JEWEL", and "SMILE", is rearranged in the display blocks 28 (see FIG. 11). In this processing, the main CPU 41 counts the number of special symbols for each type out of the symbols rearranged in step S226. Then, the main CPU 41 determines whether or not the counted number is three or more.

When determining that three or more special symbols of the same type are rearranged, the main CPU 41 executes processing relating to the payout of coins (step S228). In the processing, the main CPU 41 determines the amount of payout based on the numbers of rearranged special symbols with reference to the odds data stored in the ROM 42. The odds data is data indicative of the correspondence relationships between the numbers of special symbols rearranged in the display blocks 28 and the amounts of payouts (see FIG. 11).

For example, when two coins have been betted and thereafter three symbols of "SUN" are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

When determining in step S227 that three or more special symbols of the same type are not rearranged or after executing the processing of step S228, the main CPU 41 determines whether or not the number of symbols of "JP" being jackpot trigger symbols out of the symbols rearranged in step S226 is three or more (step S229). When determining that the number of symbols of "JP" being jackpot trigger symbols is not three or more, the main CPU 41 determines whether or not it has received a winning signal from another slot machine 10 (step S230). A winning signal is a signal that is transmitted from a slot machine 10 in which the number of jackpot trigger symbols out of the rearranged symbols is three or more, to the other slot machines 10.

When the main CPU 41 determines in step S230 that it has received a winning signal from another slot machine 10, the main CPU 41 transmits a permission signal to the slot machine 10 that has transmitted the winning signal (step S231).

On the other hand, when determining in step S229 that the number of symbols of "JP" being jackpot trigger symbols is three or more, the main CPU 41 transmits a winning signal to the other slot machines 10 (step S232). A winning signal includes the number of rearranged jackpot trigger symbols and the identification number of the slot machine 10.

The main CPU 41 then determines whether or not it has received a permission signal or a winning signal from all the slot machines 10 (step S233). When the main CPU 41 determines that it has not received a permission signal or a winning signal from all the slot machines 10, the main CPU 41 returns the processing to step S233.

On the other hand, when the main CPU 41 determines in step S233 that it has received a permission signal or a winning signal from all the slot machines 10, the main CPU 41 determines whether or not it has received a winning signal from another slot machine 10 (step S234).

When determining in step S234 that the main CPU 41 has not received a winning signal from another slot machine 10, the main CPU 41 determines the number of payouts based on the cumulative value indicated by the cumulative-value information received from the control device 200 (step S235). In the processing, the main CPU 41 determines the number of payouts, based on the number of jackpot trigger symbols rearranged in step S226 and on the cumulative value indicated by the cumulative-value information received from the control device 200. More specifically, when the number of rearranged jackpot trigger symbols is three, the main CPU 41 determines that the number of payouts is to be 30% of the cumulative value indicated by the received cumulative-value information. When the number of rearranged jackpot trigger symbols is four, the main CPU 41 determines that the number of payouts is to be 60% of the cumulative value indicated by the received cumulative-value information. When the number of rearranged jackpot trigger symbols is five, the main CPU 41 determines that the number of payouts is to be 80% of the cumulative value indicated by the received cumulative-value information. When the number of rearranged jackpot trigger symbols is six or more, the main CPU 41 determines that the number of payouts is to be the whole cumulative value indicated by the received cumulative-value information. It is to be noted that the digits after the decimal point are truncated in the processing.

On the other hand, when determining in step S234 that the main CPU 41 has received a winning signal from another slot machine 10, the main CPU 41 determines the number of payouts based on the cumulative value indicated by the cumulative-value information received from the control device 200, and on the number of winning signals received from the other slot machines 10 (step S236). In the processing, the main CPU 41 first divides the cumulative value indicated by the cumulative-value information received from the control device 200, by a numeric value obtained by adding one to the number of winning signals received from the other slot machines 10. Then, the main CPU 41 determines the number of payouts based on the numeric value obtained by the division and on the number of jackpot trigger symbols rearranged in step S226. More specifically, when the number of rearranged jackpot trigger symbols is three, the main CPU 41 determines that the number of payouts is to be 30% of the numeric value obtained by the division. When the number of rearranged jackpot trigger symbols is four, the main CPU 41 determines that the number of payouts is to be 60% of the numeric value obtained by the division. When the number of rearranged jackpot trigger symbols is five, the main CPU 41 determines that the number of payouts is to be 80% of the numeric value obtained by the division. When the number of rearranged jackpot trigger symbols is six or more, the main CPU 41 determines that the number of payouts is to be the whole numeric value obtained by the division. It is to be noted that the digits after the decimal point are truncated in the processing.

Next, the main CPU 41 executes jackpot payout processing (step S237). In the processing, the main CPU 41 determines an amount of payout, based on the number of payouts determined in step S235 or step S236.

In the case of accumulating coins, the main CPU 41 conducts the processing of adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

Next, the main CPU 41 transmits payout information to the control device 200 (step S238). In the processing, the main CPU 41 transmits payout information indicative of the number of payouts determined in step S235 or step S236, to the control device 200.

When determining in step S230 that the main CPU 41 has not received a winning signal from another slot machine 10, or after executing the processing of step S231 or after executing the processing of step S238, the main CPU 41 completes the present subroutine.

As described above, according to the gaming system 100 relating to the fifth embodiment, the control device 200 cumulatively counts as the cumulative value a part of the game media betted in the respective slot machines 10, and transmits cumulative-value information based on the cumulative value obtained by the counting to the slot machines 10. Each of the slot machines 10 then determines the number of special symbols that can be displayed to the display blocks 28, based on the received cumulative-value information.

Since the number of special symbols that can be displayed to the display blocks 28 changes based on the cumulative value, the contents of the game change according to the cumulative value; it is therefore possible to make the player find the game interesting.

Further, an increase in the number of special symbols to be displayed to the display blocks 28 generates an advantageous state for the player, and a decrease in the number of special symbols to be displayed to the display blocks 28 generates a disadvantageous state for the player; it is therefore possible to make the player alternate between hope and despair, and to make him or her play the game for a long period of time without making him or her tired of the game.

According to the gaming system 100 relating to the fifth embodiment, the number of special symbols that can be displayed to the display blocks 28 changes when the cumulative value reaches the predetermined value. Thus, change in the number of special symbols displayed to the display blocks 28 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the fifth embodiment, the number of special symbols that can be displayed to the display blocks 28 changes a plurality of times before a payout of the jackpot. It is possible to make the player alternate between hope and despair every time the number of special symbols changes, and to make the player immersed in the game.

Moreover, it is possible to further enhance interesting aspects of the game by allowing the number of special symbols that can be displayed to the display blocks 28 to change a plurality of times.

According to the gaming system 100 relating to the fifth embodiment, since each of the slot machines 10 determines the number of special symbols, the numbers of special symbols are different in the respective slot machines 10. The players therefore care how well other players are playing, and use strategies to get the better of other players; hence, it is possible to make the players immersed in the game.

Sixth Embodiment

In the third embodiment described above, a case has been described where the control device 200 determines the specific number indicative of the minimum number of special symbols required for establishment of a prize, based on the cumulative value.

In a sixth embodiment, each of the slot machines 10 determines the specific number based on the cumulative value.

Further, in the sixth embodiment, eight types of symbols of "RIBBON", "HEART", "STAR", "MOON", "SUN", "JEWEL", "CROWN", and "SMILE" are special symbols, and a symbol of "JP" is a jackpot trigger symbol. Also, the special symbols are scatter symbols.

It is to be noted that, although the specific-number determination table (see FIG. 16) is stored in the hard disk drive 205 included in the control device 200 in the third embodiment, the specific-number determination table (see FIG. 16) is stored in the ROM 42 included in the slot machine 10 in the sixth embodiment.

Further, constituent elements corresponding to those of the gaming system 100 according to the aforementioned third embodiment will be provided with the same signs, in descriptions given below.

Furthermore, omitted are descriptions of the parts to which the descriptions in the aforementioned third embodiment are applicable in the sixth embodiment described below.

Figure 20A:
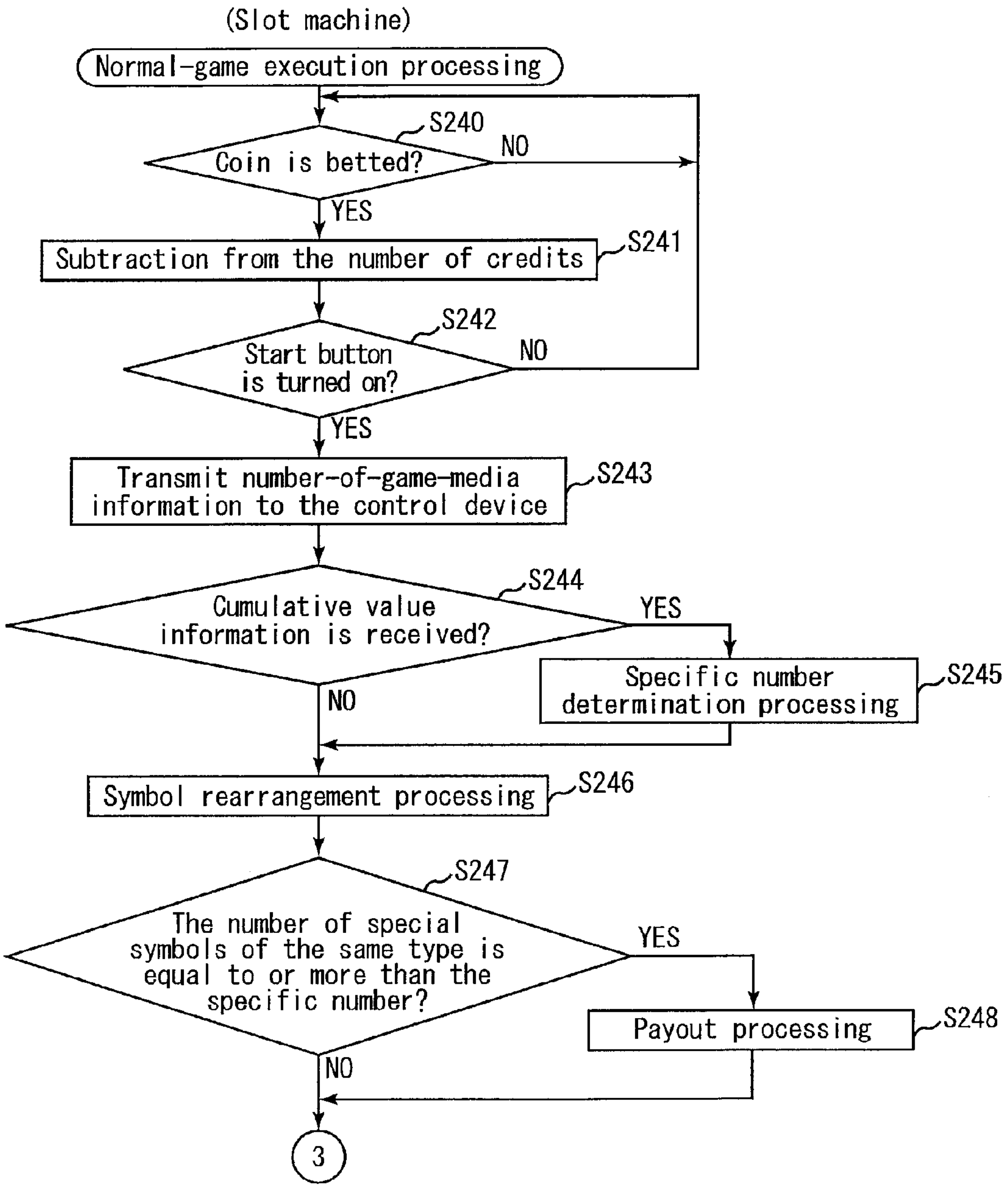
FIG. 20A is a flowchart illustrating a subroutine of normal-game execution processing in a sixth embodiment.
Figure 20B:
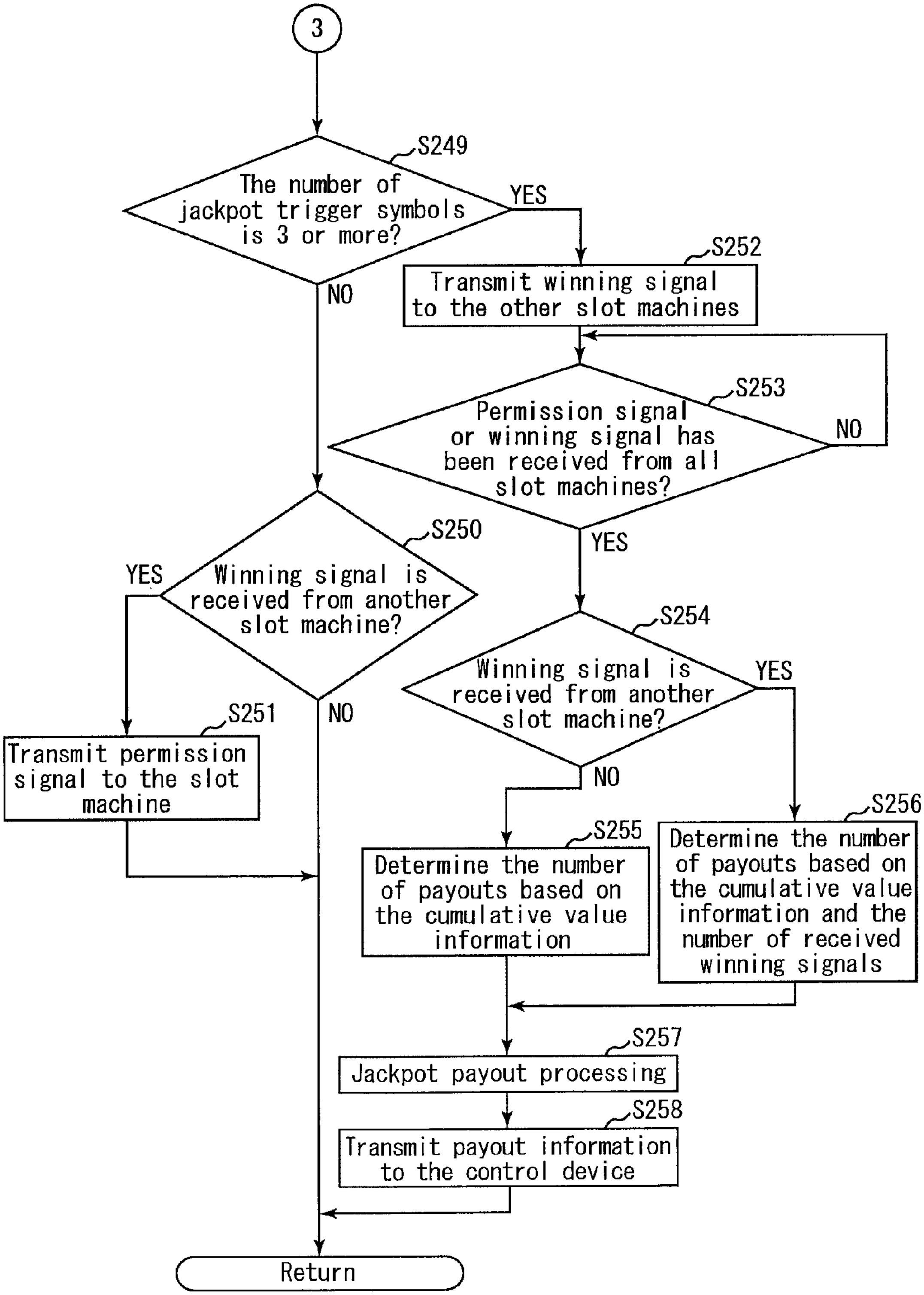
FIG. 20B is a flowchart illustrating a subroutine of the normal-game execution processing in the sixth embodiment.

FIG. 20 is a flowchart illustrating a subroutine of normal-game execution processing in the sixth embodiment.

Since the processing of step S240 to step S243 is similar to the processing of step S50 to step S53 in FIG. 13, descriptions thereof are omitted.

Next, the main CPU 41 determines whether or not it has received cumulative-value information from the control device 200 (step S244). When the main CPU 41 determines that it has not received cumulative-value information from the control device 200, the main CPU 41 shifts the processing to step S246. The cumulative-value information is information indicative of the cumulative value indicated by the cumulative-value data stored in the RAM 203 included in the control device 200.

On the other hand, when the main CPU 41 determines in step S244 that it has received cumulative-value information from the control device 200, the main CPU 41 conducts specific-number determination processing (step S245).

In the processing, the main CPU 41 extracts the random number generated by the random number generator 62. The main CPU 41 then determines the specific number, based on the extracted random number, the cumulative value indicated by the received cumulative-value information, and the specific-number determination table (see FIG. 16) stored in the ROM 42. The main CPU 41 stores the specific number determined in step S245 into the RAM 43.

Next, the main CPU 41 executes symbol rearrangement processing (step S246).

In this processing, the main CPU 41 starts with scroll-display of special symbols and the symbols of "JP" being jackpot trigger symbols, in the display blocks 28. Then, the main CPU 41 executes the aforementioned symbol determination program, so as to determine the symbols to be rearranged, and then rearranges the symbols in the display blocks 28.

Next, the main CPU 41 determines whether or not special symbols of the same type in number equal to or more than the specific number are rearranged (step S247). In the processing, the main CPU 41 determines whether or not at least one combination of special symbols of the same type in number equal to or more than the specific number out of "RIBBON", "HEART", "STAR", "MOON", "SUN", "JEWEL", "CROWN", and "SMILE" is rearranged in the display blocks 28. In this processing, the main CPU 41 counts the number of special symbols for each type out of the symbols rearranged in step S246. Then, the main CPU 41 determines whether or not the counted number is equal to or more than the specific number stored in the RAM 43.

When determining that special symbols of the same type in number equal to or more than the specific number are rearranged, the main CPU 41 executes processing relating to the payout of coins (step S248). In the processing, the main CPU 41 determines the amount of payout based on the numbers of rearranged special symbols with reference to the odds data stored in the ROM 42. The odds data is data indicative of the correspondence relationships between the numbers of special symbols rearranged in the display blocks 28 and the amounts of payouts (see FIG. 14).

For example, in a case where the specific number is three, when two coins have been betted and thereafter three symbols of "SUN" are rearranged, 20(=2×10) coins are paid out.

In the case of accumulating coins, the main CPU 41 conducts processing for adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

When determining in step S247 that special symbols of the same type in number equal to or more than the specific number are not rearranged or after executing the processing of step S248, the main CPU 41 determines whether or not the number of symbols of "JP" being jackpot trigger symbols out of the symbols rearranged in step S246 is three or more (step S249). When determining that the number of symbols of "JP" being jackpot trigger symbols is not three or more, the main CPU 41 determines whether or not it has received a winning signal from another slot machine 10 (step S250). A winning signal is a signal that is transmitted from a slot machine 10 in which the number of jackpot trigger symbols out of the rearranged symbols is three or more.

When the main CPU 41 determines in step S250 that it has received a winning signal from another slot machine 10, the main CPU 41 transmits a permission signal to the slot machine 10 that has transmitted the winning signal (step S251).

On the other hand, when determining in step S249 that the number of symbols of "JP" being jackpot trigger symbols is three or more, the main CPU 41 transmits a winning signal to the other slot machines 10 (step S252). A winning signal includes the number of rearranged jackpot trigger symbols and the identification number of the slot machine 10.

The main CPU 41 then determines whether or not it has received a permission signal or a winning signal from all the slot machines 10 (step S253). When the main CPU 41 determines that it has not received a permission signal or a winning signal from all the slot machines 10, the main CPU 41 returns the processing to step S253.

On the other hand, when the main CPU 41 determines in step S253 that it has received a permission signal or a winning signal from all the slot machines 10, the main CPU 41 determines whether or not it has received a winning signal from another slot machine 10 (step S254).

When determining in step S254 that the main CPU 41 has not received a winning signal from another slot machine 10, the main CPU 41 determines the number of payouts based on the cumulative value indicated by the cumulative-value information received from the control device 200 (step S255). In the processing, the main CPU 41 determines the number of payouts, based on the number of jackpot trigger symbols rearranged in step S246 and on the cumulative value indicated by the cumulative-value information received from the control device 200. More specifically, when the number of rearranged jackpot trigger symbols is three, the main CPU 41 determines that the number of payouts is to be 30% of the cumulative value indicated by the received cumulative-value information. When the number of rearranged jackpot trigger symbols is four, the main CPU 41 determines that the number of payouts is to be 60% of the cumulative value indicated by the received cumulative-value information. When the number of rearranged jackpot trigger symbols is five, the main CPU 41 determines that the number of payouts is to be 80% of the cumulative value indicated by the received cumulative-value information. When the number of rearranged jackpot trigger symbols is six or more, the main CPU 41 determines that the number of payouts is to be the whole cumulative value indicated by the received cumulative-value information. It is to be noted that the digits after the decimal point are truncated in the processing.

On the other hand, when determining in step S254 that the main CPU 41 has received a winning signal from another slot machine 10, the main CPU 41 determines the number of payouts, based on the cumulative value indicated by the cumulative-value information received from the control device 200, and on the number of winning signals received from the other slot machines 10 (step S256). In the processing, the main CPU 41 first divides the cumulative value indicated by the cumulative-value information received from the control device 200, by a numeric value obtained by adding one to the number of winning signals received from the other slot machines 10. Then, the main CPU 41 determines the number of payouts based on the numeric value obtained by the division and on the number of jackpot trigger symbols rearranged in step S246. More specifically, when the number of rearranged jackpot trigger symbols is three, the main CPU 41 determines that the number of payouts is to be 30% of the numeric value obtained by the division. When the number of rearranged jackpot trigger symbols is four, the main CPU 41 determines that the number of payouts is to be 60% of the numeric value obtained by the division. When the number of rearranged jackpot trigger symbols is five, the main CPU 41 determines that the number of payouts is to be 80% of the numeric value obtained by the division. When the number of rearranged jackpot trigger symbols is six or more, the main CPU 41 determines that the number of payouts is to be the whole numeric value obtained by the division. It is to be noted that the digits after the decimal point are truncated in the processing.

Next, the main CPU 41 executes jackpot payout processing (step S257). In the processing, the main CPU 41 determines an amount of payout, based on the number of payouts determined in step S255 or step S256.

In the case of accumulating coins, the main CPU 41 conducts the processing of adding the number of credits corresponding to the determined amount of payout, to the number of credits stored in the RAM 43. On the other hand, in the case of paying out coins, the main CPU 41 transmits a control signal to the hopper 66 in order to pay out coins in an amount corresponding to the determined amount of payout.

Next, the main CPU 41 transmits payout information to the control device 200 (step S258). In the processing, the main CPU 41 transmits payout information indicative of the number of payouts determined in step S255 or step S256, to the control device 200.

When determining in step S250 that the main CPU 41 has not received a winning signal from another slot machine 10, or after executing the processing of step S251 or after executing the processing of step S258, the main CPU 41 completes the present subroutine.

As described above, according to the gaming system 100 relating to the sixth embodiment, the control device 200 cumulatively counts as the cumulative value a part of the game media betted in the respective slot machines 10, and transmits cumulative-value information based on the cumulative value obtained by the counting to the slot machines 10. Each of the slot machines 10 then determines the specific number, based on the received cumulative-value information. Then, when the number of special symbols out of the symbols stop-displayed to the display blocks 28 is equal to or more than the specific number, the main CPU 41 conducts a payout of game media.

Since the specific number changes based on the cumulative value, the contents of the game change according to the cumulative value; it is therefore possible to make the player find the game interesting.

Further, an increase in the specific number generates a disadvantageous state for the player, and a decrease in the specific number generates an advantageous state for the player; it is therefore possible to make the player alternate between hope and despair, and to make him or her play the game for a long period of time without making him or her tired of the game.

According to the gaming system 100 relating to the sixth embodiment, the specific number changes when the cumulative value reaches the predetermined value. Thus, change in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 100 relating to the sixth embodiment, the specific number changes a plurality of times before a payout of the jackpot. It is possible to make the player alternate between hope and despair every time the specific number changes, and to make the player immersed in the game.

Moreover, it is possible to further enhance interesting aspects of the game by allowing the specific number to change a plurality of times.

According to the gaming system 100 relating to the sixth embodiment, since each of the slot machines 10 determines the specific number, the specific numbers are different in the respective slot machines 10. The players therefore care how well other players are playing, and use strategies to get the better of other players; hence, it is possible to make the players immersed in the game.

Seventh Embodiment

Figure 21:
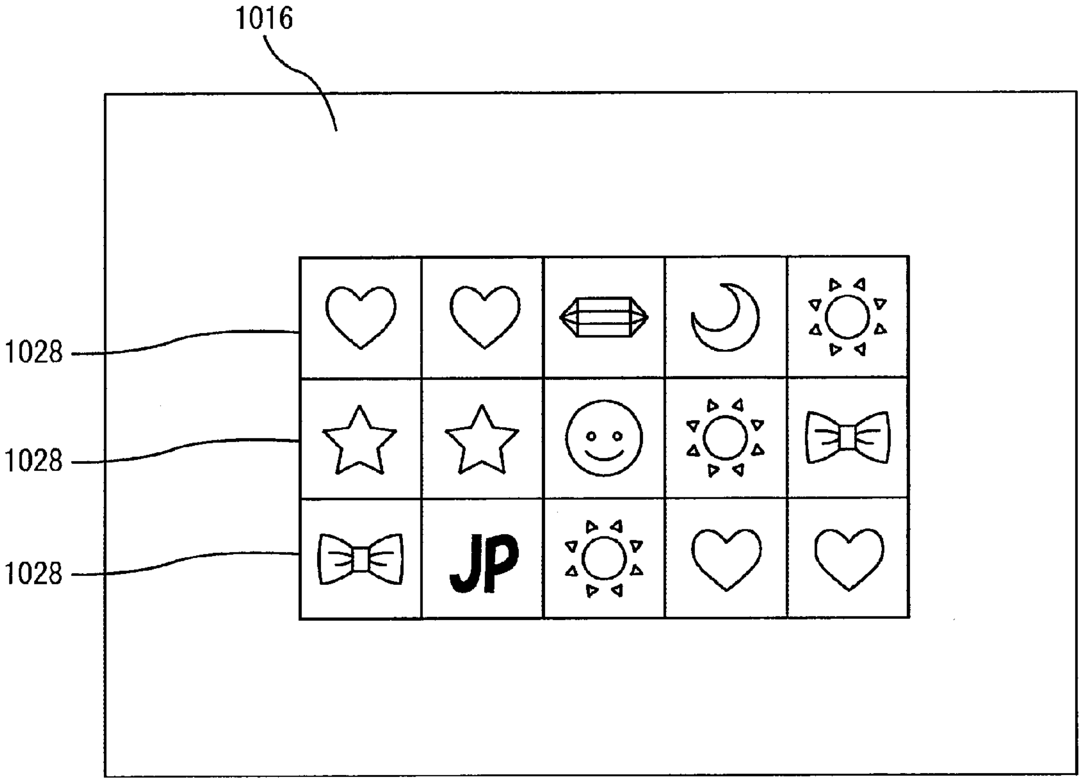
FIG. 21 is a view illustrating an example of symbols rearranged to display blocks.

FIG. 21 is a view illustrating an example of symbols rearranged to display blocks.

In the seventh embodiment, eight types of normal symbols of "RIBBON", "HEART", "STAR", "MOON", "SUN", "JEWEL", "CROWN", and "SMILE" exist. For a special symbol, there exists a symbol of "JP" being a jackpot trigger symbol.

An example of FIG. 21 shows a state in which one symbol of "JP" being a special symbol is rearranged to display blocks 1028 that are displayed to a lower image display panel 1016.

It is to be noted that the normal symbols and the special symbols, together, are described as "symbols" hereinbelow.

In a gaming system 1100 according to the seventh embodiment, a part of coins betted in each slot machine 1010 are cumulatively counted as a cumulative value. When the cumulative value obtained by the counting reaches a predetermined value, the number of special symbols that can be rearranged to the display blocks 1028 displayed to the lower image display panel 1016 provided in each slot machine 1010 (maximum number of special symbols) is increased. Then, when the number of special symbols rearranged to the display blocks 1028 after scroll-display of symbols in the display blocks 1028 is three or more, payout of coins is conducted as a jackpot.

It is to be noted that the maximum number of special symbols is the maximum number of special symbols that can be rearranged to the display blocks 1028. Namely, when the maximum number of special symbols is five, five special symbols are scroll-displayed at the time of scroll-display of symbols in the display blocks 1028. Thus, after the symbols are scroll-displayed in the display blocks 1028, the number of special symbols to be rearranged to the display blocks 1028 is equal to or less than five.

As just described, in the seventh embodiment, the number of special symbols that can be rearranged to the display blocks 1028 increases based on the cumulative value obtained by the counting.

Figure 22:
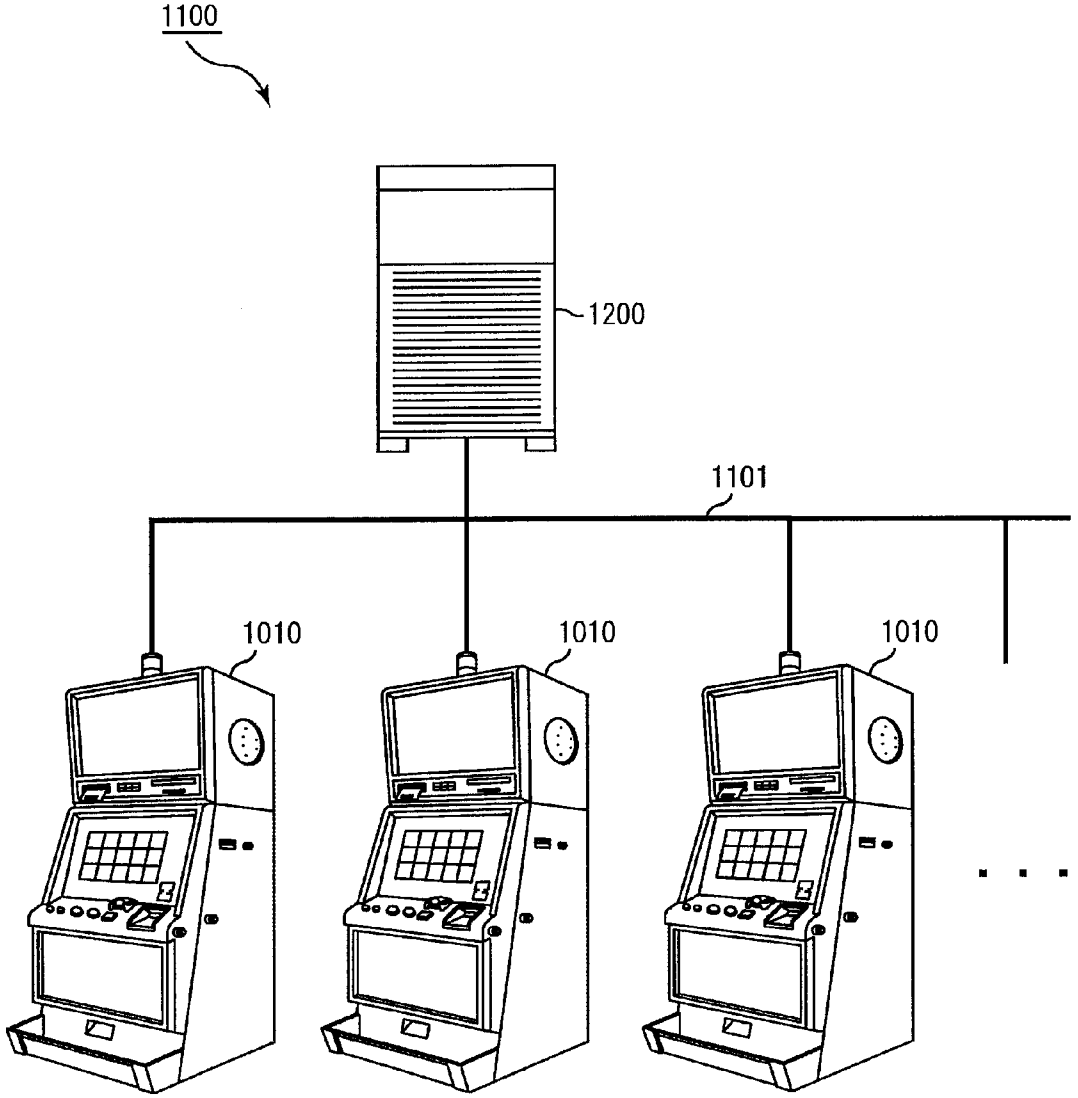
FIG. 22 is a diagrammatic view illustrating an entire configuration of a gaming system according to a seventh embodiment.

FIG. 22 is a diagrammatic view illustrating an entire configuration of a gaming system according to the seventh embodiment.

As shown in FIG. 22, the gaming system 1100 is provided with a control device 1200. The control device 1200 is connected, through communication lines 1101, with a plurality of (five in the seventh embodiment) slot machines 1010. The plurality of respective slot machines 1010 are capable of transmitting and receiving data to and from the control device 1200, through the communication lines 1101. Further, the respective slot machines 1010 are connected to one another in a manner enabling communication there among, through the communication lines 1101.

In the present embodiment, a case will be described where the slot machines 1010 and the control device 1200 are connected through wired connections. However, the present invention is not limited to this example, and may wirelessly conduct transmission and reception of data. Namely, a communication line (network) in the present invention includes wired and wireless transmission lines.

Moreover, in the present embodiment, a case will be described where the gaming system 1100 is installed in a single game hall or the like; however, in the present invention, respective gaming apparatuses may be installed in different facilities.

Next, a configuration of the slot machine 1010 is described.

Figure 23:
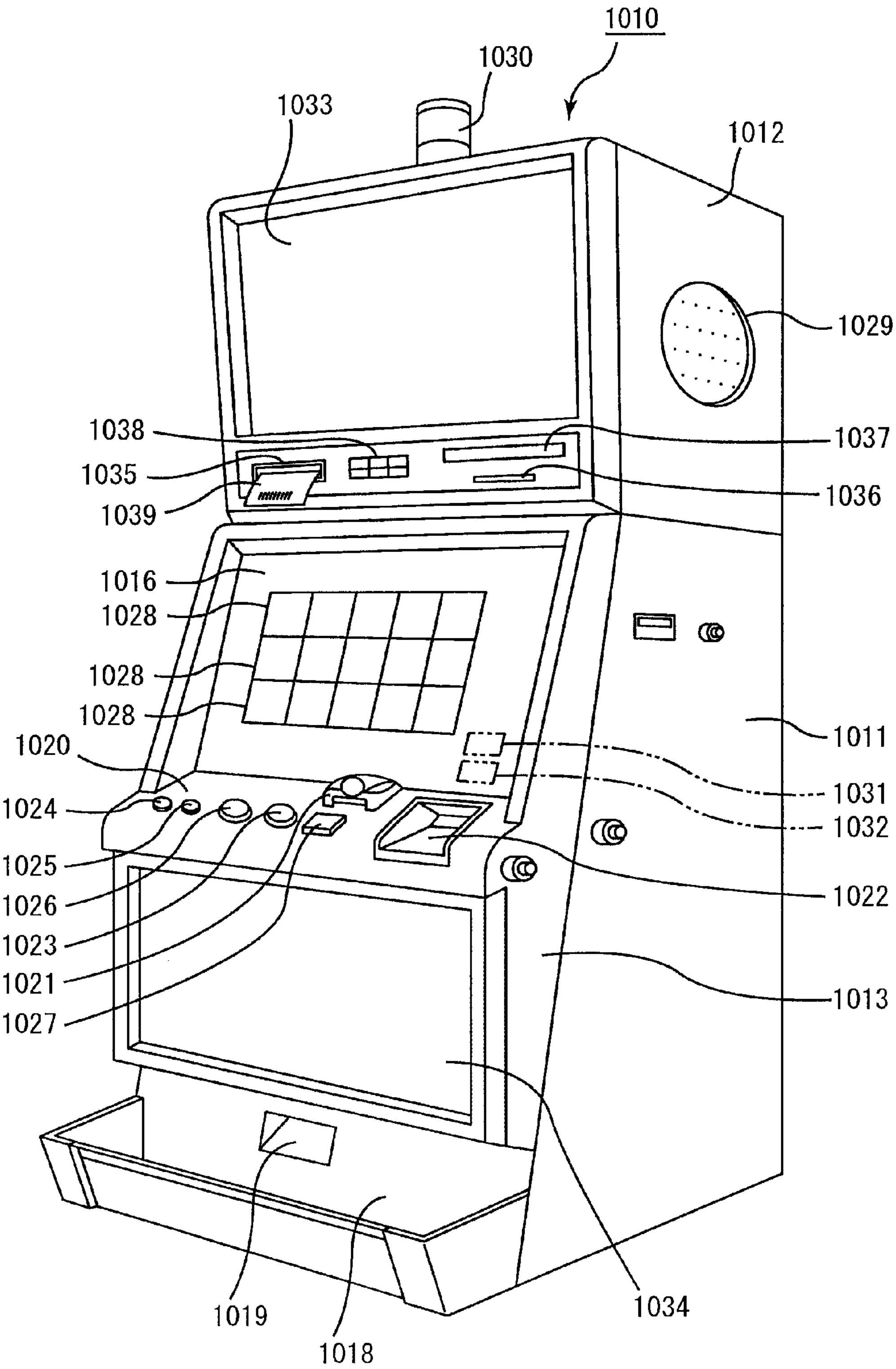
FIG. 23 is a perspective view illustrating an external view of a slot machine forming the gaming system according to the seventh embodiment.

FIG. 23 is a perspective view illustrating an external view of a slot machine forming a gaming system according to the seventh embodiment.

In the slot machine 1010, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 1010 comprises a cabinet 1011, a top box 1012 installed on the upper side of the cabinet 1011, and a main door 1013 provided at the front face of the cabinet 1011.

On the main door 1013, there is provided a lower image display panel 1016 as a display. The lower image display panel 1016 includes a transparent liquid crystal panel which displays fifteen display blocks 1028 along five columns and three rows. A single symbol is displayed in each display block 1028. Further, although not illustrated, various types of images relating to an effect, as well as the aforementioned images, are displayed to the lower image display panel 1016.

The lower image display panel 1016 corresponds to the symbol display in the present invention.

Further, a number-of-credits display portion 1031 and a number-of-payouts display portion 1032 are provided on the lower image display panel 1016. The number-of-credits display portion 1031 displays an image indicative of the number of credited coins. The number-of-payouts display portion 1032 displays an image indicative of the number of coins to be paid out.

Moreover, although not shown, a touch panel 1069 is provided at the front face of the lower image display panel 1016. The player can operate the touch panel 1069 to input a variety of commands.

Below the lower image display panel 1016, there are provided a control panel 1020 including a plurality of buttons 1023 to 1027 with each of which a command according to game progress is inputted by the player, a coin receiving slot 1021 through which a coin is accepted into the cabinet 1011, and a bill validator 1022.

The control panel 1020 is provided with a start button 1023, a change button 1024, a CASHOUT button 1025, a 1-BET button 1026 and a maximum BET button 1027. The start button 1023 is used for inputting a command to start scrolling of symbols. The change button 1024 is used for making a request of staff in the recreation facility for exchange. The CASHOUT button 1025 is used for inputting a command to pay out credited coins to a coin tray 1018.

The 1-BET button 1026 is used for inputting a command to bet one coin on a game out of credited coins. The maximum BET button 1027 is used for inputting a command to bet the maximum number of coins that can be bet on one game (50 coins in the present embodiment) out of credited coins.

The bill validator 1022 not only discriminates a regular bill from a false bill, but also accepts the regular bill into the cabinet 1011. It is to be noted that the bill validator 1022 may be configured so as to be capable of reading a later-described ticket 1039 with a barcode. At the lower front of the main door 1013, namely, below the control panel 1020, there is provided a belly glass 1034 on which a character or the like of the slot machine 1010 is drawn.

On the front surface of the top box 1012, there is provided an upper image display panel 1033. The upper image display panel 1033 includes a liquid crystal panel, which displays, for example, images indicative of introductions of the contents of games and explanations about the rules of games.

Further, a speaker 1029 is provided in the top box 1012. Under the upper image display panel 1033, there are provided a ticket printer 1035, a card reader 1036, a data display 1037, and a key pad 1038. The ticket printer 1035 prints on a ticket a barcode as coded data of the number of credits, a date, an identification number of the slot machine 1010, and the like, and outputs the ticket as the ticket 1039 with a barcode. The player can make another slot machine read the ticket 1039 with a barcode to play a game thereon, or exchange the ticket 1039 with a barcode with a bill or the like at a predetermined place in the recreation facility (e.g. a cashier in a casino).

The card reader 1036 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 1037 includes a fluorescent display and the like, and displays, for example, data read by the card reader 1036 or data inputted by the player via the key pad 1038. The key pad 1038 is used for inputting a command and data concerning issuing of a ticket, and the like.

Figure 24:
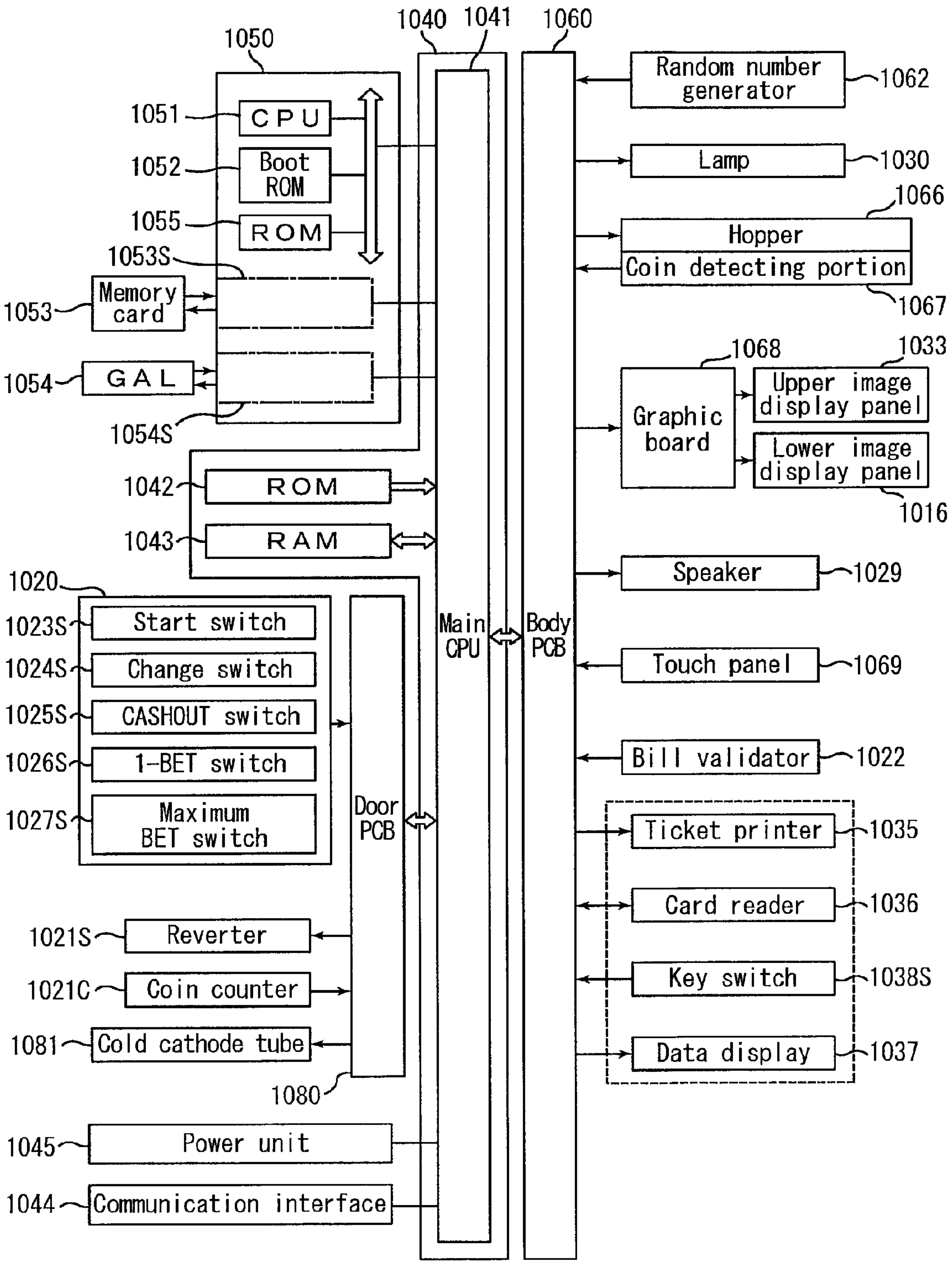
FIG. 24 is a block diagram illustrating an internal configuration of the slot machine shown in FIG. 23.

FIG. 24 is a block diagram showing an internal configuration of the slot machine shown in FIG. 23.

A gaming board 1050 is provided with a CPU (Central Processing Unit) 1051, a ROM 1055, and a boot ROM 1052 which are interconnected to one another by an internal bus, a card slot 1053S corresponding to a memory card 1053, and an IC socket 1054S corresponding to a GAL (Generic Array Logic) 1054.

The memory card 1053 includes a nonvolatile memory such as CompactFlash (registered trade mark), and stores a game program. The game program includes a symbol determination program. The symbol determination program is a program for determining symbols to be rearranged in the display blocks 1028.

Further, the card slot 1053S is configured so as to allow the memory card 1053 to be inserted thereinto or removed therefrom, and is connected to the mother board 1040 by an IDE bus. Therefore, the type and contents of a game played on the slot machine 1010 can be changed by removing the memory card 1053 from the card slot 1053S, writing another game program into the memory card 1053, and inserting the memory card 1053 into the card slot 1053S. The game program includes a program according to progress of the game. Further, the game program includes image data and sound data to be outputted during the game.

The CPU 1051, the ROM 1055 and the boot ROM 1052 interconnected to one another by an internal bus are connected to the mother board 1040 through the PCI bus. The PCI bus not only conducts signal transmission between the mother board 1040 and the gaming board 1050, but also supplies power from the mother board 1040 to the gaming board 1050.

The mother board 1040 is configured using a commercially available general-purpose mother board (a print wiring board on which fundamental components of a personal computer are mounted), and provided with a main CPU 1041, a ROM (Read Only Memory) 1042, a RAM (Random Access Memory) 1043, and a communication interface 1044. The mother board 1040 corresponds to the controller of the present invention.

The ROM 1042 comprises a memory device such as a flash memory, and stores a program such as a BIOS (Basic Input/Output System) executed by the main CPU 1041 and permanent data. When the BIOS is executed by the main CPU 1041, processing for initializing a predetermined peripheral device is conducted, concurrently with start of processing for loading the game program stored in the memory card 1053 via the gaming board 1050. It is to be noted that, in the present invention, the ROM 1042 may or may not be data rewritable one.

The ROM 1042 stores odds data indicative of correspondence relationships among types and the numbers of rearranged normal symbols and amounts of payouts (see FIG. 27), and the like.

The RAM 1043 stores data and a program to be used at the time of operation of the main CPU 1041. Further, the RAM 1043 is capable of storing a game program.

Moreover, the RAM 1043 stores data of the number of credits, the numbers of coin-ins and coin-outs in one game, and the like. The RAM 1043 also stores a maximum number of special symbols.

Moreover, the mother board 1040 is connected with a later-described body PCB (Printed Circuit Board) 1060 and a door PCB 1080 through respective USBs. Further, the mother board 1040 is connected with a power supply unit 1045 and the communication interface 1044.

The body PCB 1060 and the door PCB 1080 are connected with an instrument and a device that generate an input signal to be inputted into the main CPU 1041 and an instrument and a device operations of which are controlled by a control signal outputted from the main CPU 1041. The main CPU 1041 executes the game program stored in the RAM 1043 based on the input signal inputted into the main CPU 1041, and thereby executes the predetermined arithmetic processing, stores the result thereof into the RAM 1043, or transmits a control signal to each instrument and device as processing for controlling each instrument and device.

The body PCB 1060 is connected with a lamp 1030, a hopper 1066, a coin detecting portion 1067, a graphic board 1068, the speaker 1029, the touch panel 1069, the bill validator 1022, the ticket printer 1035, the card reader 1036, a key switch 1038S, the data display 1037, and a random number generator 1062. The lamp 1030 is lighted in a predetermined pattern based on control signals outputted from the main CPU 1041.

The hopper 1066 is installed inside the cabinet 1011, and pays out a predetermined number of coins from a coin payout exit 1019 to the coin tray 1018, based on the control signal outputted from the main CPU 1041. The coin detecting portion 1067 is provided inside the coin payout exit 1019, and outputs an input signal to the main CPU 1041 in the case of detecting payout of the predetermined number of coins from the coin payout exit 1019.

The random number generator 1062 generates a random number at a predetermined timing.

The graphic board 1068 controls image display to the upper image display panel 1033 and the lower image display panel 1016 based on the control signal outputted from the main CPU 1041. In the respective display blocks 1028 on the lower image display panel 1016, symbols are displayed in a scrolling manner or in a stopped state. The number of credits stored in the RAM 1043 is displayed to the number-of-credits display portion 1031 of the lower image display panel 1016. Further, the number of coin-outs is displayed to the number-of-payouts display portion 1032 of the lower image display panel 1016.

The graphic board 1068 comprises a VDP (Video Display Processor) for generating image data based on the control signal outputted from the main CPU 1041, a video RAM for temporarily storing image data generated by the VDP, and the like. It is to be noted that image data used in generation of the image data by the VDP is included in the game program read from the memory card 1053 and stored into the RAM 1043.

The bill validator 1022 not only discriminates a regular bill from a false bill, but also accepts the regular bill into the cabinet 1011. Upon acceptance of the regular bill, the bill validator 1022 outputs an input signal to the main CPU 1041 based on a face amount of the bill. The main CPU 1041 stores in the RAM 1043 the number of credits corresponding to the face amount of the bill transmitted with the input signal.

Based on the control signal outputted from the main CPU 1041, the ticket printer 1035 prints on a ticket a barcode as coded data of the number of credits stored in the RAM 1043, a date, and an identification number of the slot machine 1010, and the like, and outputs the ticket as the ticket 1039 with a barcode. The card reader 1036 reads data from the smart card and transmits the read data to the main CPU 1041, and writes data onto the smart card based on the control signal from the main CPU 1041. The key switch 1038S is provided on the key pad 1038, and outputs a predetermined input signal to the main CPU 1041 when the key pad 1038 is operated by the player. The data display 1037 displays data read by the card reader 1036 and data inputted by the player via the key pad 1038, based on the control signal outputted from the main CPU 1041.

The door PCB 1080 is connected with the control panel 1020, a reverter 1021S, a coin counter 1021C, and a cold cathode tube 1081. The control panel 1020 is provided with a start switch 1023S corresponding to the start button 1023, a change switch 1024S corresponding to the change button 1024, a CASHOUT switch 1025S corresponding to the CASHOUT button 1025, a 1-BET switch 10265 corresponding to the 1-BET button 1026, and a maximum BET switch 1027S corresponding to the maximum BET button 1027. Each of the switches 1023S to 1027S outputs an input signal to the main CPU 1041 when each of the buttons 1023 to 1027 corresponding thereto is operated by the player.

The coin counter 1021C is provided inside the coin receiving slot 1021, and discriminates a regular coin from a false coin inserted into the coin receiving slot 1021 by the player. Coins other than the regular coin are discharged from the coin payout exit 1019. Further, the coin counter 1021C outputs an input signal to the main CPU 1041 in detection of the regular coin.

The reverter 1021S operates based on the control signal outputted from the main CPU 1041, and distributes a coin recognized by the coin counter 1021C as the regular coin into a cash box (not shown) or the hopper 1066, which are disposed in the slot machine 1010. Namely, when the hopper 1066 is filled with coins, the regular coin is distributed into the cash box by the reverter 1021S. On the other hand, when the hopper 1066 is not filled with coins, the regular coin is distributed into the hopper 1066. The cold cathode tube 1081 functions as a back light installed on the rear face side of the lower image display panel 1016 and the upper image display panel 1033, and lighted up based on the control signal outputted from the main CPU 1041.

Figure 25:
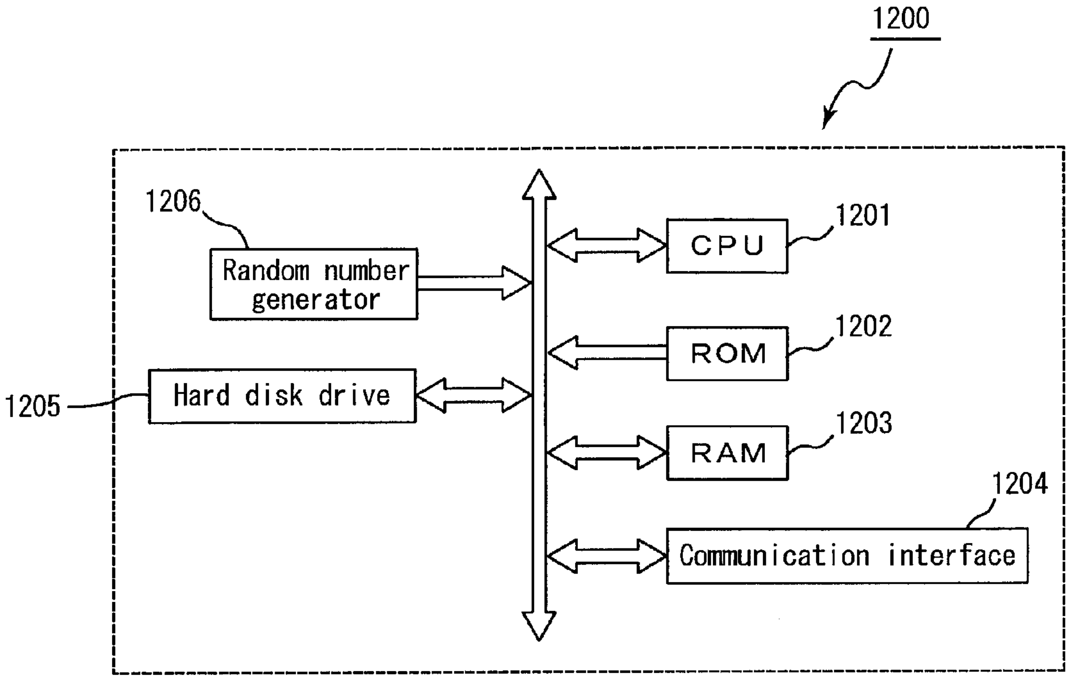
FIG. 25 is a block diagram illustrating an internal configuration of a control device forming the gaming system according to the seventh embodiment of the present invention.

FIG. 25 is a block diagram illustrating an internal configuration of a control device forming the gaming system according to the seventh embodiment of the present invention.

The control device 1200 includes a CPU 1201, a ROM 1202, a RAM 1203, a communication interface 1204, a random number generator 1206, and a hard disk drive 1205 as a memory. The random number generator 1206 generates a random number at a predetermined timing. The communication interface 1204 is connected, through communication lines 1101, to the communication interfaces 1044 in the respective slot machines 1010. The ROM 1202 stores a system program for controlling the operation of a processor, permanent data, and the like. Further, the RAM 1203 temporarily stores cumulative-value data indicative of the cumulative value, data indicative of the maximum number of special symbols, data received from each of the slot machines 1010, and the like.

The CPU 1201 corresponds to the processor in the present invention.

In the hard disk drive 1205, there is stored to-be-increased number-of-special-symbols determination table data to be referred to in determination of the number of special symbols.

Further, in the hard disk drive 1205, data indicative of the predetermined value is stored.

It is to be noted that the predetermined values in the seventh embodiment are 100, 200, 300, 400, 500, 600, 700, 800, 900, 1000, 1100, 1200, 1300, 1400, 1500, 1600, 1700, 1800, 1900, and 2000.

Figure 26:
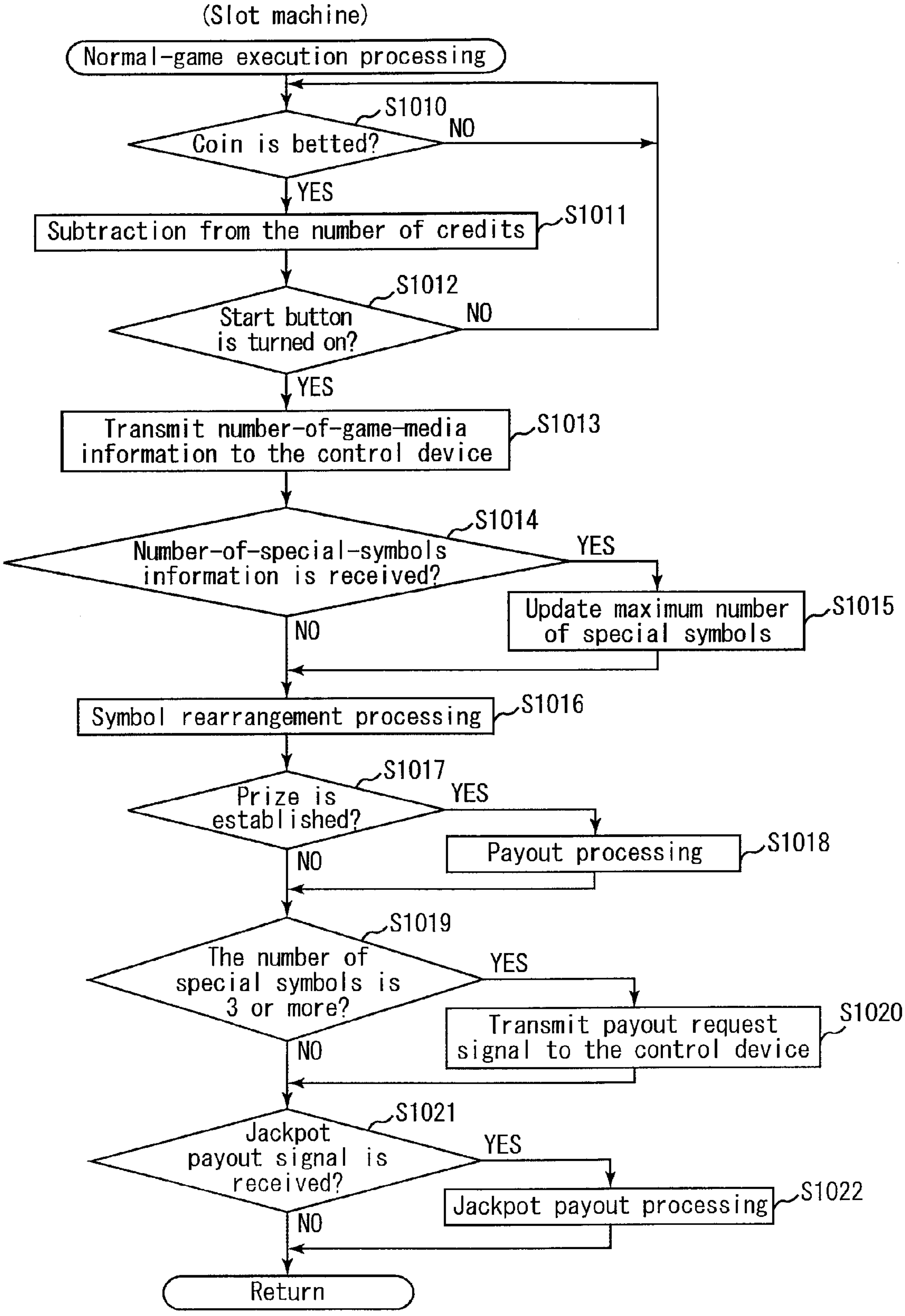
FIG. 26 is a flowchart illustrating a subroutine of normal-game execution processing in the seventh embodiment.

FIG. 26 is a flowchart illustrating a subroutine of normal-game execution processing in the seventh embodiment.

FIG. 27 is a view illustrating correspondence relationships among types and the numbers of rearranged normal symbols and amounts of payouts, in the seventh embodiment.

First, the main CPU 1041 determines whether or not a coin has been betted (step S1010). In this processing, the main CPU 1041 determines whether or not it has received an input signal that is outputted from the 1-BET switch 1026S when the 1-BET button 1026 is operated, or an input signal that is outputted from the maximum BET switch 1027S when the maximum BET button 1027 is operated. When determining that the coin has not been betted, the CPU 1041 returns the processing to step S1010.

On the other hand, when determining that the coin has been betted in step S1010, the main CPU 1041 conducts processing for making a subtraction from the number of credits stored in the RAM 1043 according to the number of betted coins (step S1011). It is to be noted that, when the number of coins to be betted is larger than the number of credits stored in the RAM 1043, the main CPU 1041 returns the processing to step S1010 without conducting the processing for making a subtraction from the number of credits stored in the RAM 1043. Further, when the number of coins to be betted exceeds the upper limit of the number of coins that can be betted in one game (50 coins in the present embodiment), the main CPU 1041 advances the processing to step S1012 without conducting the processing for making a subtraction from the number of credits stored in the RAM 1043.

Next, the main CPU 1041 determines whether or not the start button 1023 has been turned on (step S1012). In this processing, the main CPU 1041 determines whether or not it has received an input signal that is outputted from the start switch 1023S when the start button 1023 is pressed.

When the main CPU 1041 determines that the start button 1023 has not been turned on, the processing is returned to step S1010.

It is to be noted that, when the start button 1023 is not turned on (e.g. when the start button 1023 is not turned on and a command to end the game is inputted), the main CPU 1041 cancels a subtraction result in step S1011.

On the other hand, when determining in step S1012 that the start button 1023 has been turned on, the main CPU 1041 transmits the number-of-game-media information indicative of the number of betted coins to the control device 1200 (step S1013). The number-of-game-media information includes the identification number of the slot machine 1010.

The main CPU 1041 then determines whether or not it has received number-of-special-symbols information from the control device 1200 (step S1014). When determining that the main CPU 1041 has not received number-of-special-symbols information from the control device 1200, the main CPU 1041 shifts the processing to step S1016. The number-of-special-symbols information is information indicative of the maximum number of special symbols, which has been determined by the control device 1200 and is the maximum number of the special symbols that can be rearranged to the display blocks 1028.

On the other hand, when determining in step S1014 that the main CPU 1041 has received number-of-special-symbols information from the control device 1200, the main CPU 1041 stores the numeric value indicated by the received number-of-special-symbols information into the RAM 1043, as the maximum number of special symbols (step S1015).

Next, the main CPU 1041 executes symbol rearrangement processing (step S1016).

In this processing, the main CPU 1041 starts with determination of the number of special symbols to be scroll-displayed in the display blocks 1028, based on the maximum number of special symbols stored in the RAM 1043. Namely, when the maximum number of special symbols is five, the main CPU 1041 determines that the number of special symbols to be scroll-displayed is five. The main CPU 1041 then starts scroll-display of normal symbols and special symbols of the determined number, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not a prize has been established (step S1017). Here, the establishment of a prize refers to a rearrangement of at least one combination of three or more normal symbols of the same type out of “RIBBON”, “HEART”, “STAR”, “MOON”, “SUN”, “JEWEL”, “CROWN”, and “SMILE”, in the display blocks 1028 (see FIG. 27). In this processing, the main CPU 1041 counts the number of normal symbols for each type out of the symbols rearranged in step S1016. Then, the main CPU 1041 determines whether or not the counted number is three or more.

When determining that a prize has been established, the main CPU 1041 executes processing relating to the payout of coins (step S1018). In the processing, the main CPU 1041 determines the amount of payout based on the numbers of rearranged normal symbols with reference to the odds data stored in the ROM 1042.

The odds data is data indicative of the correspondence relationships between the numbers of normal symbols rearranged in the display blocks 1028 and the amounts of payouts (see FIG. 27).

For example, in the case that two coins have been betted, when three symbols of “SUN” are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1017 that a prize has not been established, or after executing the processing of step S1018, the main CPU 1041 determines whether or not the number of special symbols out of the symbols rearranged in step S1016 is three or more (step S1019). When determining that the number of special symbols is not three or more, the main CPU 1041 shifts the processing to step S1021.

On the other hand, when determining in step S1019 that the number of special symbols is three or more, the main CPU 1041 transmits a payout request signal to the control device 1200 (step S1020). A payout request signal is a signal requesting the control device 1200 to pay out the jackpot. A payout request signal includes the number of rearranged special symbols and the identification number of the slot machine 1010.

Next, the main CPU 1041 determines whether or not it has received a jackpot payout signal from the control device 1200 (step S1021). When determining that the main CPU 1041 has received a jackpot payout signal from the control device 1200, the main CPU 1041 executes jackpot payout processing (step S1022). In the processing, the main CPU 1041 determines an amount of payout, based on the number of payouts included in the received jackpot payout signal.

In the case of accumulating coins, the main CPU 1041 conducts the processing of adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

When determining that the main CPU 1041 has not received a jackpot payout signal from the control device 1200 in step S1021 or after executing the processing of step S1022, the main CPU 1041 completes the present subroutine.

Next, there is described processing performed in the control device 1200.

Figure 28:
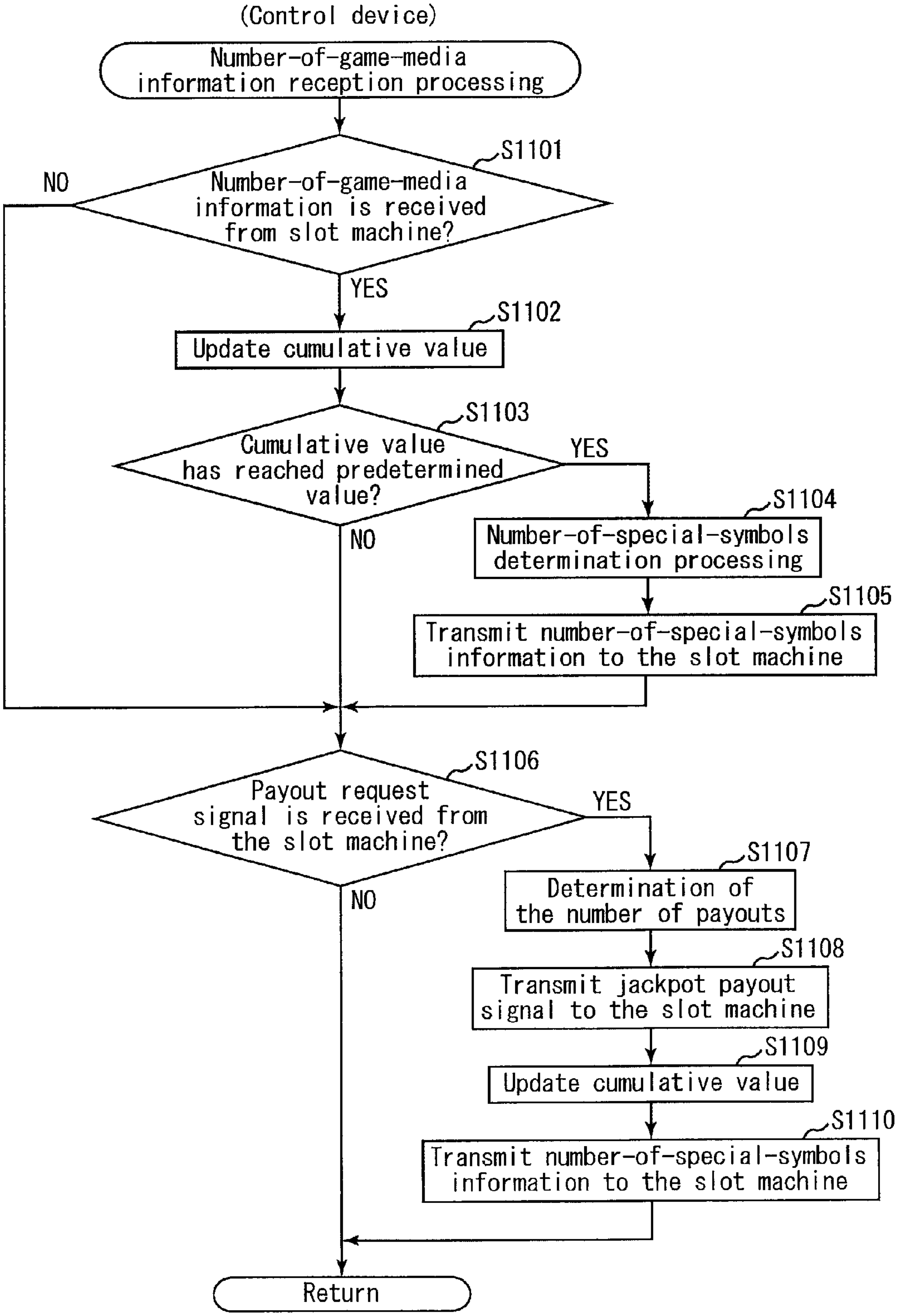
FIG. 28 is a flowchart illustrating a subroutine of number-of-game-media information reception processing in the seventh embodiment.

FIG. 28 is a flowchart illustrating a subroutine of number-of-game-media information reception processing in the seventh embodiment.

Seventh, the CPU 1201 determines whether or not it has received number-of-game-media information from the slot machine 1010 at a predetermined timing (step S1101).

When determining that the CPU 1201 has not received number-of-game-media information, the CPU 1201 shifts the processing to step S1106.

On the other hand, when determining that the CPU 1201 has received number-of-game-media information, the CPU 1201 adds a part (10% in the present embodiment) of the number of coins indicated by the received number-of-game-media information, to the cumulative value indicated by the cumulative-value data stored in the RAM 1203, sets the numeric value obtained by the addition as an updated cumulative value, and stores the cumulative-value data indicative of the updated cumulative value into the RAM 1203 (step S1102). It is to be noted that the digits after the decimal point are truncated in the processing.

Next, the CPU 1201 determines whether or not the cumulative value has reached the predetermined value, based on the cumulative-value data stored in the RAM 1203 (step S1103). When determining that the cumulative value has not reached the predetermined value, the CPU 1201 shifts the processing to step S1106.

It is to be noted that, as already described, the predetermined values in the seventh embodiment are 100, 200, 300, 400, 500, 600, 700, 800, 900, 1000, 1100, 1200, 1300, 1400, 1500, 1600, 1700, 1800, 1900, and 2000. Namely, the number of special symbols increases every time the cumulative value accumulates by 100.

On the other hand, when determining that the cumulative value has reached the predetermined value, the CPU 1201 executes number-of-special-symbols determination processing (step S1104). In the processing, the CPU 1201 first extracts the random number generated by the random number generator 206. The CPU 1201 then determines the to-be-increased number of special symbols, based on the extracted random number, the cumulative value indicated by the cumulative-value data stored in the RAM 1203, and a to-be-increased number-of-special-symbols determination table (see FIG. 29) stored in the hard disk drive 205. The CPU 1201 stores into the RAM 1203 a numeric value obtained by adding the determined to-be increased number of special symbols to the maximum number of special symbols stored in the RAM 1203, as an updated maximum number of special symbols.

FIG. 29 is a view illustrating to-be-increased number-of-special-symbols determination table in the seventh embodiment.

As illustrated in FIG. 29, there are five types of to-be-increased number-of-special-symbols determination tables. The to-be-increased number-of-special-symbols determination table to be selected changes according to the cumulative value; the tables are set such that the number of special symbols increases by a larger number easily as the cumulative value becomes larger.

As illustrated in FIG. 29, random number values to be used in the to-be-increased number-of-special-symbols determination tables are 65536 numeric values that fall in the numerical range of 0 to 65535, and each of the numeric values is associated with one of the to-be-increased numbers of special symbols. When for example a random number associated with the to-be-increased number-of-special-symbols "3" is extracted, the to-be-increased number of special symbols is determined to be three. It is to be noted that the figure shows the probabilities for the respective to-be-increased numbers of special symbols to be selected.

Returning to FIG. 28, the CPU 1201 transmits to the slot machines 1010 the number-of-special-symbols information indicative of the maximum number of special symbols stored in the RAM 1203 in step S1104 (step S1105).

Next, the CPU 1201 determines whether or not it has received a payout request signal from the slot machine 1010 (step S1106). When determining that the CPU 1201 has not received a payout request signal, the CPU 1201 completes the present subroutine.

On the other hand, when determining that the CPU 1201 has received a payout request signal, the CPU 1201 determines the number of payouts based on the received payout request signal (step S1107). In the processing, the CPU 1201 determines the number of payouts, based on the number of rearranged special symbols included in the payout request signal and on the cumulative value indicated by the cumulative-value data stored in the RAM 1203. More specifically, when the number of rearranged special symbols is three, the CPU 1201 determines that the number of payouts is to be 30% of the cumulative value indicated by the cumulative-value data stored in the RAM 1203. When the number of rearranged special symbols is four, the CPU 1201 determines that the number of payouts is to be 60% of the cumulative value indicated by the cumulative-value data stored in the RAM 1203. When the number of rearranged special symbols is five, the CPU 1201 determines that the number of payouts is to be 80% of the cumulative value indicated by the cumulative-value data stored in the RAM 1203. When the number of rearranged special symbols is six or more, the CPU 1201 determines that the number of payouts is to be the whole cumulative value indicated by the cumulative-value data stored in the RAM 1203. It is to be noted that digits after the decimal point are truncated in this processing.

The CPU 1201 transmits a jackpot payout signal to the slot machine 1010 that has transmitted the payout request signal received in step S1106 (step S1108). The jackpot payout signal includes the number of payouts determined in step S1107.

The CPU 1201 then sets as an updated cumulative value a value obtained by subtracting the number of payouts determined in step S1107 from the cumulative value indicated by the cumulative-value data stored in the RAM 1203, and stores the cumulative-value data indicative of the updated cumulative value into the RAM 1203 (step S1109).

Next, the CPU 1201 stores "3" into the RAM 1203, as an updated maximum number of special symbols. The CPU 1201 then transmits the number-of-special-symbols information indicative of the maximum number of special symbols "3" stored in the RAM 1203, to the slot machines 1010 (step S1110).

When determining in step S1106 that the CPU 1201 has not received a payout request signal or after executing the processing of step S1110, the CPU 1201 completes the present subroutine.

As described above, according to the gaming system 1100 relating to the seventh embodiment, the control device 1200 cumulatively counts as the cumulative value a part of the game media betted in the respective slot machines 1010, and increases the number of special symbols that can be displayed to the display blocks 1028 based on the cumulative value obtained by the counting.

Since the number of special symbols that can be displayed to the display blocks 1028 increases based on the cumulative value, the contents of the game change according to the cumulative value; it is therefore possible to make the player find the game interesting.

Further, an increase in the number of special symbols to be displayed to the display blocks 1028 generates an advantageous state for the player; it is therefore possible to make the player play the game for a long period of time.

According to the gaming system 1100 relating to the seventh embodiment, the number of special symbols that can be displayed to the display blocks 1028 increases when the cumulative value reaches the predetermined value. Thus, an increase in the number of special symbols displayed to the display blocks 1028 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the seventh embodiment, the number of special symbols that can be displayed to the display blocks 1028 increases a plurality of times before a payout of the jackpot. It is possible to excite the player every time the number of special symbols increases, and to make the player immersed in the game.

Moreover, it is possible to further enhance interesting aspects of the game by allowing the number of special symbols that can be displayed to the display blocks 1028 to increase a plurality of times.

In addition, since the number of special symbols increases in stages before a payout of the jackpot, an advantageous state for the player is generated in stages, thereby fueling the player's hope.

In the seventh embodiment, there has been described a case where the normal symbols rearranged in the display blocks 1028 are all scatter symbols. However, normal symbols in the present invention are not limited to the scatter symbols. For example, a pay line may be provided and a prize may be established when a certain combination of a plurality of symbols is rearranged along the pay line. Also, for example, symbols which cause establishment of a prize based on the pay line may be combined with scatter symbols.

In the seventh embodiment, a case has been described where the main CPU 1041 transmits the number-of-game-media information indicative of the number of betted coins to the control device 1200, and the CPU 1201 adds the value corresponding to a part (10% in the present embodiment) of the number of coins indicated by the received number-of-game-media information, to the cumulative value indicated by the cumulative-value data stored in the RAM 1203, sets as an updated cumulative value the numeric value obtained by the addition, and stores the cumulative-value data indicative of the updated cumulative value into the RAM 1203. However, in the present invention, a configuration may be adopted where the main CPU 1041 calculates the value corresponding to 10% of the betted coins and transmits the number-of-game-media information indicative of the calculated numeric value to the control device 1200, and the CPU 1201 adds the numeric value indicated by the received number-of-game-media information to the cumulative value indicated by the cumulative-value data stored in the RAM 1203, sets as an updated cumulative value the numeric value obtained by the addition, and stores the cumulative-value data indicative of the updated cumulative value.

In the seventh embodiment, a case has been described where the predetermined values are set at every 100 values. However, in the present invention, the way of setting the predetermined values is not particularly limited, and the predetermined values may be 100, 300, 600, 1000, and 1500.

In the seventh embodiment, a case has been described where the CPU 1201 adds the value corresponding to a part (10% in the present embodiment) of the number of coins indicated by the received number-of-game-media information, to the cumulative value indicated by the cumulative-value data stored in the RAM 1203. However, in the present invention, the ratio for a part of the number of betted game media is not particularly limited, and may be, for example, 20% of the number of betted game media.

Although a case has been described in the seventh embodiment where the number of special symbols always increases when the cumulative value reaches the predetermined value, whether or not to increase the number of special symbols when the cumulative value has reached the predetermined value may be determined by lottery in the present invention.

Such a configuration can excite the player about whether or not the number of special symbols will be increased.

Eighth Embodiment

In the seventh embodiment described above, a case has been described where eight types of normal symbols of "RIBBON", "HEART", "STAR", "MOON", "SUN", "JEWEL", "CROWN", and "SMILE" are all scatter symbols, and where a symbol of "JP", being a jackpot trigger symbol, is a special symbol.

In an eighth embodiment, five types of symbols of "HEART", "STAR", "SUN", "JEWEL", and "SMILE" are special symbols, and three types of symbols of "RIBBON", "MOON", and "CROWN" are normal symbols irrelative to payouts, and a symbol of "JP" is a jackpot trigger symbol. It is to be noted that the special symbols are scatter symbols, in the eighth embodiment.

Further, it is to be noted that constituent elements corresponding to those of the gaming system 1100 according to the aforementioned seventh embodiment will be provided with the same signs, in descriptions given below.

Furthermore, omitted are descriptions of the parts to which the descriptions in the aforementioned seventh embodiment are applicable in the eighth embodiment described below.

Figure 30:
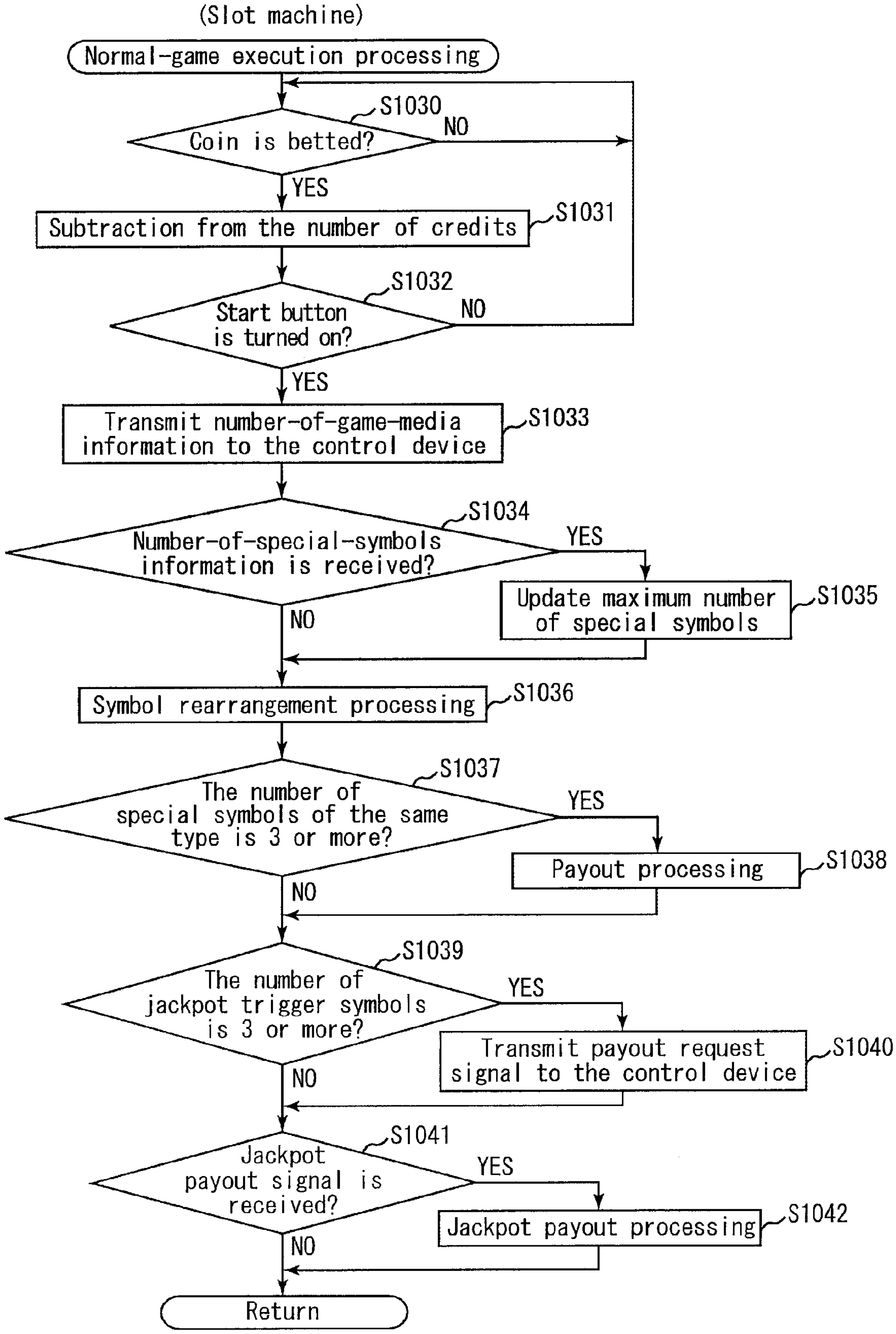
FIG. 30 is a flowchart illustrating a subroutine of normal-game execution processing in an eighth embodiment.

FIG. 30 is a flowchart illustrating a subroutine of normal-game execution processing in the eighth embodiment.

FIG. 31 is a view illustrating correspondence relationships among types and the numbers of rearranged special symbols and amounts of payouts, in the eighth embodiment.

Since the processing of step S1030 to step S1035 is similar to the processing of step S1010 to step S1015, descriptions thereof are omitted.

Next, the main CPU 1041 executes symbol rearrangement processing (step S1036).

In this processing, the main CPU 1041 starts with determination of the number of special symbols of each type to be scroll-displayed in the display blocks 1028, based on the maximum number of special symbols stored in the RAM 1043. Namely, when the maximum number of special symbols is five, the main CPU 1041 determines that the number of special symbols of each type to be scroll-displayed is five. The main CPU 1041 then starts scroll-display of normal symbols, special symbols of the determined number and the symbols of "JP" being jackpot trigger symbols, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not three or more special symbols of the same type are rearranged (step S1037). Namely, the main CPU 1041 determines whether or not at least one combination of three or more special symbols of the same type out of "HEART", "STAR", "SUN", "JEWEL", and "SMILE", is rearranged in the display blocks 1028 (see FIG. 31). In this processing, the main CPU 1041 counts the number of special symbols for each type out of the symbols rearranged in step S1036. Then, the main CPU 1041 determines whether or not the counted number is three or more.

When determining that three or special symbols of the same type are rearranged, the main CPU 1041 executes processing relating to the payout of coins (step S1038). In the processing, the main CPU 1041 determines the amount of payout based on the numbers of rearranged special symbols with reference to the odds data stored in the ROM 1042. The odds data is data indicative of the correspondence relationships between the numbers of special symbols rearranged in the display blocks 1028 and the amounts of payouts (see FIG. 31).

For example, when two coins have been betted and thereafter three symbols of "SUN" are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

It is to be noted that the odds data indicative of the correspondence relationships among the types and the numbers of rearranged special symbols and the amounts of payouts (see FIG. 31) is stored in the ROM 1042.

When determining in step S1037 that three or more special symbols of the same type are not rearranged or after executing the processing of step S1038, the main CPU 1041 determines whether or not the number of symbols of "JP" being jackpot trigger symbols out of the symbols rearranged in step S1036 is three or more (step S1039). When determining that the number of symbols of "JP" being jackpot trigger symbols is not three or more, the main CPU 1041 shifts the processing to step S1041.

On the other hand, when determining in step S1039 that the number of symbols of "JP" being jackpot trigger symbols is three or more, the main CPU 1041 transmits a payout request signal to the control device 1200 (step S1040). A payout request signal is a signal requesting the control device 1200 to pay out the jackpot. A payout request signal includes the number of rearranged symbols of "JP" being jackpot trigger symbols and the identification number of the slot machine 1010.

Since the processing of step S1041 to step S1042 is similar to the processing of step S1021 to step S1022 in FIG. 26, descriptions thereof are omitted.

Number-of-game-media information reception processing in the eighth embodiment is substantially the same as the number-of-game-media information reception processing in the seventh embodiment, but is different in the point described below.

In step S1107 in the seventh embodiment, the number of payouts is determined based on the number of rearranged special symbols included in the payout request signal; however, in step S1107 in the eighth embodiment, the number of payouts is determined based on the number of rearranged jackpot trigger symbols included in the payout request signal.

Further, in the eighth embodiment, the to-be-increased number-of-special-symbols determination table data stored in the hard disk drive 1205, being the data to be referred in the number-of-game-media information reception processing, is different from the to-be-increased number-of-special-symbols determination table data stored in the hard disk drive 1205 in the seventh embodiment.

FIG. 32 is a view illustrating to-be-increased number-of-special-symbols determination table in the eighth embodiment.

As illustrated in FIG. 32, there are five types of to-be-increased number-of-special-symbols determination tables. The to-be-increased number-of-special-symbols determination table to be selected changes according to the cumulative value; the tables are set such that the number of special symbols increases by a larger number easily as the cumulative value becomes larger.

As illustrated in FIG. 32, random number values to be used in the to-be-increased number-of-special-symbols determination tables are 65536 numeric values that fall in the numerical range of 0 to 65535, and each of the numeric values is associated with one of the to-be-increased numbers of special symbols. When for example a random number associated with the to-be-increased number-of-special-symbols "8" is extracted, the to-be-increased number of special symbols is determined to be eight. It is to be noted that the figure shows the probabilities for the respective to-be-increased numbers of special symbols to be selected.

As described above, according to the gaming system 1100 relating to the eighth embodiment, the control device 1200 cumulatively counts as the cumulative value a part of the game media betted in the respective slot machines 1010, and increases the number of special symbols that can be displayed to the display blocks 1028 based on the cumulative value obtained by the counting.

Since the number of special symbols that can be displayed to the display blocks 1028 increases based on the cumulative value, the contents of the game change according to the cumulative value; it is therefore possible to make the player find the game interesting.

Further, an increase in the number of special symbols to be displayed to the display blocks 1028 generates an advantageous state for the player; it is therefore possible to make the player play the game for a long period of time.

According to the gaming system 1100 relating to the eighth embodiment, the number of special symbols that can be displayed to the display blocks 1028 increases when the cumulative value reaches the predetermined value. Thus, an increase in the number of special symbols displayed to the display blocks 1028 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the eighth embodiment, the number of special symbols that can be displayed to the display blocks 1028 increases a plurality of times before a payout of the jackpot. It is possible to excite the player every time the number of special symbols increases, and to make the player immersed in the game.

Moreover, it is possible to further enhance interesting aspects of the game by allowing the number of special symbols that can be displayed to the display blocks 1028 to increase a plurality of times.

In addition, since the number of special symbols increases in stages before a payout of the jackpot, an advantageous state for the player is generated in stages, thereby fueling the player's hope.

Ninth Embodiment

In the seventh embodiment described above, a case has been described where eight types of normal symbols of "RIBBON", "HEART", "STAR", "MOON", "SUN", "JEWEL", "CROWN", and "SMILE" are all scatter symbols, and where a symbol of "JP", being a jackpot trigger symbol, is a special symbol.

In a ninth embodiment, eight types of symbols of "RIBBON", "HEART", "STAR", "MOON", "SUN", "JEWEL", "CROWN", and "SMILE" are special symbols, and a symbol of "JP" is a jackpot trigger symbol. It is to be noted that the special symbols are scatter symbols, in the ninth embodiment.

In the seventh embodiment described above, a case has been described where the number of special symbols increases based on the cumulative value. However, in the ninth embodiment, a specific number indicative of the minimum number of special symbols required for establishment of a prize increases based on the cumulative value.

It is to be noted that constituent elements corresponding to those of the gaming system 1100 according to the aforementioned seventh embodiment will be provided with the same signs, in descriptions given below.

Further, omitted are descriptions of the parts to which the descriptions in the aforementioned seventh embodiment are applicable in the ninth embodiment described below.

Figure 33:
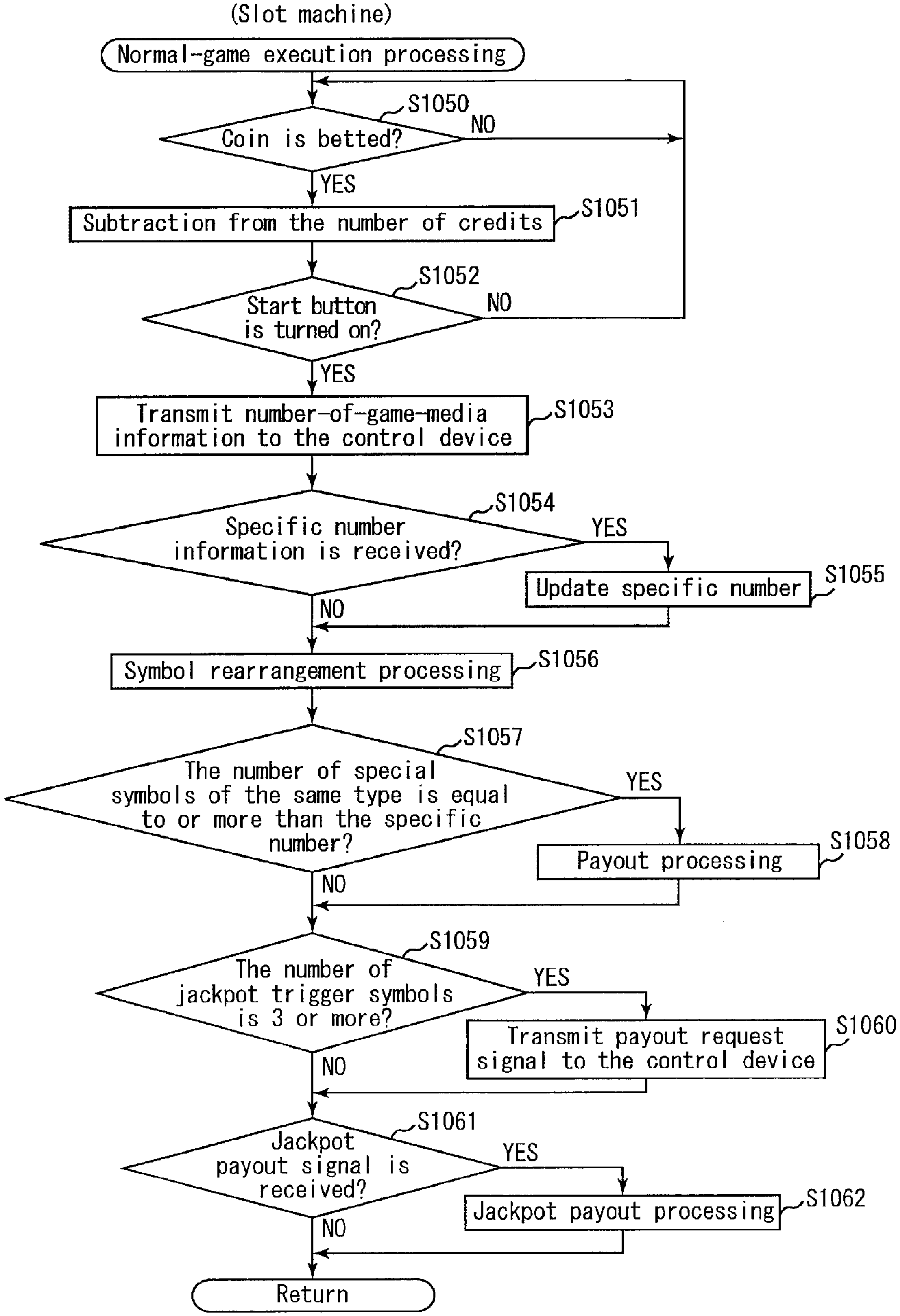
FIG. 33 is a flowchart illustrating a subroutine of normal-game execution processing in a ninth embodiment.

FIG. 33 is a flowchart illustrating a subroutine of normal-game execution processing in the ninth embodiment.

FIG. 34 is a view illustrating correspondence relationships among types and the numbers of rearranged special symbols and amounts of payout, in the ninth embodiment.

Since the processing of step S1050 to step S1053 is similar to the processing of step S1010 to step S1013 in FIG. 26, descriptions thereof are omitted.

The main CPU 1041 then determines whether or not it has received specific-number information from the control device 1200 (step S1054). When determining that the main CPU 1041 has not received specific-number information from the control device 1200, the main CPU 1041 shifts the processing to step S1056. The specific-number information is information indicative of the specific number, which is the minimum number of special symbols required for establishment of a prize.

On the other hand, when determining in step S1054 that the main CPU 1041 has received specific-number information from the control device 1200, the main CPU 1041 stores the numeric value indicated by the received specific-number information into the RAM 1043, as the specific number (step S1055).

Next, the main CPU 1041 executes symbol rearrangement processing (step S1056).

In this processing, the main CPU 1041 starts with scroll-display of special symbols and symbols of "JP" being jackpot trigger symbols, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not special symbols of the same type in number equal to or more than the specific number are rearranged (step S1057). In this processing, the main CPU 1041 determines whether or not at least one combination of special symbols of the same type in number equal to or more than the specific number out of "RIBBON", "HEART", "STAR", "MOON", "SUN", "JEWEL", "CROWN", and "SMILE" is rearranged in the display blocks 1028. In this processing, the main CPU 1041 counts the number of special symbols for each type out of the symbols rearranged in step S1056. Then, the main CPU 1041 determines whether or not the counted number is equal to or more than the specific number stored in the RAM 1043.

When special symbols of the same type are rearranged in number equal to or more than the specific number, the main CPU 1041 executes processing relating to the payout of coins (step S1058). In the processing, the main CPU 1041 determines the amount of payout based on the numbers of rearranged special symbols with reference to the odds data stored in the ROM 1042. The odds data is data indicative of the correspondence relationships between the numbers of special symbols rearranged in the display blocks 1028 and the amounts of payouts (see FIG. 34).

For example, in a case where the specific number is three, when two coins have been betted and thereafter three symbols of "SUN" are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 66 in order to pay out coins in an amount corresponding to the determined amount of payout.

It is to be noted that the odds data indicative of the correspondence relationships among the types and the numbers of rearranged special symbols and the amounts of payouts (see FIG. 34) is stored in the ROM 1042.

When determining in step S1057 that special symbols of the same type in number equal to or more than the specific number are not rearranged, or after executing the processing of step S1058, the main CPU 1041 determines whether or not the number of symbols of "JP" being jackpot trigger symbols out of the symbols rearranged in step S1056 is three or more (step S1059). When determining that the number of symbols of "JP" being jackpot trigger symbols is not three or more, the main CPU 1041 shifts the processing to step S1061.

On the other hand, when determining in step S1059 that the number of symbols of "JP" being jackpot trigger symbols is three or more, the main CPU 1041 transmits a payout request signal to the control device 1200 (step S1060). A payout request signal is a signal requesting the control device 1200 to pay out the jackpot. A payout request signal includes the number of rearranged symbols of "JP" being jackpot trigger symbols and the identification number of the slot machine 1010.

Since the processing of step S1061 to step S1062 is similar to the processing of step S1021 to step S1022, descriptions thereof are omitted.

Next, there is described processing performed in the control device 1200.

Figure 35:
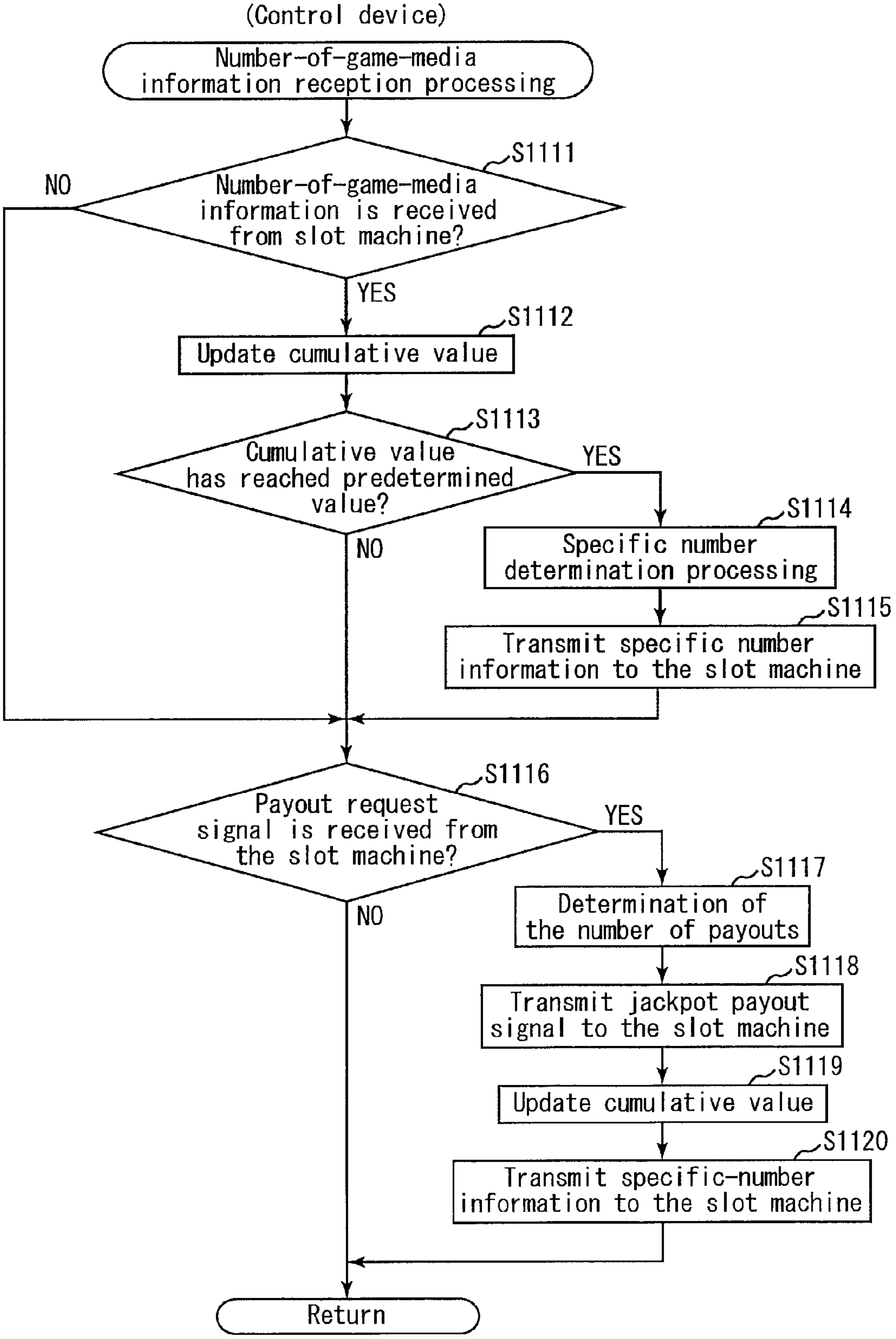
FIG. 35 is a flowchart illustrating a subroutine of number-of-game-media information reception processing in the ninth embodiment.

FIG. 35 is a flowchart illustrating a subroutine of number-of-game-media information reception processing in the ninth embodiment.

Since the processing of step S1111 to step S1112 is similar to the processing of step S1101 to step S1102 in FIG. 28, descriptions thereof are omitted.

Next, the CPU 1201 determines whether or not the cumulative value has reached the predetermined value based on the cumulative-value data stored in the RAM 1203 (step S1113). When determining that the cumulative value has not reached the predetermined value, the CPU 1201 shifts the processing to step S1116.

It is to be noted that the predetermined values in the ninth embodiment are 100, 200, 300, 400, 500, 600, 700, 800, 900, 1000, 1100, 1200, 1300, 1400, 1500, 1600, 1700, 1800, 1900, and 2000.

Namely, the specific number increases every time the cumulative value accumulates by 100.

On the other hand, when determining that the cumulative value has reached the predetermined value, the CPU 1201 executes specific-number determination processing (step S1114). In the processing, the CPU 1201 first extracts the random number generated by the random number generator 1206. The CPU 1201 then determines the to-be-increased specific number, based on the extracted random number, the cumulative value indicated by the cumulative-value data stored in the RAM 1203, and a to-be-increased specific-number determination table (see FIG. 36) stored in the hard disk drive 1205. The CPU 1201 stores into the RAM 1203 a numeric value obtained by adding the determined to-be-increased specific number to the specific number stored in the RAM 1203, as an updated specific number.

FIG. 36 is a view illustrating to-be-increased specific-number determination table in the ninth embodiment.

The to-be-increased specific-number determination table is stored in the hard disk drive 1205.

As illustrated in FIG. 36, there are five types of to-be-increased specific-number determination tables. The to-be-increased specific-number determination table to be selected changes according to the cumulative value; and the tables are set such that the specific number increases by a larger number easily as the cumulative value becomes larger.

As illustrated in FIG. 36, random number values to be used in the to-be-increased specific-number determination tables are 65536 numeric values that fall in the numerical range of 0 to 65535, and each of the numeric values is associated with one of the to-be-increased specific numbers. When for example a random number associated with the to-be-increased specific number "3" is extracted, the to-be-increased specific number is determined to be three. It is to be noted that the figure shows the probabilities for the respective to-be-increased specific numbers to be selected.

Returning to FIG. 35, the CPU 1201 transmits to the slot machines 1010 the specific-number information indicative of the specific number stored in the RAM 1203 in step S1114 (step S1115).

Next, the CPU 1201 determines whether or not it has received a payout request signal from the slot machine 1010 (step S1116). When determining that the CPU 1201 has not received a payout request signal, the CPU 1201 completes the present subroutine.

On the other hand, when determining that the CPU 1201 has received a payout request signal, the CPU 1201 determines the number of payouts based on the received payout request signal (step S1117). In the processing, the CPU 1201 determines the number of payouts, based on the number of rearranged jackpot trigger symbols included in the payout request signal and on the cumulative value indicated by the cumulative-value data stored in the RAM 1203. More specifically, when the number of rearranged jackpot trigger symbols is three, the CPU 1201 determines that the number of payouts is to be 30% of the cumulative value indicated by the cumulative-value data stored in the RAM 1203. When the number of rearranged jackpot trigger symbols is four, the CPU 1201 determines that the number of payouts is to be 60% of the cumulative value indicated by the cumulative-value data stored in the RAM 1203. When the number of rearranged jackpot trigger symbols is five, the CPU 1201 determines that the number of payouts is to be 80% of the cumulative value indicated by the cumulative-value data stored in the RAM 1203. When the number of rearranged jackpot trigger symbols is six or more, the CPU 1201 determines that the number of payouts is to be the whole cumulative value indicated by the cumulative-value data stored in the RAM 1203. It is to be noted that digits after the decimal point are truncated in this processing.

The CPU 1201 transmits a jackpot payout signal to the slot machine 1010 that has transmitted the payout request signal received in step S1116 (step S1118). The jackpot payout signal includes the number of payouts determined in step S1117.

The CPU 1201 then sets as an updated cumulative value a value obtained by subtracting the number of payouts determined in step S1117 from the cumulative value indicated by the cumulative-value data stored in the RAM 1203, and stores the cumulative-value data indicative of the updated cumulative value into the RAM 1203 (step S1119).

Next, the CPU 1201 stores "3" into the RAM 1203, as an updated specific number. The CPU 1201 then transmits specific-number information indicative of "3" being the specific number stored in the RAM 1203, to the slot machines 1010 (step S1120).

When determining in step S1116 that the CPU 1201 has not received a payout request signal or after executing the processing of step S1120, the CPU 1201 completes the present subroutine.

As described above, according to the gaming system 1100 relating to the ninth embodiment, the control device 1200 cumulatively counts as the cumulative value a part of the game media betted in the respective slot machines 1010, and increases the specific number based on the cumulative value obtained by the counting. The slot machine 1010 then conducts a payout of game media when the number of special symbols out of the symbols stop-displayed to the display blocks 1028 is equal to or more than the specific number.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is steadily approaching a payout of the jackpot; it is therefore possible to make the player play the game for a long period of time.

According to the gaming system 1100 relating to the ninth embodiment, the specific number increases when the cumulative value reaches the predetermined value. Thus, an increase in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the ninth embodiment, the specific number increases a plurality of times before a payout of the jackpot. It is possible to further enhance interesting aspects of the game by allowing the specific number to change a plurality of times.

Although a case has been described in the ninth embodiment where the specific number always increases when the cumulative value reaches the predetermined value, whether or not to increase the number of special symbols when the cumulative value has reached the predetermined value may be determined by lottery in the present invention.

Such a configuration can excite the player about whether or not the number of special symbols will be increased.

Tenth Embodiment

In the seventh embodiment described above, a case has been described where the control device 1200 increases the number of special symbols based on the cumulative value.

In a tenth embodiment, each of the slot machines 1010 increases the number of special symbols based on the cumulative value.

In the tenth embodiment, in common with the seventh embodiment, it is to be noted that eight types of normal symbols of "RIBBON", "HEART", "STAR", "MOON", "SUN", "JEWEL", "CROWN", and "SMILE" are all scatter symbols, and a symbol of "JP", being a jackpot trigger symbol, is a special symbol.

It is to be noted that, although the to-be-increased number-of-special-symbols determination table (see FIG. 29) is stored in the hard disk drive 1205 included in the control device 1200 in the seventh embodiment, the to-be-increased number-of-special-symbols determination table (see FIG. 29) is stored in the ROM 1042 included in the slot machine 1010 in the tenth embodiment.

In the descriptions below, constituent elements corresponding to those of the gaming system 1100 according to the aforementioned seventh embodiment will be provided with the same signs.

Further, omitted are descriptions of the parts to which the descriptions in the aforementioned seventh embodiment are applicable in the tenth embodiment described below.

Figure 37A:
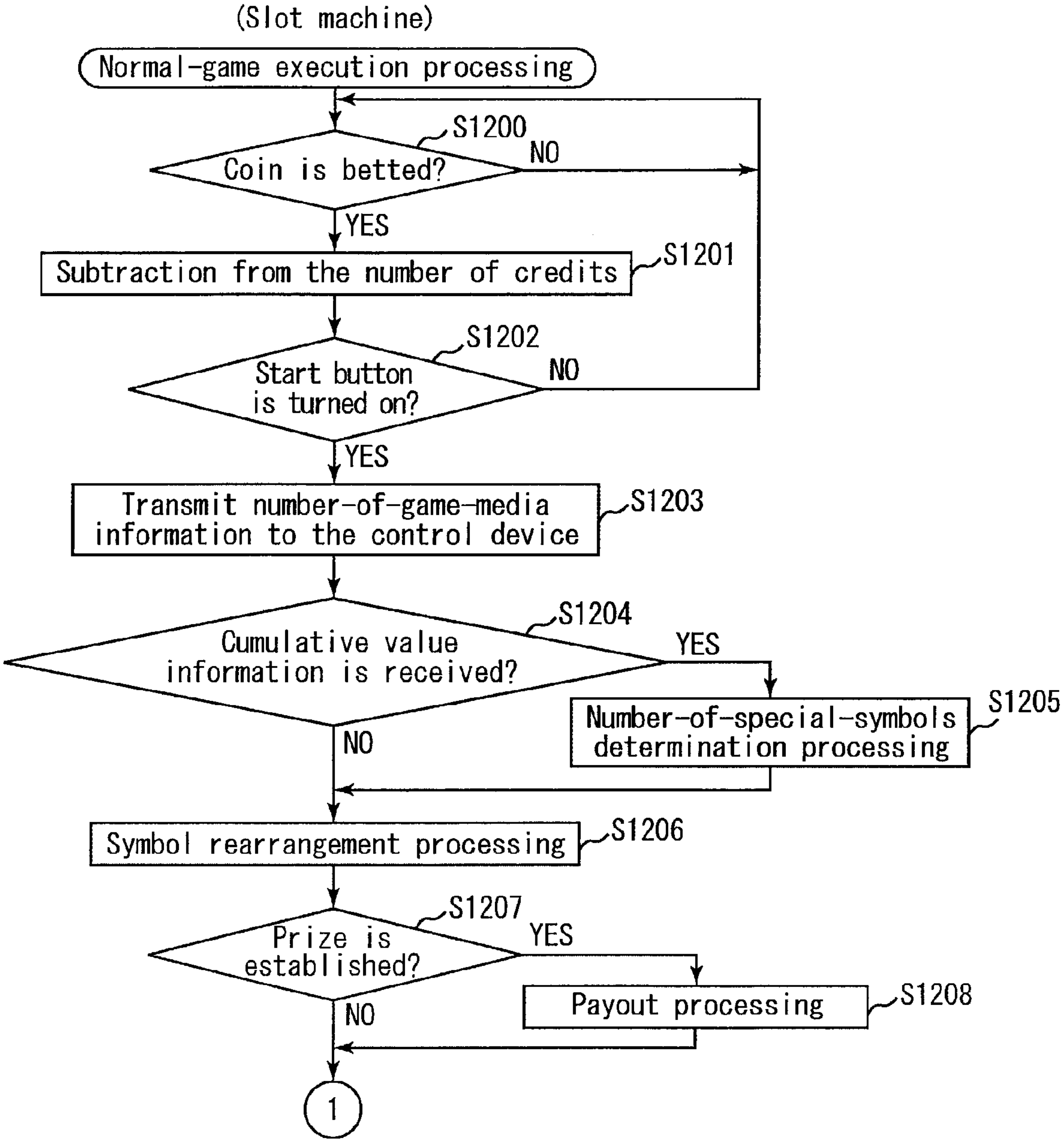
FIG. 37A is a flowchart illustrating a subroutine of normal-game execution processing in a tenth embodiment.
Figure 37B:
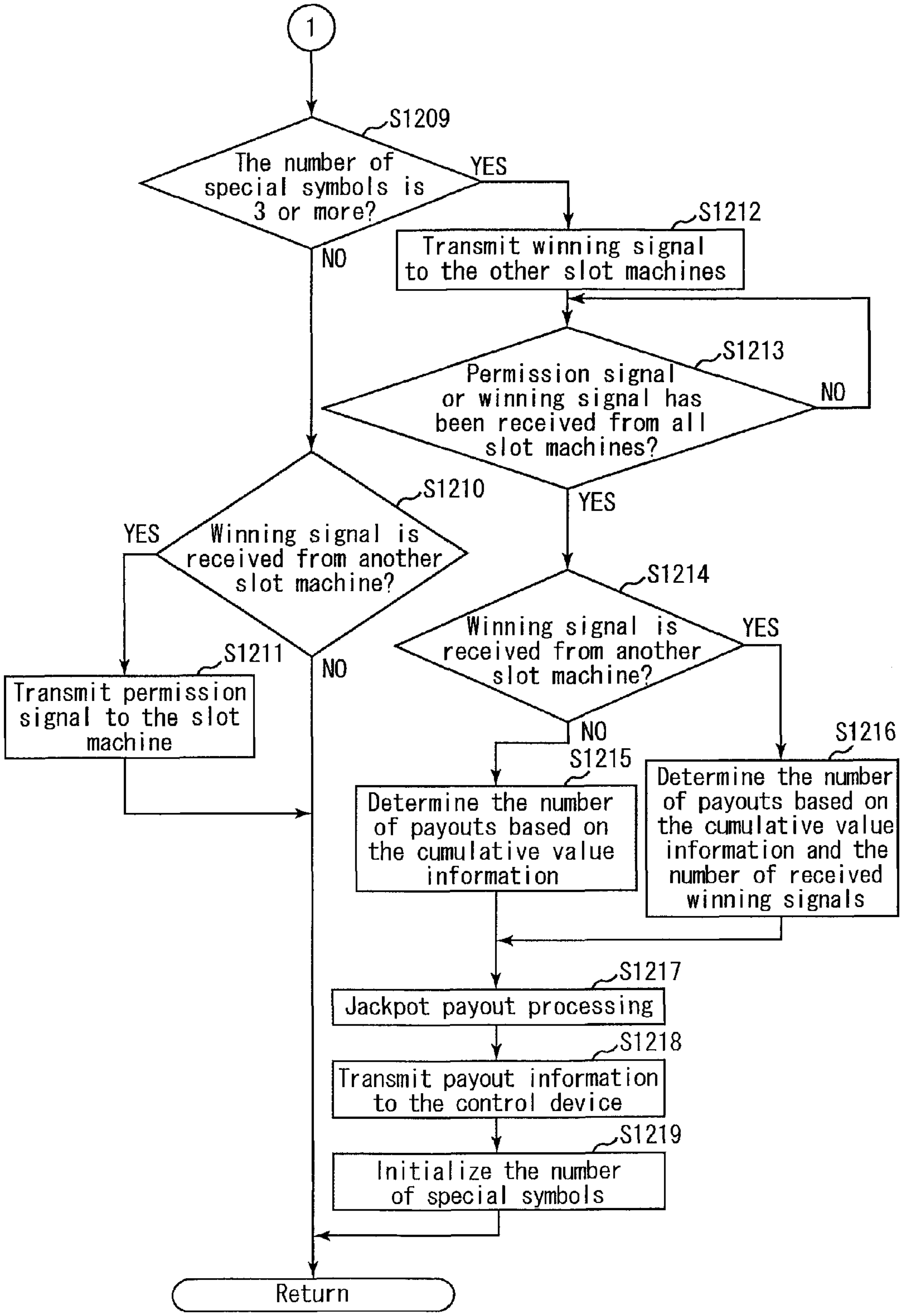
FIG. 37B is a flowchart illustrating a subroutine of the normal-game execution processing in the tenth embodiment.

FIG. 37 is a flowchart illustrating a subroutine of normal-game execution processing in the tenth embodiment.

Since the processing of step S1200 to step S1203 is similar to the processing of step S1010 to step S1013, descriptions thereof are omitted.

The main CPU 1041 then determines whether or not it has received cumulative-value information from the control device 1200 (step S1204). When determining that the main CPU 1041 has not received cumulative-value information from the control device 1200, the main CPU 1041 shifts the processing to step S1206. The cumulative-value information is information indicative of the cumulative value indicated by the cumulative-value data stored in the RAM 1203 included in the control device 1200.

On the other hand, when determining in step S1204 that the main CPU 1041 has received cumulative-value information from the control device 1200, the main CPU 1041 conducts number-of-special-symbols determination processing (step S1205). In the processing, the main CPU 1041 first extracts the random number generated by the random number generator 1062. Then, the main CPU 1041 increases the number of special symbols, based on the extracted random number, the cumulative value indicated by the received cumulative-value information, and the to-be-increased number-of-special-symbols determination table (see FIG. 29) stored in the ROM 1042. The main CPU 1041 stores into the RAM 1043 a numeric value obtained by adding the to-be-increased number of special symbols to the maximum number of special symbols stored in the RAM 1043, as an updated number of special symbols.

Next, the main CPU 1041 executes symbol rearrangement processing (step S1206).

In this processing, the main CPU 1041 starts with determination of the number of special symbols to be scroll-displayed in the display blocks 1028, based on the maximum number of special symbols stored in the RAM 1043. Namely, when the maximum number of special symbols is five, the main CPU 1041 determines that the number of special symbols to be scroll-displayed is five. The main CPU 1041 then starts scroll-display of normal symbols and special symbols of the determined number, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not a prize has been established (step S1207). Here, the establishment of a prize refers to a rearrangement of at least one combination of three or more normal symbols of the same type out of "RIBBON", "HEART", "STAR", "MOON", "SUN", "JEWEL", "CROWN", and "SMILE", in the display blocks 1028 (see FIG. 27). In this processing, the main CPU 1041 counts the number of normal symbols for each type out of the symbols rearranged in step S1206. Then, the main CPU 1041 determines whether or not the counted number is three or more.

When determining that a prize has been established, the main CPU 1041 executes processing relating to the payout of coins (step S1208). In the processing, the main CPU 1041 determines the amount of payout based on the numbers of rearranged normal symbols with reference to the odds data stored in the ROM 1042. The odds data is data indicative of the correspondence relationships between the numbers of normal symbols rearranged in the display blocks 1028 and the amounts of payouts (see FIG. 27).

For example, when two coins have been betted and thereafter three symbols of "SUN" are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1207 that a prize has not been established, or after executing the processing of step S1208, the main CPU 1041 determines whether or not the number of special symbols out of the symbols rearranged in step S1206 is three or more (step S1209). When determining that the number of special symbols is not three or more, the main CPU 1041 determines whether or not it has received a winning signal from another slot machine 1010 (step S1210). A winning signal is a signal transmitted from a slot machine 1010 in which the number of special symbols out of the rearranged symbols is three or more, to the other slot machines 1010.

When determining in step S1210 that the main CPU 1041 has received a winning signal from another slot machine 1010, the main CPU 1041 transmits a permission signal to the slot machine 1010 that has transmitted the winning signal (step S1211).

On the other hand, when determining in step S1209 that the number of special symbols is three or more, the main CPU 1041 transmits a winning signal to the other slot machines 1010 (step S1212). A winning signal includes the number of rearranged special symbols and an identification number of the slot machine 1010.

Next, the main CPU 1041 determines whether or not it has received a permission signal or a winning signal from all the slot machines 1010 (step S1213). When determining that the main CPU 1041 has not received a permission signal or a winning signal from all the slot machines 1010, the main CPU 1041 returns the processing to step S1213.

On the other hand, when determining in step S1213 that the main CPU 1041 has received a permission signal or a winning signal from all the slot machines 1010, the main CPU 1041 determines whether or not it has received a winning signal from another slot machine 1010 (step S1214).

When determining in step S1214 that the main CPU 1041 has not received a winning signal from another slot machine 1010, the main CPU 1041 determines the number of payouts based on the cumulative value indicated by the cumulative-value information received from the control device 1200 (step S1215). In the processing, the main CPU 1041 determines the number of payouts, based on the number of special symbols rearranged in step S1206 and on the cumulative value indicated by the cumulative-value information received from the control device 1200. More specifically, when the number of rearranged special symbols is three, the main CPU 1041 determines that the number of payouts is to be 30% of the cumulative value indicated by the received cumulative-value information. When the number of rearranged special symbols is four, the main CPU 1041 determines that the number of payouts is to be 60% of the cumulative value indicated by the received cumulative-value information. When the number of rearranged special symbols is five, the main CPU 1041 determines that the number of payouts is to be 80% of the cumulative value indicated by the received cumulative-value information. When the number of rearranged special symbols is six or more, the main CPU 1041 determines that the number of payouts is to be the whole cumulative value indicated by the received cumulative-value information. It is to be noted that the digits after the decimal point are truncated in the processing.

On the other hand, when determining in step S1214 that the main CPU 1041 has received a winning signal from another slot machine 1010, the main CPU 1041 determines the number of payouts based on the cumulative value indicated by the cumulative-value information received from the control device 1200, and on the number of winning signals received from the other slot machines 1010 (step S1216). In the processing, the main CPU 1041 first divides the cumulative value indicated by the cumulative-value information received from the control device 1200, by a numeric value obtained by adding one to the number of winning signals received from the other slot machines 1010. Then, the main CPU 1041 determines the number of payouts based on the numeric value obtained by the division and on the number of special symbols rearranged in step S1206. More specifically, when the number of rearranged special symbols is three, the main CPU 1041 determines that the number of payouts is to be 30% of the numeric value obtained by the division. When the number of rearranged special symbols is four, the main CPU 1041 determines that the number of payouts is to be 60% of the numeric value obtained by the division. When the number of rearranged special symbols is five, the main CPU 1041 determines that the number of payouts is to be 80% of the numeric value obtained by the division. When the number of rearranged special symbols is six or more, the main CPU 1041 determines that the number of payouts is to be the whole numeric value obtained by the division. It is to be noted that the digits after the decimal point are truncated in the processing.

Next, the main CPU 1041 executes jackpot payout processing (step S1217). In the processing, the main CPU 1041 determines an amount of payout, based on the number of payouts determined in step S1215 or step S1216.

In the case of accumulating coins, the main CPU 1041 conducts the processing of adding the number of credits corresponding to the determined amount of payout, to the number of credits stored in the RAM 1043. On the other hand, in the case of paying out coins, the main CPU 1041 transmits a control signal to the hopper 66 in order to pay out coins in an amount corresponding to the determined amount of payout.

Next, the main CPU 1041 transmits payout information to the control device 1200 (step S1218). In the processing, the main CPU 1041 transmits payout information indicative of the number of payouts determined in step S1215 or step S1216, to the control device 1200.

The main CPU 1041 then stores "3" into the RAM 1043, as an updated maximum number of special symbols (step S1219).

When determining in step S1210 that the main CPU 1041 has not received a winning signal from another slot machine 1010, or after executing the processing of step S1211 or after executing the processing of step S1219, the main CPU 1041 completes the present subroutine.

Next, there is described processing performed in the control device 1200.

Figure 38:
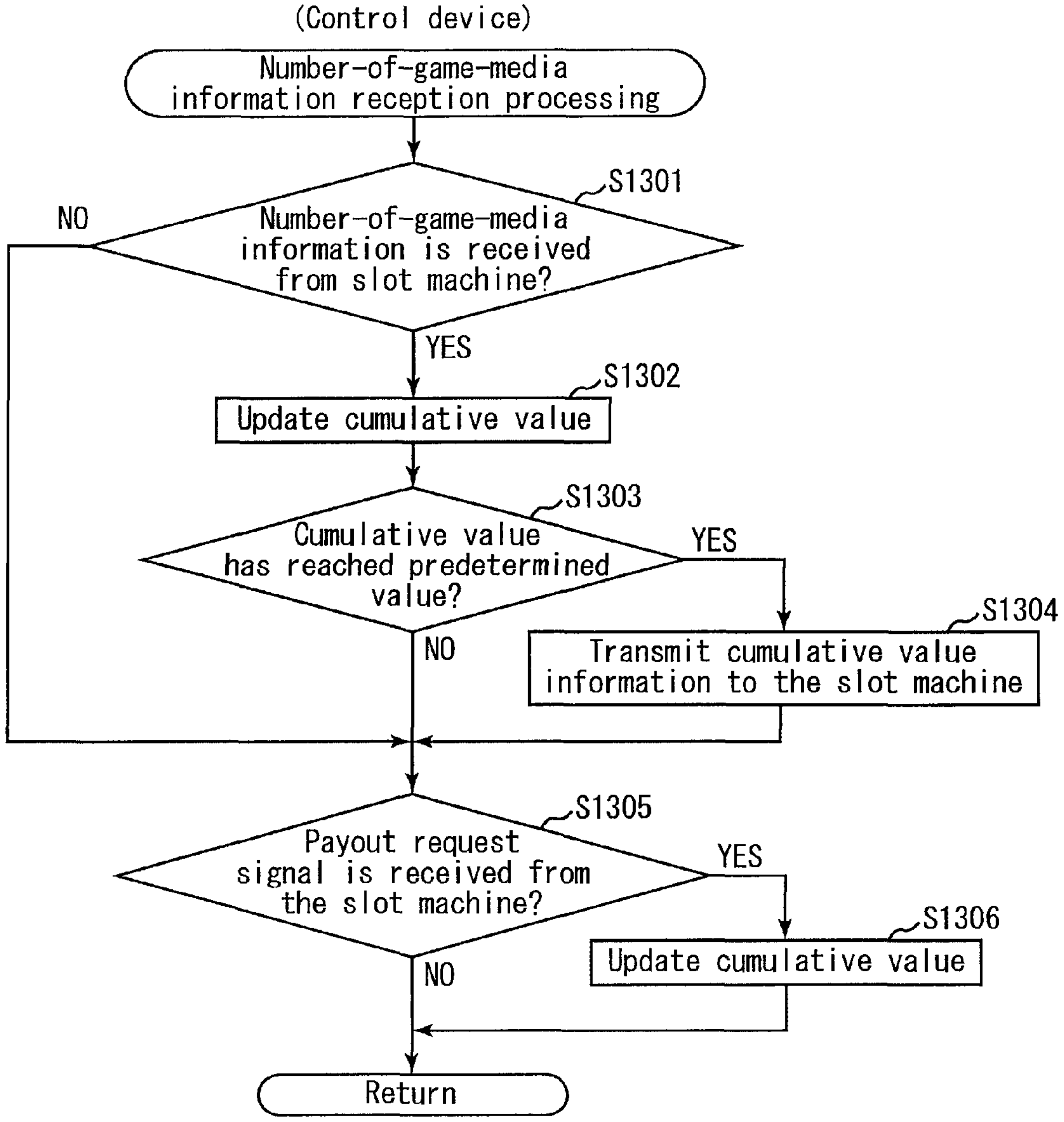
FIG. 38 is a flowchart illustrating a subroutine of number-of-game-media information reception processing in the tenth embodiment.

FIG. 38 is a flowchart illustrating a subroutine of number-of-game-media information reception processing in the tenth embodiment.

Since the processing of step S1301 to step S1303 is similar to the processing of step S1101 to step S1103, descriptions thereof are omitted.

Then, when determining in step S1303 that the cumulative value has reached the predetermined value, the CPU 1201 transmits cumulative-value information to the slot machines 1010 (step S1304). The cumulative-value information is information indicative of the cumulative value indicated by the cumulative-value data stored in the RAM 1203.

Next, the CPU 1201 determines whether or not it has received payout information from the slot machine 1010 (step S1305). When the CPU 1201 determines that it has received payout information from the slot machine 1010, the CPU 1201 updates the cumulative value (step S1306). In the processing, the CPU 1201 sets as an updated cumulative value a numeric value obtained by subtracting the number of payouts indicated by the received payout information, from the cumulative value indicated by the cumulative-value data stored in the RAM 1203, and stores the cumulative-value data indicative of the updated cumulative value into the RAM 1203.

When the CPU 1201 determines in step S1305 that it has not received payout information from the slot machine 1010, or after executing the processing of step S1306, the CPU 1201 completes the present subroutine.

As described above, according to the gaming system 1100 relating to the tenth embodiment, the control device 1200 cumulatively counts as the cumulative value a part of the game media betted in the respective slot machines 1010, and transmits cumulative-value information based on the cumulative value obtained by the counting to the slot machines 1010. Each of the slot machines 1010 then increases the number of special symbols that can be displayed to the display blocks 1028, based on the received cumulative-value information.

Since the number of special symbols that can be displayed to the display blocks 1028 increases based on the cumulative value, the contents of the game change according to the cumulative value; it is therefore possible to make the player find the game interesting.

Further, an increase in the number of special symbols to be displayed to the display blocks 1028 generates an advantageous state for the player; it is therefore possible to make the player play the game for a long period of time.

According to the gaming system 1100 relating to the tenth embodiment, the number of special symbols that can be displayed to the display blocks 1028 increases when the cumulative value reaches the predetermined value. Thus, an increase in the number of special symbols displayed to the display blocks 1028 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the tenth embodiment, the number of special symbols that can be displayed to the display blocks 1028 increases a plurality of times before a payout of the jackpot. It is possible to excite the player every time the number of special symbols increases, and to make the player immersed in the game.

Moreover, it is possible to further enhance interesting aspects of the game by allowing the number of special symbols that can be displayed to the display blocks 1028 to increase a plurality of times.

In addition, since the number of special symbols increases in stages before a payout of the jackpot, an advantageous state for the player is generated, thereby fueling the player's hope.

According to the gaming system 1100 relating to the tenth embodiment, since each of the slot machines 1010 increases the number of special symbols, the numbers of special symbols are different in the respective slot machines 1010. The players therefore care how well other players are playing, and use strategies to get the better of other players; hence, it is possible to make the players immersed in the game.

Eleventh Embodiment

In the eighth embodiment described above, a case has been described where the control device 1200 increases the number of special symbols based on the cumulative value.

In an eleventh embodiment, each of the slot machines 1010 increases the number of special symbols based on the cumulative value.

In the eleventh embodiment, in common with the eighth embodiment, five types of symbols of "HEART", "STAR", "SUN", "JEWEL", and "SMILE" are special symbols, and three types of symbols of "RIBBON", "MOON", and "CROWN" are normal symbols irrelative to payouts, and a symbol of "JP" is a jackpot trigger symbol. Further, the special symbols are scatter symbols.

It is to be noted that, although the to-be-increased number-of-special-symbols determination table (see FIG. 32) is stored in the hard disk drive 1205 included in the control device 1200 in the eighth embodiment, the to-be-increased number-of-special-symbols determination table (see FIG. 32) is stored in the ROM 1042 included in the slot machine 1010 in the eleventh embodiment.

Further, constituent elements corresponding to those of the gaming system 1100 according to the aforementioned eighth embodiment will be provided with the same signs, in descriptions given below.

Furthermore, omitted are descriptions of the parts to which the descriptions in the aforementioned eighth embodiment are applicable in the eleventh embodiment described below.

Figure 39A:
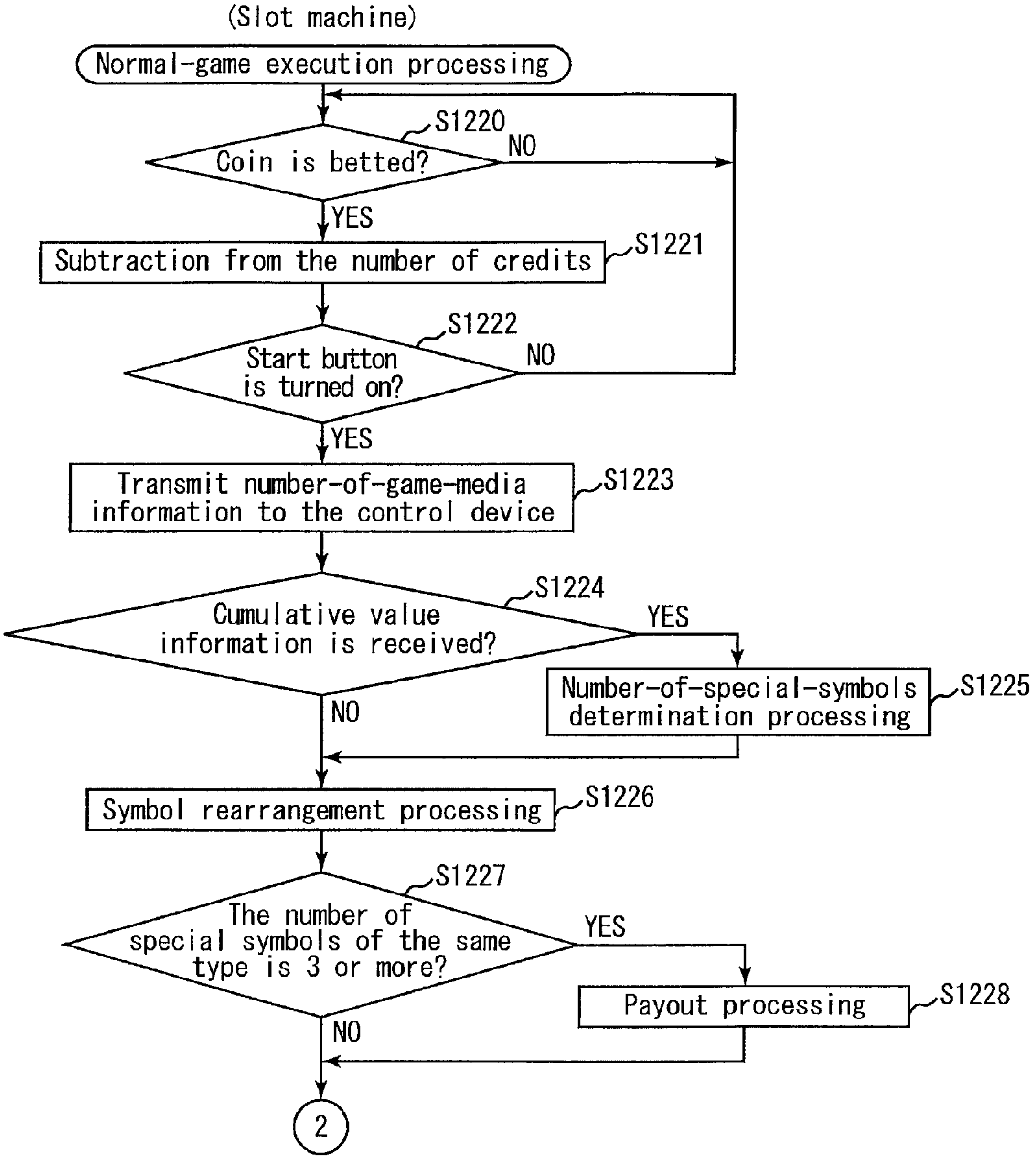
FIG. 39A is a flowchart illustrating a subroutine of normal-game execution processing in an eleventh embodiment.
Figure 39B:
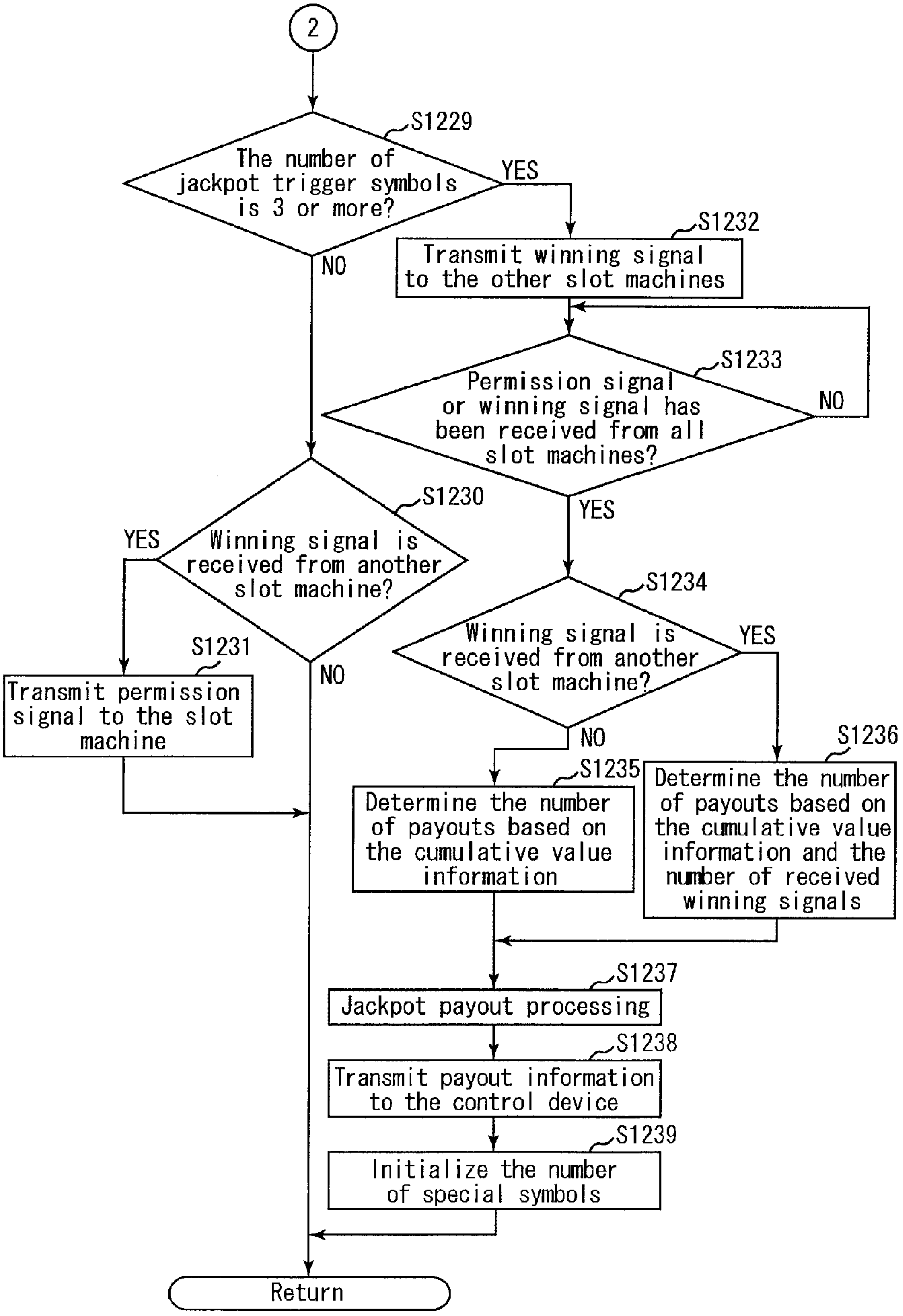
FIG. 39B is a flowchart illustrating a subroutine of the normal-game execution processing in the eleventh embodiment.

FIG. 39 is a flowchart illustrating a subroutine of normal-game execution processing in the eleventh embodiment.

Since the processing of step S1220 to step S1223 is similar to the processing of step S1030 to step S1033, descriptions thereof are omitted.

Next, the main CPU 1041 determines whether or not it has received cumulative-value information from the control device 1200 (step S1224). When the main CPU 1041 determines that it has not received cumulative-value information from the control device 1200, the main CPU 1041 shifts the processing to step S1226. The cumulative-value information is information indicative of the cumulative value indicated by the cumulative-value data stored in the RAM 1203 included in the control device 1200.

On the other hand, when the main CPU 1041 determines that it has received cumulative-value information from the control device 1200, the main CPU 1041 executes number-of-special-symbols determination processing (step S1225). In the processing, the main CPU 1041 first extracts the random number generated by the random number generator 62. The main CPU 1041 then determines the to-be-increased number of special symbols, based on the extracted random number, the cumulative value indicated by the received cumulative-value information, and the to-be-increased number-of-special-symbols determination table (see FIG. 32) stored in the ROM 1042. Further, the main CPU 1041 stores into the RAM 1043 a numeric value obtained by adding the to-be-increased number of special symbols determined in step S1225 to the maximum number of special symbols stored in the RAM 1043, as an updated maximum number of special symbols.

Next, the main CPU 1041 executes symbol rearrangement processing (step S1226).

In this processing, the main CPU 1041 starts with determination of the number of special symbols of each type to be scroll-displayed in the display blocks 1028, based on the maximum number of special symbols stored in the RAM 1043. Namely, when the maximum number of special symbols is five, the main CPU 1041 determines that the number of special symbols of each type to be scroll-displayed is five. The main CPU 1041 then starts scroll-display of normal symbols, special symbols of the determined number and the symbols of "JP" being jackpot trigger symbols, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not three or more special symbols of the same type are rearranged (step S1227). Namely, the main CPU 1041 determines whether or not at least one combination of three or more special symbols of the same type out of "HEART", "STAR", "SUN", "JEWEL", and "SMILE", is rearranged in the display blocks 1028 (see FIG. 31). In this processing, the main CPU 1041 counts the number of special symbols for each type out of the symbols rearranged in step S1226. Then, the main CPU 1041 determines whether or not the counted number is three or more.

When determining that three or more special symbols of the same type are rearranged, the main CPU 1041 executes processing relating to the payout of coins (step S1228). In the processing, the main CPU 1041 determines the amount of payout based on the numbers of rearranged special symbols with reference to the odds data stored in the ROM 1042. The odds data is data indicative of the correspondence relationships between the numbers of special symbols rearranged in the display blocks 1028 and the amounts of payouts (see FIG. 31).

For example, when two coins have been betted and thereafter three symbols of "SUN" are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1227 that three or more special symbols of the same type are not rearranged or after executing the processing of step S1228, the main CPU 1041 determines whether or not the number of symbols of "JP" being jackpot trigger symbols out of the symbols rearranged in step S1226 is three or more (step S1229). When determining that the number of symbols of "JP" being jackpot trigger symbols is not three or more, the main CPU 1041 determines whether or not it has received a winning signal from another slot machine 1010 (step S1230). A winning signal is a signal that is transmitted from a slot machine 1010 in which the number of jackpot trigger symbols out of the rearranged symbols is three or more, to the other slot machines 1010.

When the main CPU 1041 determines in step S1230 that it has received a winning signal from another slot machine 1010, the main CPU 1041 transmits a permission signal to the slot machine 1010 that has transmitted the winning signal (step S1231).

On the other hand, when determining in step S1229 that the number of symbols of "JP" being jackpot trigger symbols is three or more, the main CPU 1041 transmits a winning signal to the other slot machines 1010 (step S1232). A winning signal includes the number of rearranged jackpot trigger symbols and the identification number of the slot machine 1010.

The main CPU 1041 then determines whether or not it has received a permission signal or a winning signal from all the slot machines 1010 (step S1233). When the main CPU 1041 determines that it has not received a permission signal or a winning signal from all the slot machines 1010, the main CPU 1041 returns the processing to step S1233.

On the other hand, when the main CPU 1041 determines in step S1233 that it has received a permission signal or a winning signal from all the slot machines 1010, the main CPU 1041 determines whether or not it has received a winning signal from another slot machine 1010 (step S1234).

When determining in step S1234 that the main CPU 1041 has not received a winning signal from another slot machine 1010, the main CPU 1041 determines the number of payouts based on the cumulative value indicated by the cumulative-value information received from the control device 1200 (step S1235). In the processing, the main CPU 1041 determines the number of payouts, based on the number of jackpot trigger symbols rearranged in step S1226 and on the cumulative value indicated by the cumulative-value information received from the control device 1200. More specifically, when the number of rearranged jackpot trigger symbols is three, the main CPU 1041 determines that the number of payouts is to be 30% of the cumulative value indicated by the received cumulative-value information. When the number of rearranged jackpot trigger symbols is four, the main CPU 1041 determines that the number of payouts is to be 60% of the cumulative value indicated by the received cumulative-value information. When the number of rearranged jackpot trigger symbols is five, the main CPU 1041 determines that the number of payouts is to be 80% of the cumulative value indicated by the received cumulative-value information. When the number of rearranged jackpot trigger symbols is six or more, the main CPU 1041 determines that the number of payouts is to be the whole cumulative value indicated by the received cumulative-value information. It is to be noted that the digits after the decimal point are truncated in the processing.

On the other hand, when determining in step S1234 that the main CPU 1041 has received a winning signal from another slot machine 1010, the main CPU 1041 determines the number of payouts based on the cumulative value indicated by the cumulative-value information received from the control device 1200, and on the number of winning signals received from the other slot machines 1010 (step S1236). In the processing, the main CPU 1041 first divides the cumulative value indicated by the cumulative-value information received from the control device 1200, by a numeric value obtained by adding one to the number of winning signals received from the other slot machines 1010. Then, the main CPU 1041 determines the number of payouts based on the numeric value obtained by the division and on the number of jackpot trigger symbols rearranged in step S1226. More specifically, when the number of rearranged jackpot trigger symbols is three, the main CPU 1041 determines that the number of payouts is to be 30% of the numeric value obtained by the division. When the number of rearranged jackpot trigger symbols is four, the main CPU 1041 determines that the number of payouts is to be 60% of the numeric value obtained by the division. When the number of rearranged jackpot trigger symbols is five, the main CPU 1041 determines that the number of payouts is to be 80% of the numeric value obtained by the division. When the number of rearranged jackpot trigger symbols is six or more, the main CPU 1041 determines that the number of payouts is to be the whole numeric value obtained by the division. It is to be noted that the digits after the decimal point are truncated in the processing.

Next, the main CPU 1041 executes jackpot payout processing (step S1237). In the processing, the main CPU 1041 determines an amount of payout, based on the number of payouts determined in step S1235 or step S1236.

In the case of accumulating coins, the main CPU 1041 conducts the processing of adding the number of credits corresponding to the determined amount of payout, to the number of credits stored in the RAM 1043. On the other hand, in the case of paying out coins, the main CPU 1041 transmits a control signal to the hopper 66 in order to pay out coins in an amount corresponding to the determined amount of payout.

Next, the main CPU 1041 transmits payout information to the control device 1200 (step S1238). In the processing, the main CPU 1041 transmits payout information indicative of the number of payouts determined in step S1235 or step S1236, to the control device 1200.

The main CPU 1041 then stores "3" into the RAM 1043, as an updated maximum number of special symbols (step S1239).

When determining in step S1230 that the main CPU 1041 has not received a winning signal from another slot machine 1010, or after executing the processing of step S1231 or after executing the processing of step S1239, the main CPU 1041 completes the present subroutine.

As described above, according to the gaming system 1100 relating to the eleventh embodiment, the control device 1200 cumulatively counts as the cumulative value a part of the game media betted in the respective slot machines 1010, and transmits cumulative-value information based on the cumulative value obtained by the counting to the slot machines 1010. Each of the slot machines 1010 then increases the number of special symbols that can be displayed to the display blocks 1028, based on the received cumulative-value information.

Since the number of special symbols that can be displayed to the display blocks 1028 increases based on the cumulative value, the contents of the game change according to the cumulative value; it is therefore possible to make the player find the game interesting.

Further, an increase in the number of special symbols to be displayed to the display blocks 1028 generates an advantageous state for the player; it is therefore possible to make the player play the game for a long period of time.

According to the gaming system 1100 relating to the eleventh embodiment, the number of special symbols that can be displayed to the display blocks 1028 increases when the cumulative value reaches the predetermined value. Thus, an increase in the number of special symbols displayed to the display blocks 1028 can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the eleventh embodiment, the number of special symbols that can be displayed to the display blocks 1028 increases a plurality of times before a payout of the jackpot. It is possible to excite the player every time the number of special symbols increases, and to make the player immersed in the game.

Moreover, it is possible to further enhance interesting aspects of the game by allowing the number of special symbols that can be displayed to the display blocks 1028 to increase a plurality of times.

In addition, since the number of special symbols increases in stages before a payout of the jackpot, an advantageous state for the player is generated in stages, thereby fueling the player's hope.

According to the gaming system 1100 relating to the eleventh embodiment, since each of the slot machines 1010 increases the number of special symbols, the numbers of special symbols are different in the respective slot machines 1010. The players therefore care how well other players are playing, and use strategies to get the better of other players; hence, it is possible to make the players immersed in the game.

Twelfth Embodiment

In the ninth embodiment described above, a case has been described where the control device 1200 increases the specific number indicative of the minimum number of special symbols required for establishment of a prize, based on the cumulative value.

In a twelfth embodiment, each of the slot machines 1010 increases the specific number based on the cumulative value.

Further, in the twelfth embodiment, eight types of symbols of "RIBBON", "HEART", "STAR", "MOON", "SUN", "JEWEL", "CROWN", and "SMILE" are special symbols, and a symbol of "JP" is a jackpot trigger symbol. Also, the special symbols are scatter symbols.

It is to be noted that, although the to-be-increased specific-number table (see FIG. 36) is stored in the hard disk drive 1205 included in the control device 1200 in the ninth embodiment, the to-be-increased specific-number table (see FIG. 36) is stored in the ROM 1042 included in the slot machine 1010 in the twelfth embodiment.

Further, constituent elements corresponding to those of the gaming system 1100 according to the aforementioned ninth embodiment will be provided with the same signs, in descriptions given below.

Furthermore, omitted are descriptions of the parts to which the descriptions in the aforementioned ninth embodiment are applicable in the twelfth embodiment described below.

Figure 40A:
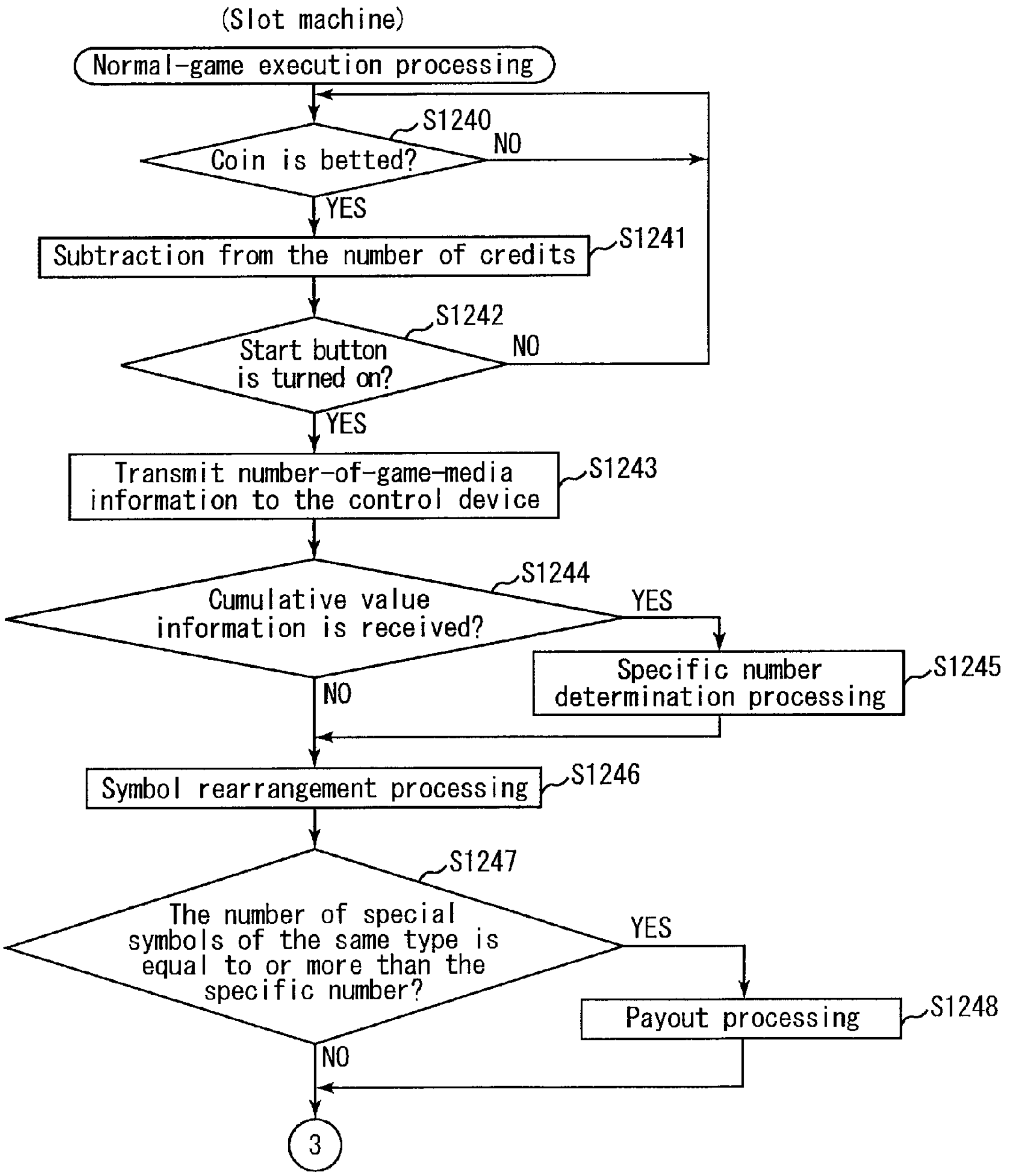
FIG. 40A is a flowchart illustrating a subroutine of normal-game execution processing in a twelfth embodiment.
Figure 40B:
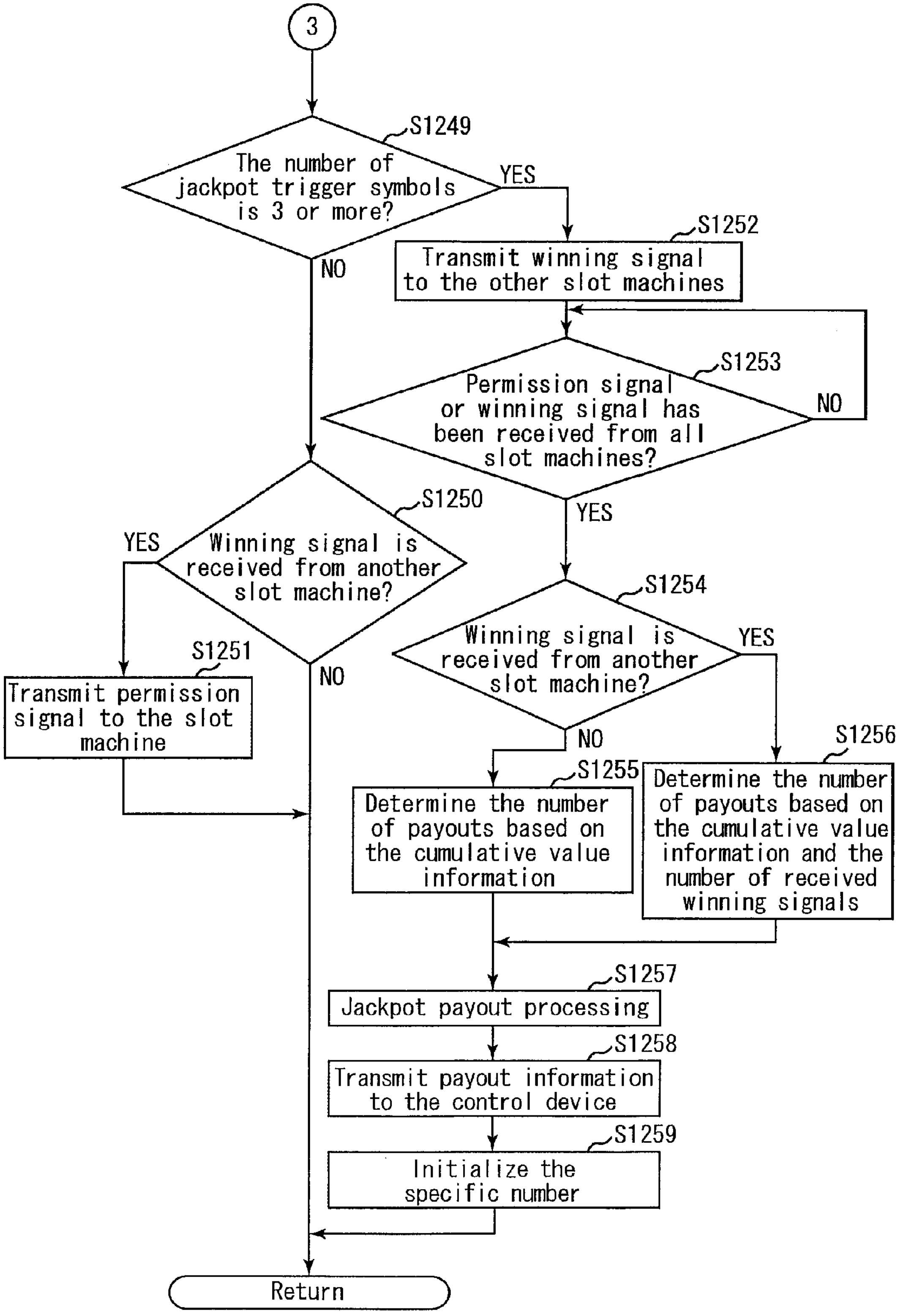
FIG. 40B is a flowchart illustrating a subroutine of the normal-game execution processing in the twelfth embodiment.

FIG. 40 is a flowchart illustrating a subroutine of normal-game execution processing in the twelfth embodiment.

Since the processing of step S1240 to step S1243 is similar to the processing of step S1050 to step S1053 in FIG. 33, descriptions thereof are omitted.

Next, the main CPU 1041 determines whether or not it has received cumulative-value information from the control device 1200 (step S1244). When the main CPU 1041 determines that it has not received cumulative-value information from the control device 1200, the main CPU 1041 shifts the processing to step S1246. The cumulative-value information is information indicative of the cumulative value indicated by the cumulative-value data stored in the RAM 1203 included in the control device 1200.

On the other hand, when the main CPU 1041 determines in step S1244 that it has received cumulative-value information from the control device 1200, the main CPU 1041 conducts specific-number determination processing (step S1245).

In the processing, the main CPU 1041 extracts the random number generated by the random number generator 62. The main CPU 1041 then determines the to-be-increased specific number, based on the extracted random number, the cumulative value indicated by the received cumulative-value information, and the to-be-increased specific-number determination table (see FIG. 36) stored in the ROM 1042. The main CPU 1041 then stores into the RAM 1043 a numeric value obtained by adding the to-be-increased specific number determined in step S1245 to the specific number stored in the RAM 1043, as an updated specific number.

Next, the main CPU 1041 executes symbol rearrangement processing (step S1246).

In this processing, the main CPU 1041 starts with scroll-display of special symbols and the symbols of "JP" being jackpot trigger symbols, in the display blocks 1028. Then, the main CPU 1041 executes the aforementioned symbol determination program, so as to determine the symbols to be rearranged, and then rearranges the symbols in the display blocks 1028.

Next, the main CPU 1041 determines whether or not special symbols of the same type in number equal to or more than the specific number are rearranged (step S1247). In the processing, the main CPU 1041 determines whether or not at least one combination of special symbols of the same type in number equal to or more than the specific number out of "RIBBON", "HEART", "STAR", "MOON", "SUN", "JEWEL", "CROWN", and "SMILE" is rearranged in the display blocks 1028. In this processing, the main CPU 1041 counts the number of special symbols for each type out of the symbols rearranged in step S1246. Then, the main CPU 1041 determines whether or not the counted number is equal to or more than the specific number stored in the RAM 1043.

When determining that special symbols of the same type in number equal to or more than the specific number are rearranged, the main CPU 1041 executes processing relating to the payout of coins (step S1248). In the processing, the main CPU 1041 determines the amount of payout based on the numbers of rearranged special symbols with reference to the odds data stored in the ROM 1042. The odds data is data indicative of the correspondence relationships between the numbers of special symbols rearranged in the display blocks 1028 and the amounts of payouts (see FIG. 34).

For example, in a case where the specific number is three, when two coins have been betted and thereafter three symbols of "SUN" are rearranged, 20(=2×10) coins are paid out.

In the case of accumulating coins, the main CPU 1041 conducts processing for adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

When determining in step S1247 that special symbols of the same type in number equal to or more than the specific number are not rearranged or after executing the processing of step S1248, the main CPU 1041 determines whether or not the number of symbols of "JP" being jackpot trigger symbols out of the symbols rearranged in step S1246 is three or more (step S1249). When determining that the number of symbols of "JP" being jackpot trigger symbols is not three or more, the main CPU 1041 determines whether or not it has received a winning signal from another slot machine 1010 (step S1250). A winning signal is a signal that is transmitted from a slot machine 1010 in which the number of jackpot trigger symbols out of the rearranged symbols is three or more.

When the main CPU 1041 determines in step S1250 that it has received a winning signal from another slot machine 1010, the main CPU 1041 transmits a permission signal to the slot machine 1010 that has transmitted the winning signal (step S1251).

On the other hand, when determining in step S1249 that the number of symbols of "JP" being jackpot trigger symbols is three or more, the main CPU 1041 transmits a winning signal to the other slot machines 1010 (step S1252). A winning signal includes the number of rearranged jackpot trigger symbols and the identification number of the slot machine 1010.

The main CPU 1041 then determines whether or not it has received a permission signal or a winning signal from all the slot machines 1010 (step S1253). When the main CPU 1041 determines that it has not received a permission signal or a winning signal from all the slot machines 1010, the main CPU 1041 returns the processing to step S1253.

On the other hand, when the main CPU 1041 determines in step S1253 that it has received a permission signal or a winning signal from all the slot machines 1010, the main CPU 1041 determines whether or not it has received a winning signal from another slot machine 1010 (step S1254).

When determining in step S1254 that the main CPU 1041 has not received a winning signal from another slot machine 1010, the main CPU 1041 determines the number of payouts based on the cumulative value indicated by the cumulative-value information received from the control device 1200 (step S1255). In the processing, the main CPU 1041 determines the number of payouts, based on the number of jackpot trigger symbols rearranged in step S1246 and on the cumulative value indicated by the cumulative-value information received from the control device 1200. More specifically, when the number of rearranged jackpot trigger symbols is three, the main CPU 1041 determines that the number of payouts is to be 30% of the cumulative value indicated by the received cumulative-value information. When the number of rearranged jackpot trigger symbols is four, the main CPU 1041 determines that the number of payouts is to be 60% of the cumulative value indicated by the received cumulative-value information. When the number of rearranged jackpot trigger symbols is five, the main CPU 1041 determines that the number of payouts is to be 80% of the cumulative value indicated by the received cumulative-value information. When the number of rearranged jackpot trigger symbols is six or more, the main CPU 1041 determines that the number of payouts is to be the whole cumulative value indicated by the received cumulative-value information. It is to be noted that the digits after the decimal point are truncated in the processing.

On the other hand, when determining in step S1254 that the main CPU 1041 has received a winning signal from another slot machine 1010, the main CPU 1041 determines the number of payouts, based on the cumulative value indicated by the cumulative-value information received from the control device 1200, and on the number of winning signals received from the other slot machines 1010 (step S1256). In the processing, the main CPU 1041 first divides the cumulative value indicated by the cumulative-value information received from the control device 1200, by a numeric value obtained by adding one to the number of winning signals received from the other slot machines 1010. Then, the main CPU 1041 determines the number of payouts based on the numeric value obtained by the division and on the number of jackpot trigger symbols rearranged in step S1246. More specifically, when the number of rearranged jackpot trigger symbols is three, the main CPU 1041 determines that the number of payouts is to be 30% of the numeric value obtained by the division. When the number of rearranged jackpot trigger symbols is four, the main CPU 1041 determines that the number of payouts is to be 60% of the numeric value obtained by the division. When the number of rearranged jackpot trigger symbols is five, the main CPU 1041 determines that the number of payouts is to be 80% of the numeric value obtained by the division. When the number of rearranged jackpot trigger symbols is six or more, the main CPU 1041 determines that the number of payouts is to be the whole numeric value obtained by the division. It is to be noted that the digits after the decimal point are truncated in the processing.

Next, the main CPU 1041 executes jackpot payout processing (step S1257). In the processing, the main CPU 1041 determines an amount of payout, based on the number of payouts determined in step S1255 or step S1256.

In the case of accumulating coins, the main CPU 1041 conducts the processing of adding the number of credits corresponding to the determined amount of payout, to the number of credits stored in the RAM 1043. On the other hand, in the case of paying out coins, the main CPU 1041 transmits a control signal to the hopper 1066 in order to pay out coins in an amount corresponding to the determined amount of payout.

Next, the main CPU 1041 transmits payout information to the control device 1200 (step S1258). In the processing, the main CPU 1041 transmits payout information indicative of the number of payouts determined in step S1255 or step S1256, to the control device 1200.

The main CPU 1041 then stores "3" into the RAM 1043, as an updated specific number (step S1259).

When determining in step S1250 that the main CPU 1041 has not received a winning signal from another slot machine 1010, or after executing the processing of step S1251 or after executing the processing of step S1259, the main CPU 1041 completes the present subroutine.

As described above, according to the gaming system 1100 relating to the twelfth embodiment, the control device 1200 cumulatively counts as the cumulative value a part of the game media betted in the respective slot machines 1010, and transmits cumulative-value information based on the cumulative value obtained by the counting to the slot machines 1010. Each of the slot machines 1010 then increases the specific number, based on the received cumulative-value information. Then, when the number of special symbols out of the symbols stop-displayed to the display blocks 1028 is equal to or more than the specific number, the main CPU 1041 conducts a payout of game media.

Since the specific number increases based on the cumulative value, the contents of the game change according to the cumulative value; it is therefore possible to make the player find the game interesting.

Further, an increase in the specific number generates a disadvantageous state for the player, but does not disappoint the player since it means that the player is steadily approaching a payout of the jackpot; it is therefore possible to make the player play the game for a long period of time.

According to the gaming system 1100 relating to the twelfth embodiment, the specific number increases when the cumulative value reaches the predetermined value. Thus, an increase in the specific number can make the player recognize that the cumulative value has reached the predetermined value. It is therefore possible to make the player recognize that the cumulative value has reached the predetermined value and the player is steadily approaching a payout of the jackpot, thereby making it possible to have the player play the game while giving him or her hope.

According to the gaming system 1100 relating to the twelfth embodiment, the specific number increases a plurality of times before a payout of the jackpot. It is possible to further enhance interesting aspects of the game by allowing the specific number to increase a plurality of times.

According to the gaming system 1100 relating to the twelfth embodiment, since each of the slot machines 1010 increases the specific number, the specific numbers are different in the respective slot machines 1010. The players therefore care how well other players are playing, and use strategies to get the better of other players; hence, it is possible to make the players immersed in the game.

Thirteenth Embodiment

Figure 41:
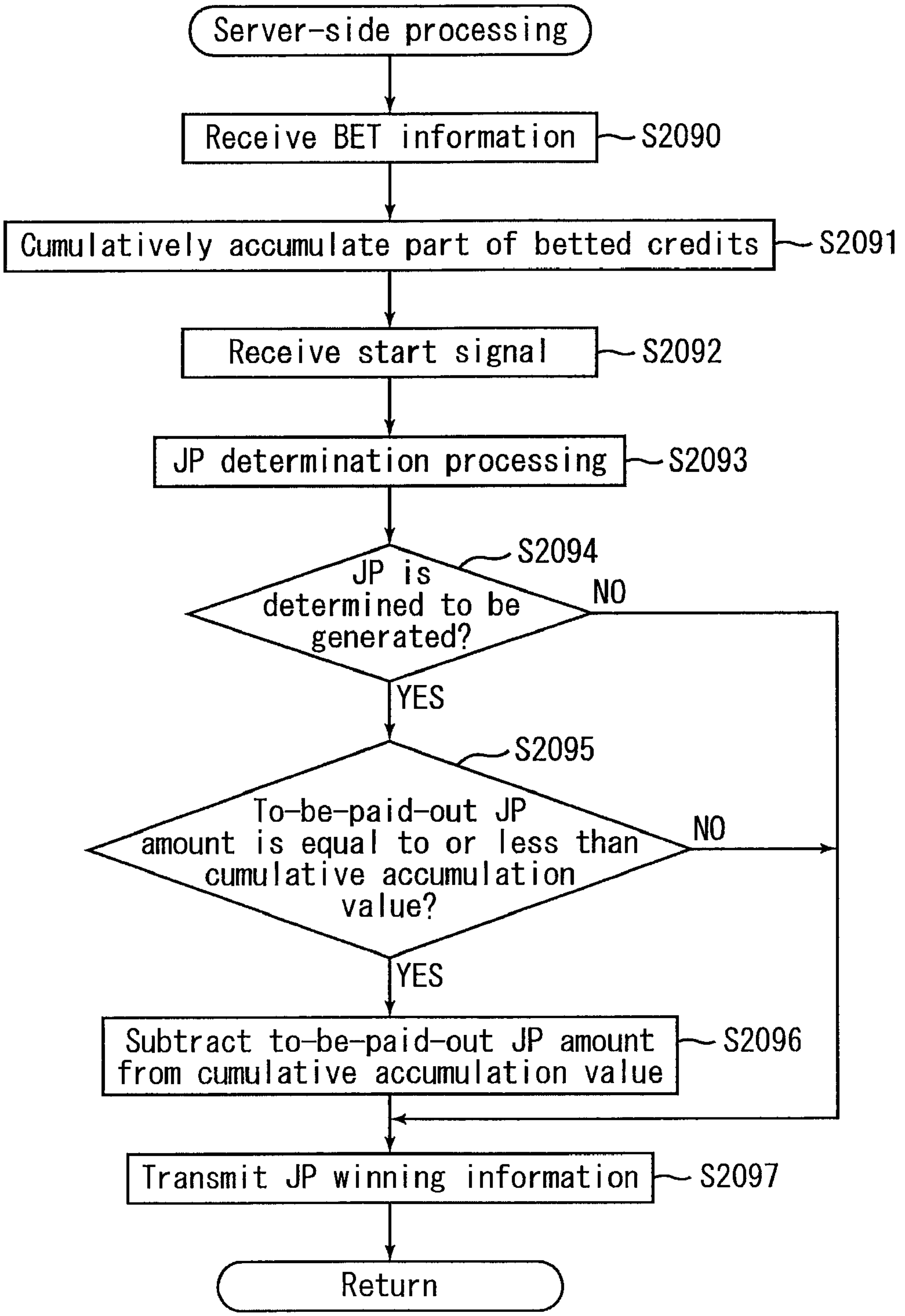
FIG. 41 is a flowchart illustrating a subroutine of server-side processing executed by a server according to a thirteenth embodiment of a present invention.

FIG. 41 is a flowchart illustrating a subroutine of server-side processing executed by a server according to the thirteenth embodiment of the present invention.

When a coin is betted in a slot machine 2010 forming a gaming system 2100 (see FIG. 42), BET information indicative of a bet amount is transmitted to a server 2200 connected with the slot machine 2010 via a communication line 2101.

In the server-side processing, first, a CPU 2201 (see FIG. 46) provided in the server 2200 receives the BET information from the slot machine 2010 in step S2090.

Figure 46:
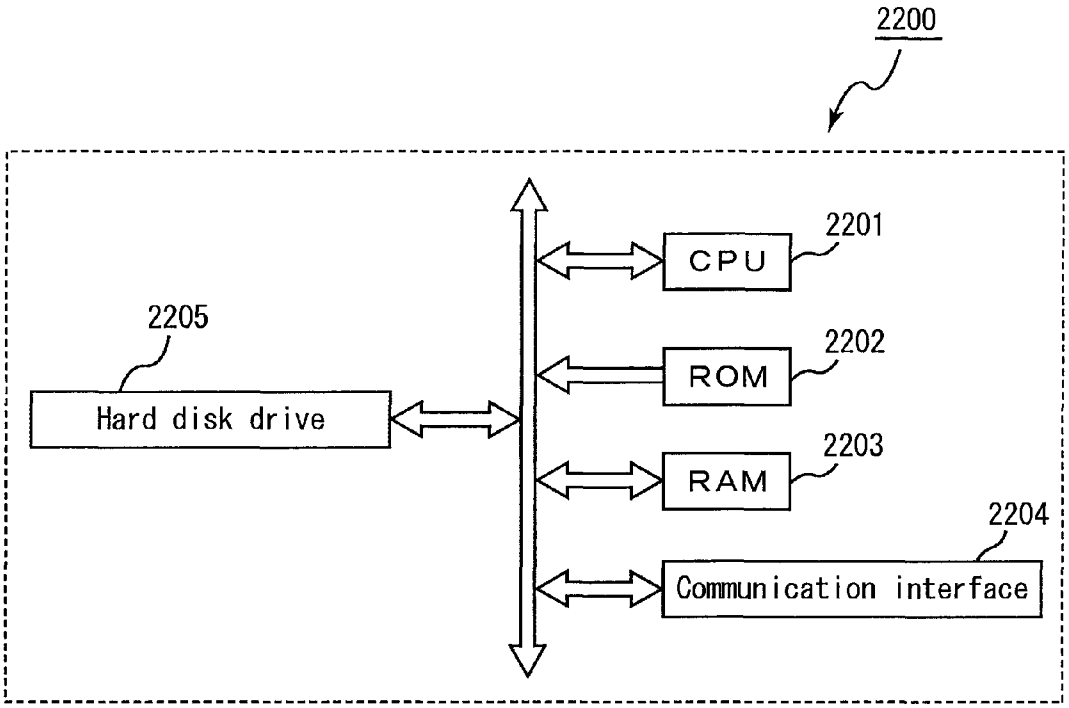
FIG. 46 is a block diagram illustrating an internal configuration of the server according to the thirteenth embodiment of the present invention.

Next, in step S2091, the CPU 2201 cumulatively stores 50% of a credit corresponding to the betted coin in a hard disk drive 2205 (see FIG. 46). In the present embodiment, when the JP is generated, the payout is conducted from the credits stored in the hard disk drive 2205.

Subsequently, in step S2092, the CPU 2201 receives a start signal from the slot machine 2010. The start signal is a signal to be outputted when a spin button 2023 (see FIG. 43) provided in the slot machine 2010 is operated.

In step S2093, the CPU 2201 conducts JP determination processing. In the JP determination processing, the CPU 2201 determines whether or not to generate the JP in each slot machine 2010, and determines the payout amount to be paid out in the case of generating the JP.

Here, in the present embodiment, a number of the slot machines 2010 allowed to generate the JP in one game is one at most.

In step S2094, the CPU 2201 determines whether or not the JP has been determined to be generated in any slot machine 2010 in the JP determination processing of step S2093.

When determining that the JP has been determined not to be generated in any slot machines 2010, the CPU 2201 shifts the processing to step S2097.

On the other hand, when determining that the JP has been determined to be generated in any slot machine 2010, the CPU 2201 determines in step S2095 whether or not an amount of JP determined to be paid out is equal to or less than a cumulative value (hereinafter, also referred to as a cumulative accumulation value) of the credits stored in the hard disk drive 2205. When determining that the amount of JP is more than the cumulative accumulation value, the CPU 2201 shifts the processing to step S2097.

On the other hand, when determining that the amount of JP is equal to or less than the cumulative accumulation value, the CPU 2201 subtracts the amount of JP from the cumulative accumulation value in step S2096.

Next, in step S2097, the CPU 2201 transmits JP winning information to each slot machine 2010. The JP winning information is information indicative of a determination result about whether or not to generate the JP and the payout amount in the case of generating the JP.

The slot machine 2010 controls the subsequent game based on the received JP winning information.

After executing the processing of step S2097, the CPU 2201 terminates the present subroutine.

Figure 42:
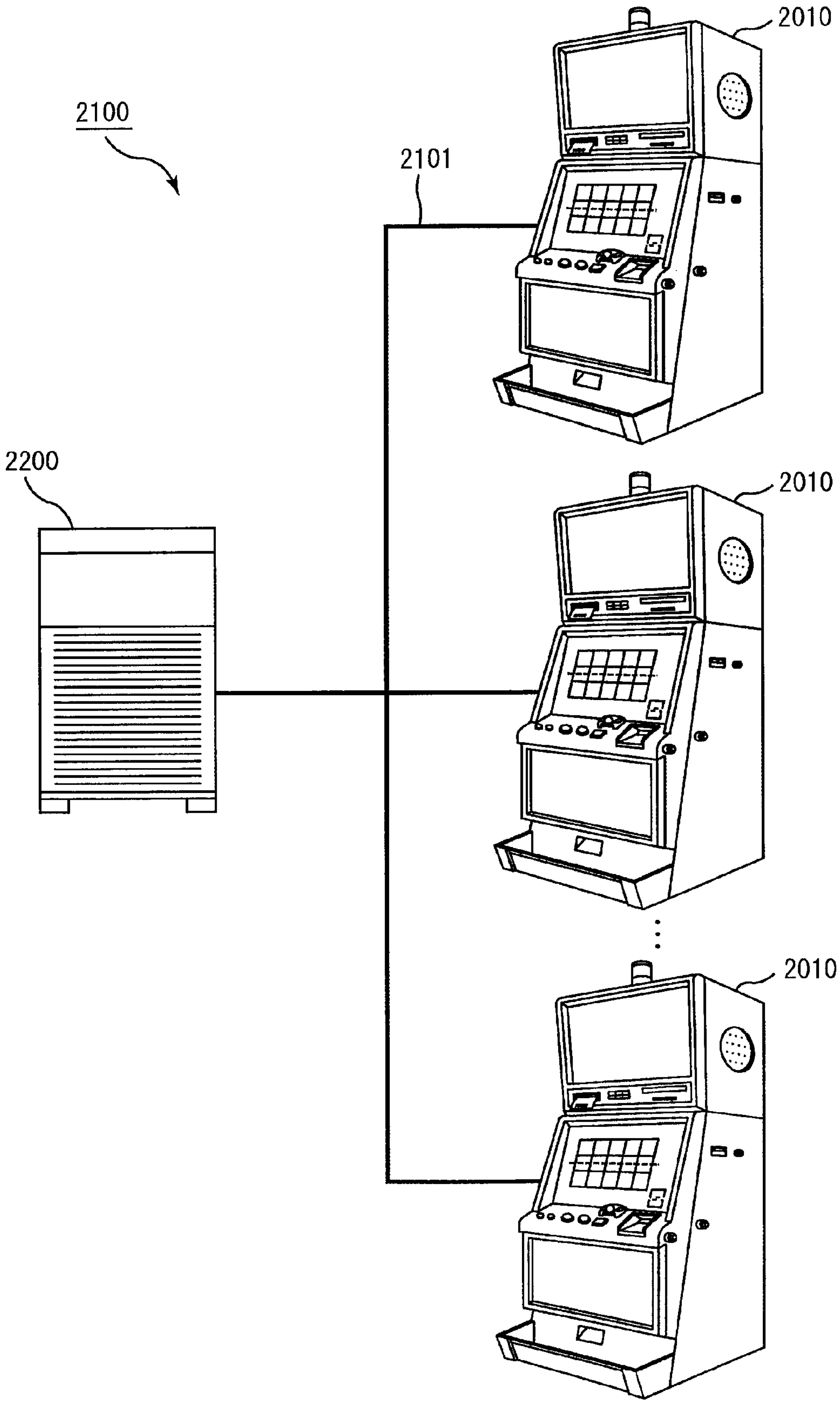
FIG. 42 is a diagrammatic view illustrating an entire configuration of a gaming system according to the thirteenth embodiment of the present invention.

FIG. 42 is a diagrammatic view illustrating an entire configuration of the gaming system according to the thirteenth embodiment of the present invention.

The gaming system 2100 is provided with a plurality of the slot machines 2010 and the server 2200 connected with these slot machines 2010 via the predetermined communication line 2101. The gaming system 2100 of this kind may either be structured in a single recreation facility that can offer various types of games, such as a bar and a casino, or structured among a plurality of recreation facilities. Also, in the case where the gaming system 2100 is structured in a single recreation facility, the gaming system 2100 may be structured on each floor or in each section in this recreation facility. There is no particular limitation on the communication line 2101, and the communication line 2101 may be of a wired type or a wireless type and may be a dedicated line, switched line and the like.

The server 2200 corresponds to the control device in the present invention.

Next, a configuration of the slot machine 2010 according to the present embodiment is described.

Figure 43:
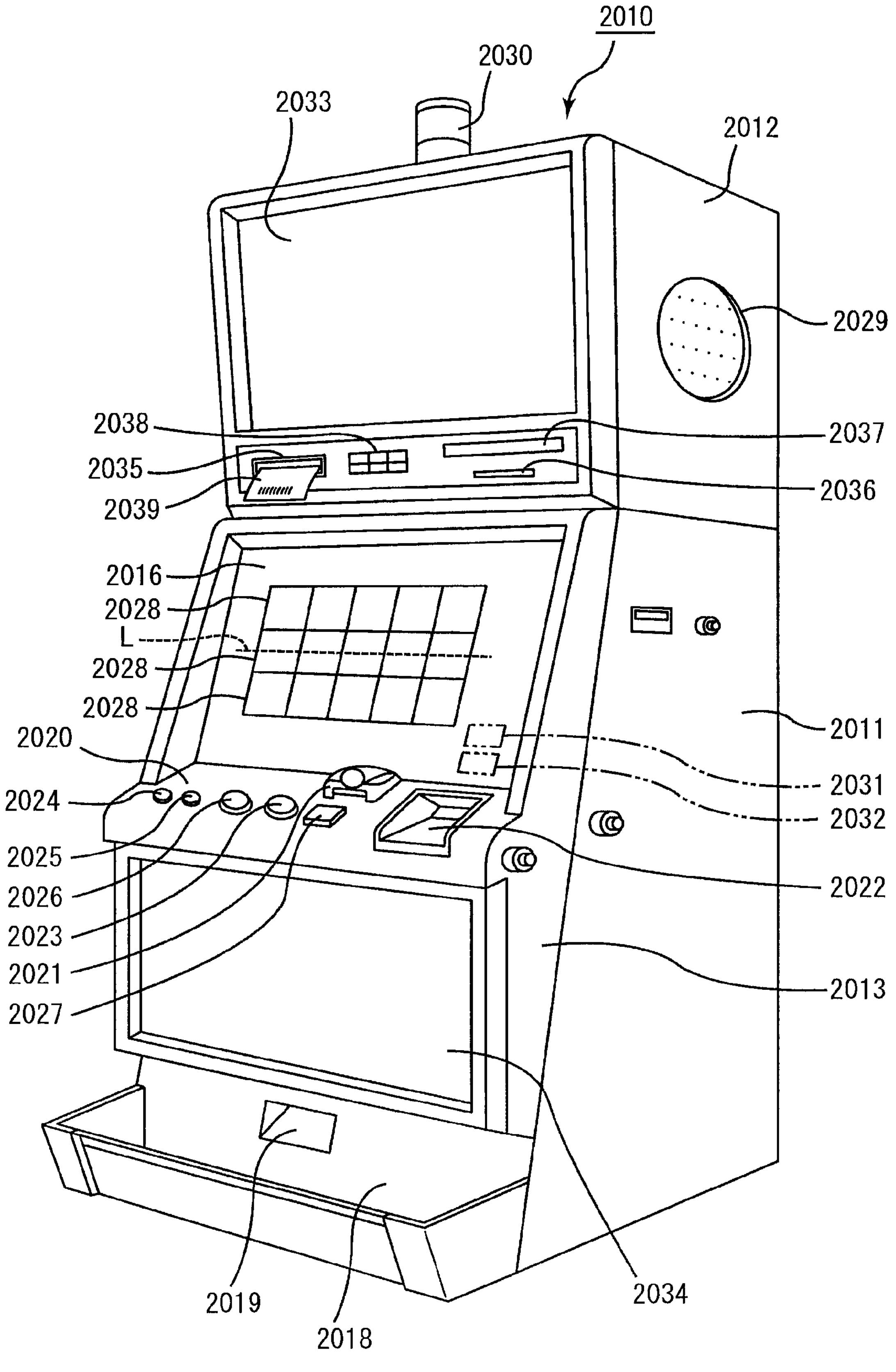
FIG. 43 is a perspective view illustrating an external view of a slot machine according to the thirteenth embodiment of the present invention.

FIG. 43 is a perspective view illustrating an external view of a slot machine according to the thirteenth embodiment of the present invention.

In the slot machine 2010, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

The slot machine 2010 comprises a cabinet 2011, a top box 2012 installed on the upper side of the cabinet 2011, and a main door 2013 provided at the front face of the cabinet 2011.

On the main door 2013, there is provided a lower image display panel 2016. The lower image display panel 2016 is provided with a variety of information, an effect image and the like relating to the game is displayed thereto during the game. The lower image display panel includes the transparent liquid crystal panel which displays fifteen display blocks 2028 along five columns and three rows. A symbol is displayed in each display block 2028. Namely, three symbols are displayed to each symbol column. Further, a winning line L is formed on the lower image display panel 2016 horizontally across the five display blocks 2028 displayed in the center row. The winning line L defines a combination of the symbols. In the case that the combination of the symbols rearranged on the winning line L is a predetermined combination, the payout corresponding to the combination and a number of inserted coins (number of bets) is paid out.

Further, a number-of-credits display portion 2031 and a number-of-payouts display portion 2032 are provided on the lower image display panel 2016. The number-of-credits display portion 2031 displays an image indicative of the number of credits at the moment. The number-of-payouts display portion 2032 displays an image indicative of the number of coins to be paid out.

Moreover, although not shown, a touch panel 2069 is provided at the front face of the lower image display panel 2016. A player can operate the touch panel 2069 to input a variety of commands.

Below the lower image display panel 2016, there are provided a control panel 2020 including a plurality of buttons 2023 to 2027 with each of which a command according to game progress is inputted by the player, a coin receiving slot 2021 through which a coin is accepted into the cabinet 2011, and a bill validator 2022.

The control panel 2020 is provided with a spin button 2023, a change button 2024, a CASHOUT button 2025, a 1-BET button 2026 and a maximum BET button 2027. The spin button 2023 is for inputting a command to start scrolling of symbols. The change button 2024 is used for making a request of staff in the recreation facility for exchange. The CASHOUT button 2025 is used for inputting a command to pay out credited coins to a coin tray 2018.

The 1-BET button 2026 is used for inputting a command to bet one coin on a game out of credited coins. The maximum BET button 2027 is used for inputting a command to bet the maximum number of coins that can be bet on one game (50 coins in the present embodiment) out of credited coins.

The 1-BET button 2026 and the maximum BET button 2027 correspond to the input device in the present invention.

The bill validator 2022 not only discriminates a regular bill from a false bill, but also accepts the regular bill into the cabinet 2011. It is to be noted that the bill validator 2022 may be configured so as to be capable of reading a later-described ticket 2039 with a barcode. At the lower front of the main door 2013, namely, below the control panel 2020, there is provided a belly glass 2034 on which a character or the like of the slot machine 2010 is drawn.

On the front surface of the top box 2012, there is provided an upper image display panel 2033. The upper image display panel 2033 includes a liquid crystal panel, which displays, for example, images indicative of introductions of the contents of games and explanations about the rules of games.

Further, a speaker 2029 is provided in the top box 2012. Under the upper image display panel 2033, there are provided a ticket printer 2035, a card reader 2036, a data display 2037, and a key pad 2038. The ticket printer 2035 prints on a ticket a barcode as coded data of the number of credits, a date, an identification number of the slot machines 2010, and the like, and outputs the ticket as the ticket 2039 with a barcode. The player can make another slot machine read the ticket 2039 with a barcode to play a game thereon, or exchange the ticket 2039 with a barcode with a bill or the like at a predetermined place in the recreation facility (e.g. a cashier in a casino).

The card reader 2036 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 2037 includes a fluorescent display and the like, and displays, for example, data read by the card reader 2036 or data inputted by the player via the key pad 2038. The key pad 2038 is used for inputting a command and data concerning issuing of a ticket, and the like.

FIG. 44 is a schematic view illustrating a column of symbols displayed to respective display blocks.

As described above, 15 display blocks 2028 along five columns and three rows are displayed to the lower image display panel 2016, and a single symbol is displayed in each display block 2028.

As illustrated in FIG. 44, in each of five symbol columns in display blocks 2028, the column of 22 symbols having code numbers of "00" to "21" in total are scrolled. Each of the columns of symbols consists of a combination of symbols of "JACKPOT 7", "BLUE 7", "BELL", "STRAWBERRY", "PLUM", "CHERRY", "ORANGE", and "APPLE".

When five symbols of "JACKPOT 7", "BLUE 7", "BELL", "STRAWBERRY", "PLUM", "CHERRY", or "ORANGE" are rearranged on the winning line L, the payout determined in advance is offered (see FIG. 52).

"APPLE" is a bonus game trigger (symbol for shifting to a bonus game). In the case that five "APPLE" are rearranged on the winning line L, the game can be shifted to the bonus game. In the present embodiment, the bonus game is a free game (game that the player can play for a predetermined times without betting the game media).

Further, rearrangement of five "JACKPOT 7" on the winning line L triggers the payout of the JP. In each slot machine 2010 forming the gaming system 2100, the slot machine 2010 performs a control so as to rearrange five "JACKPOT 7" on the winning line L, only in the case of receiving from the server 2200 the JP winning information indicating that the JP is to be generated.

When the spin button 2023 is pressed after the 1-BET button 2026 or the maximum BET button 2027 is pressed, the game is started and the symbols displayed to the respective display blocks 2028 are scroll-displayed downwards. After a predetermined time has elapsed, the symbols are rearranged. Further, a various kinds of prizes (see FIG. 52) are preliminary determined for respective combinations of the symbols. When a combination of the symbols corresponding to a prize is established on the winning line L, the payout corresponding to the prize is added to the credits owned by the player. Furthermore, in the case that the bonus game trigger is established, the bonus game is generated.

Here, in the present embodiment, there has been described the case where the symbols displayed to the display blocks 2028 are automatically rearranged after the predetermined time of scroll-display. However, in the present invention, a condition for stopping the symbols is not particularly limited. For example, a stop button may be provided in the slot machine 2010 and the symbols may be stopped when the stop button is pressed.

Figure 45:
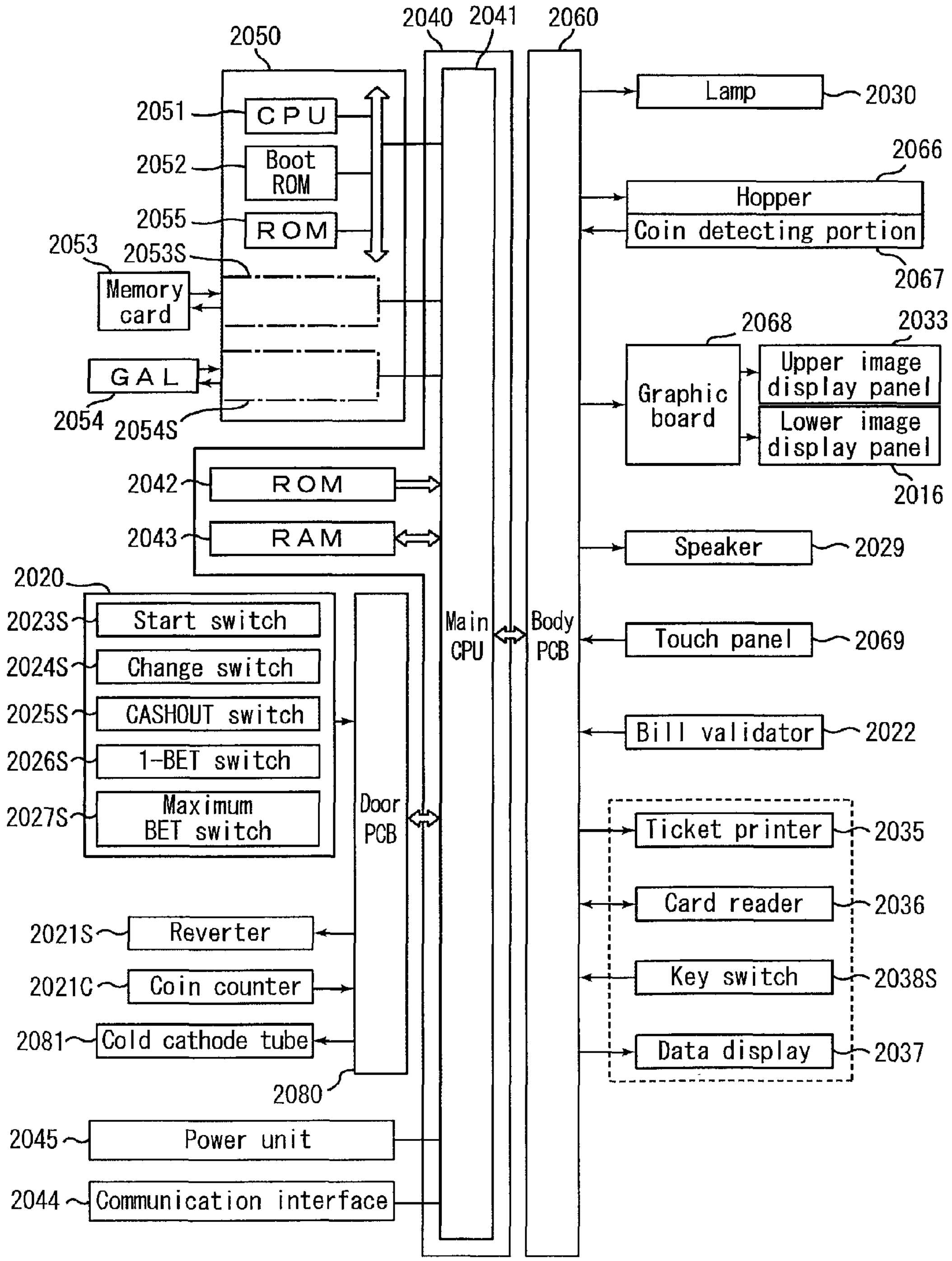
FIG. 45 is a block diagram illustrating an internal configuration of the slot machine illustrated in FIG. 43.

FIG. 45 is a block diagram showing an internal configuration of the slot machine shown in FIG. 43.

A gaming board 2050 is provided with a CPU (Central Processing Unit) 2051, a ROM 2055, and a boot ROM 2052 which are interconnected to one another by an internal bus, a card slot 2053S corresponding to a memory card 2053, and an IC socket 2054S corresponding to a GAL (Generic Array Logic) 2054.

The memory card 2053 includes a nonvolatile memory such as CompactFlash (registered trade mark), and stores a game program. The game program includes a symbol determination program. The symbol determination program is a program for determining symbols (code Nos. corresponding to the symbols) to be rearranged in the display blocks 2028.

Further, the card slot 2053S is configured so as to allow the memory card 2053 to be inserted thereinto or removed therefrom, and is connected to a mother board 2040 by an IDE bus. Therefore, the memory card 2053 can be removed from the card slot 2053S, and then another game program is written into the memory card 2053, and the memory card 2053 can be inserted into the card slot 2053S, to change the type and contents of a game played on the slot machine 2010. The game program includes a program according to progress of the game. Further, the game program includes image data and sound data to be outputted during the game.

The CPU 2051, the ROM 2055 and the boot ROM 2052 interconnected to one another by the internal bus are connected to the mother board 2040 through the PCI bus. The PCI bus not only conducts signal transmission between the mother board 2040 and the gaming board 2050, but also supplies power from the mother board 2040 to the gaming board 2050.

The mother board 2040 is configured using a commercially available general-purpose mother board (a print wiring board on which fundamental components of a personal computer are mounted), and provided with a main CPU 2041, a ROM (Read Only Memory) 2042, a RAM (Random Access Memory) 2043, and a communication interface 2044. The mother board 2040 corresponds to the controller of the present invention.

The ROM 2042 comprises a memory device such as a flash memory, and stores a program such as a BIOS (Basic Input/Output System) executed by the main CPU 2041 and permanent data. When the BIOS is executed by the main CPU 2041, processing for initializing a predetermined peripheral device is conducted, and processing for loading the game program stored in the memory card 2053 via the gaming board 2050 is started. It is to be noted that, in the present invention, the ROM 2042 may or may not be data rewritable one.

The RAM 2043 stores data and a program to be used at the time of operation of the main CPU 2041. Further, the RAM 2043 is capable of storing a game program.

Moreover, the RAM 2043 stores the number of credits, payout data, and the like.

Moreover, the mother board 2040 is connected with a later-described body PCB (Printed Circuit Board) 2060 and a door PCB 2080 through respective USBs. Further, the mother board 2040 is connected with a power supply unit 2045.

The body PCB 2060 and the door PCB 2080 are connected with an equipment and a device for generating an input signal to be inputted into the main CPU 2041 and an equipment and a device operations of which are controlled by a control signal outputted from the main CPU 2041. The main CPU 2041 executes the game program stored in the RAM 2043 based on the input signal inputted into the main CPU 2041, and thereby executes the predetermined arithmetic processing, stores the result thereof into the RAM 2043, or transmits a control signal to each equipment and device as processing for controlling each equipment and device.

The body PCB 2060 is connected with a lamp 2030, a hopper 2066, a coin detecting portion 2067, a graphic board 2068, the speaker 2029, the touch panel 2069, the bill validator 2022, the ticket printer 2035, the card reader 2036, a key switch 2038S and the data display 2037. The lamp 2030 is lighted in a predetermined pattern based on control signals outputted from the main CPU 2041.

The hopper 2066 is installed inside the cabinet 11, and pays out a predetermined number of coins based on the control signal outputted from the main CPU 2041, from a coin payout exit 2019 to the coin tray 2018. The coin detecting portion 2067 is provided inside the coin payout exit 2019, and outputs an input signal to the main CPU 2041 in the case of detecting payout of the predetermined number of coins from the coin payout exit 2019.

The graphic board 2068 controls image display to the upper image display panel 2033 and the lower image display panel 2016 based on the control signal outputted from the main CPU 2041. In each display block 2028 on the lower image display panel 2016, a background color determined by selecting a random number and the symbol, which is in a scrolling state or in a stopped state, are displayed. The number of credits stored in the RAM 2043 is displayed to the number-of-credits display portion 2031 of the lower image display panel 2016. Further, the number of coin-outs is displayed to the number-of-payouts display portion 2032 of the lower image display panel 2016.

The graphic board 2068 comprises a VDP (Video Display Processor) for generating image data based on the control signal outputted from the main CPU 2041, a video RAM for temporarily storing image data generated by the VDP, and the like. It is to be noted that image data used in generation of the image data by the VDP is included in the game program read from the memory card 2053 and stored into the RAM 2043.

The bill validator 2022 accepts the regular bill into the cabinet 2011, in addition to discriminating a regular bill from a false bill. Upon acceptance of the regular bill, the bill validator 2022 outputs an input signal to the main CPU 2041 based on a face amount of the bill. The main CPU 2041 stores in the RAM 2043 the number of credits corresponding to the face amount of the bill transmitted with the input signal.

The ticket printer 2035, based on the control signal outputted from the main CPU 2041, prints on a ticket a barcode as coded data of the number of credits stored in the RAM 2043, a date, and an identification number of the slot machine 2010, and the like, based on the control signal outputted from the main CPU 2041, and outputs the ticket as the ticket 2039 with a barcode. The card reader 2036 reads data from the smart card and transmits the read data to the main CPU 2041, and writes data onto the smart card based on the control signal from the main CPU 2041. The key switch 2038S is provided on the key pad 2038, and outputs a predetermined input signal to the main CPU 2041 when the key pad 2038 is operated by the player. The data display 2037 displays data read by the card reader 2036 and data inputted by the player via the key pad 2038, based on the control signal outputted from the main CPU 2041.

The door PCB 2080 is connected with the control panel 2020, a reverter 2021S, a coin counter 2021C, and a cold cathode tube 2081. The control panel 2020 is provided with a start switch 2023S corresponding to the spin button 2023, a change switch 2024S corresponding to the change button 2024, a CASHOUT switch 2025S corresponding to the CASHOUT button 2025, a 1-BET switch 2026S corresponding to the 1-BET button 2026, and a maximum BET switch 2027S corresponding to the maximum BET button 2027. Each of the switches 2023S to 2027S outputs an input signal to the main CPU 2041 when each of the buttons 2023 to 2027 corresponding thereto is operated by the player.

The coin counter 21C is provided inside the coin receiving slot 2021, and discriminates a regular coin from a false coin inserted into the coin receiving slot 2021 by the player. Coins other than the regular coin are discharged from the coin payout exit 2019. Further, the coin counter 2021C outputs an input signal to the main CPU 2041 in detection of the regular coin.

The reverter 20215 operates based on the control signal outputted from the main CPU 2041, and distributes a coin recognized by the coin counter 2021C as the regular coin into a cash box (not shown) or the hopper 2066, which are disposed in the slot machine 2010. Namely, when the hopper 2066 is filled with coins, the regular coin is distributed into the cash box by the reverter 2021S. On the other hand, when the hopper 2066 is not filled with coins, the regular coin is distributed into the hopper 2066. The cold cathode tube 2081 functions as a back light installed on the rear face side of the lower image display panel 2016 and the upper image display panel 2033, and lighted up based on the control signal outputted from the main CPU 2041.

FIG. 46 is a block diagram illustrating an internal configuration of a server according to the thirteenth embodiment of the present invention.

The server 2200 includes the CPU 2201, a ROM 2202, a RAM 2203, a communication interface 2204, and a hard disk drive 2205. The communication interface 2204 is connected, through the communication lines 2101, to the communication interfaces 2044 in the respective slot machines 2010. The ROM 2202 stores a system program for controlling the operation of a controller, permanent data, and the like. Further, the RAM 2203 temporarily stores data, such as data received from each slot machine 2010 and a calculation result. The hard disk drive 2205 cumulatively stores a part of the credits betted in the slot machine 2010.

The CPU 2201 corresponds to the processor in the present invention.

Next, there is described processing conducted in the slot machine 2010.

Figure 47:
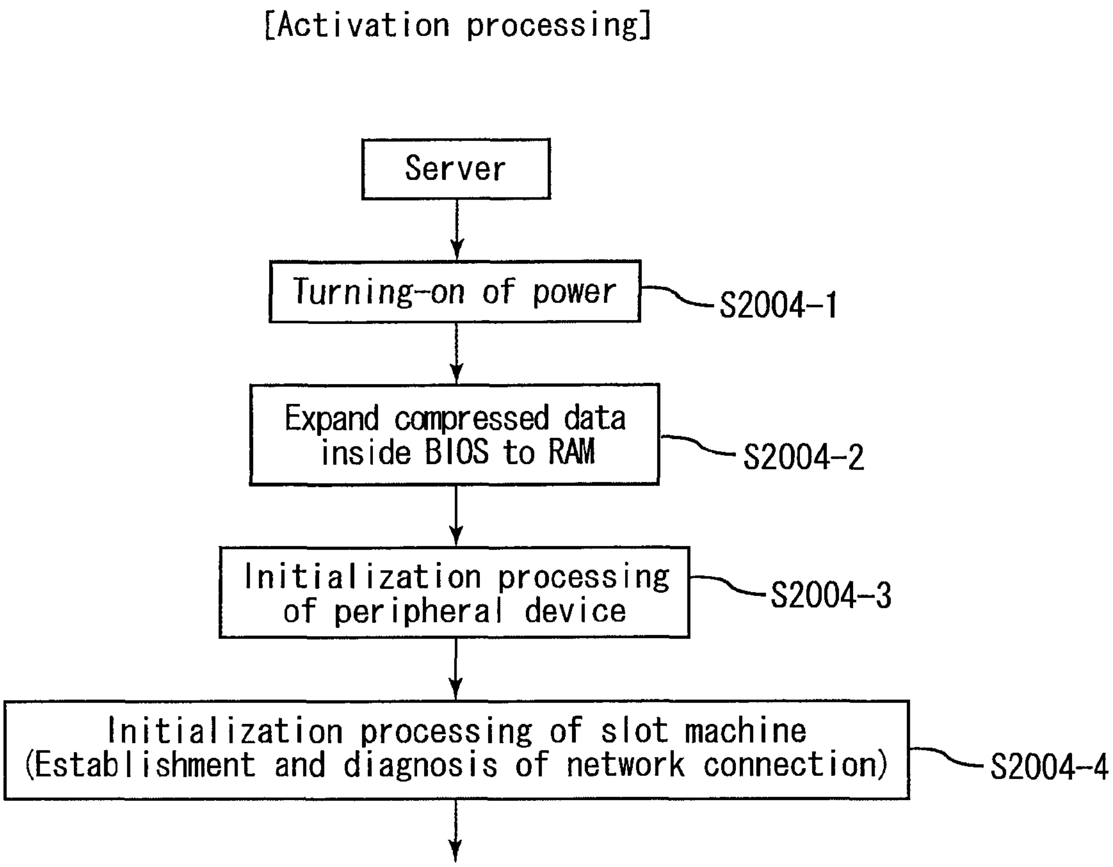
FIG. 47 is a flowchart illustrating a subroutine of activation processing executed by the server.

FIG. 47 is a flowchart illustrating a subroutine of activation processing executed by the server.

First, when the power switch is turned on (the power is turned on) in the power unit, a mother board is activated (step S2004-1).

In the mother board, the CPU 2201 executes the BIOS stored in the ROM 2202 so as to expand compressed data incorporated in the BIOS into the RAM 2203 (step S2004-2). Then, the CPU 2201 executes the BIOS expanded into the RAM 2203, and then, diagnoses and initializes various types of peripheral devices such as a display (step S2004-3).

Next, the CPU 2201 executes initialization processing of each slot machine. In this processing, the CPU 2201 establishes a network connection between the server 2200 and each slot machine 2010, and diagnoses if the network functions properly.

After the above-described processing, the CPU 2201 controls proceeding of the game executed in a plurality of the slot machines by reading and executing a game control program.

In the present embodiment, there has been described the case where the plurality of slot machines 2010 are connected with the server 2200 through the network. However, in the present invention, the slot machine may be a stand-alone type slot machine.

Figure 48:
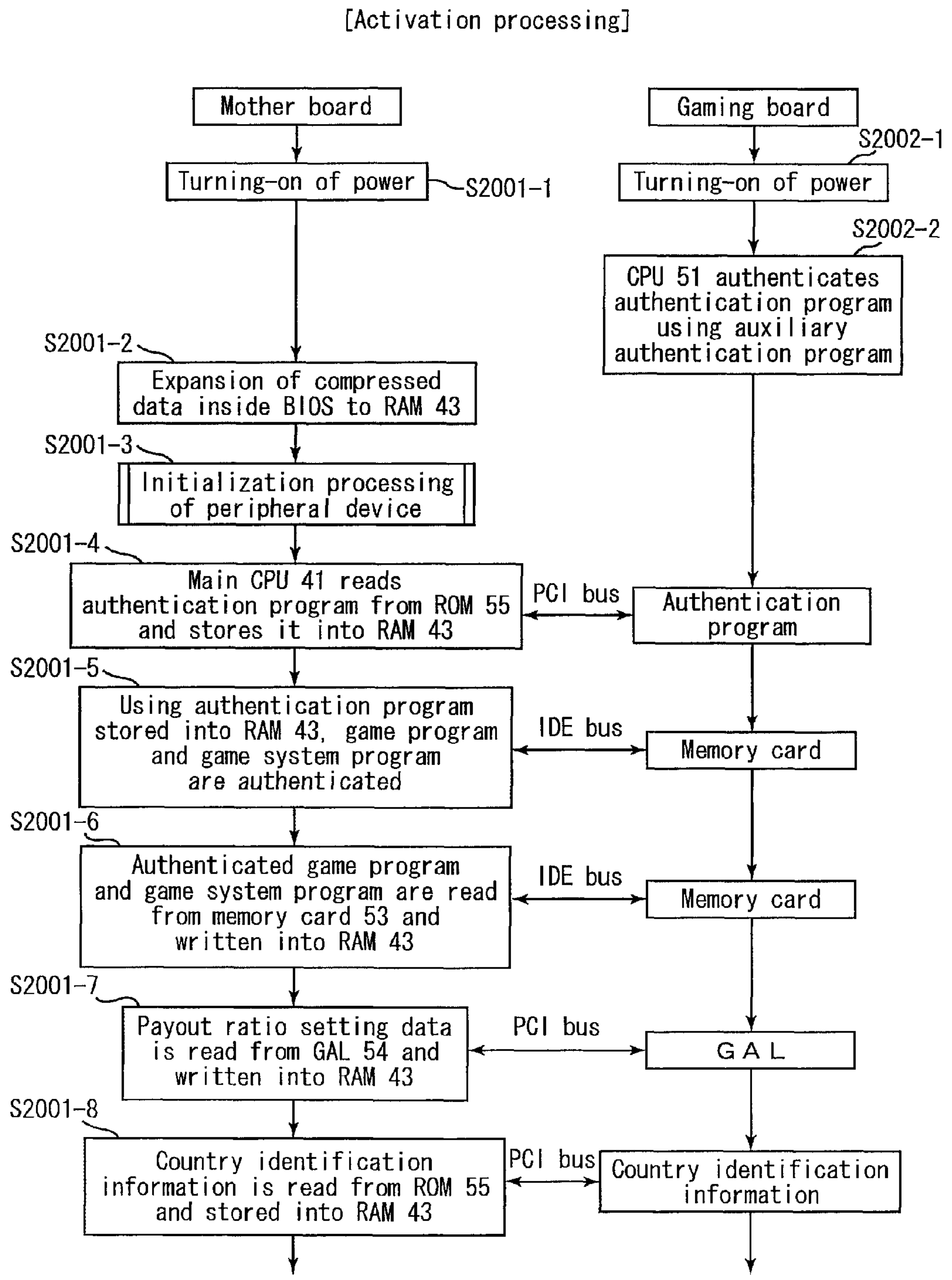
FIG. 48 is a flowchart illustrating a procedure of the activation processing by a mother board and a gaming board.

FIG. 48 is a flowchart illustrating a procedure of activation processing. This activation processing is the processing conducted by the mother board 2040 and the gaming board 50. It should be noted that the memory card 53 is inserted into the card slot 2053S in the gaming board 2050, and the GAL 2054 is mounted onto the IC socket 54S.

First, when a power switch is turned on (power is turned on) in the power supply unit 2045, the mother board 2040 and the gaming board 2050 are activated (step S2001-1, S2002-1). In activation of the mother board 2040 and the gaming board 2050, individual processing is respectively executed in parallel. Namely, in the gaming board 2050, the CPU 51 reads the auxiliary authentication program stored in the boot ROM 2052, and conducts auxiliary authentication according to the read auxiliary authentication program, to previously check and prove that the authentication program is not falsified before loading the program to the mother board 2040 (step S2002-2). Meanwhile, in the mother board 2040, the main CPU 2041 executes the BIOS stored in the ROM 2042, and expands compressed data which is incorporated in the BIOS into the RAM 2043 (step S2001-2). The main CPU 2041 then executes the BIOS expanded into the RAM 2043 to diagnose and initialize a variety of peripheral devices (step S2001-3). The processing of step S2001-3 will be specifically described later with reference to FIG. 49.

Since the ROM 2055 of the gaming board 2050 is connected to the main CPU 2041 via the PCI bus, the main CPU 2041 reads the authentication program stored in the ROM 2055, and stores the read authentication program into the RAM 2043 (step S2001-4). At this time, according to the standard BIOS function of the BIOS, the main CPU 2041 takes a checksum by ADDSUM system (normal checking system) and stores the authentication program into the RAM 2043, while conducting processing for confirming whether or not the storage is certainly conducted.

Next, after confirming what is connected to the IDE bus, the main CPU 2041 accesses, via the IDE bus, the memory card 2053 inserted in the card slot 2053S, to read a game program or a game system program from the memory card 2053. In this case, the main CPU 2041 reads data constituting the game program and the game system program by 4 bytes. Subsequently, the main CPU 2041 conducts authentication to check and prove that the read game program and game system program have not been falsified, following the authentication program stored in the RAM 2043 (step S2001-5). When this authentication processing is normally completed, the main CPU 2041 writes and stores the game program and the game system program, which have been the authentication targets (which have been authenticated), into the RAM 2043 (step S2001-6). Next, the main CPU 2041 accesses, via the PCI bus, the GAL 2054 mounted on the IC socket 2054S, reads payout ratio setting data from the GAL 2054, and writes and stores the data into the RAM 2043 (step S2001-7). Subsequently, the main CPU 2041 conducts processing for reading country identification information stored in the ROM 2055 of the gaming board 2050 via the PCI bus, and stores the read country identification information into the RAM 2043 (step S2001-8).

After conducting the above-mentioned processing, the main CPU 2041 sequentially reads and executes the game program and the game system program, thereby proceeding with the game.

Figure 49:
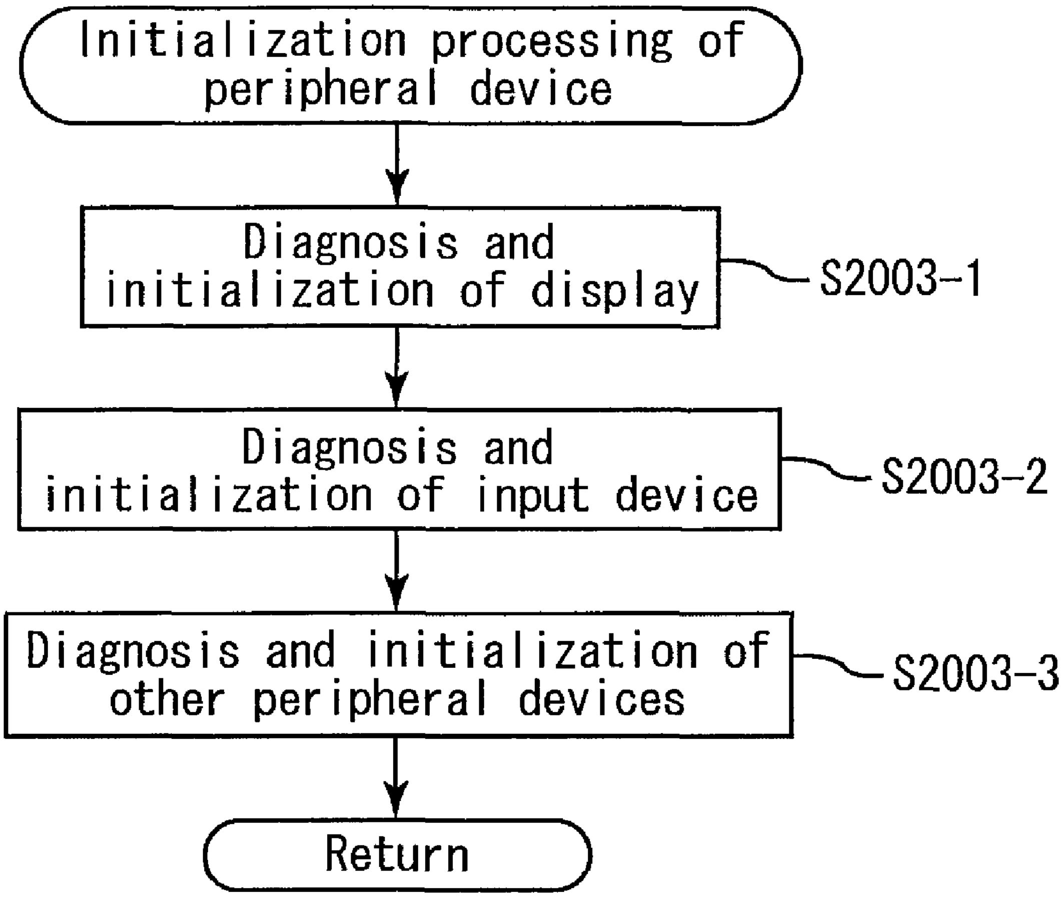
FIG. 49 is a flowchart illustrating a procedure of peripheral-device initialization processing.

FIG. 49 is a flowchart illustrating a procedure of peripheral-device initialization processing.

First, the main CPU 2041 diagnoses and initializes a display (step S2003-1). In this processing, the main CPU 2041 transmits the request signal to the graphic board 2068. Then, the main CPU 2041 determines whether or not to have received a predetermined response signal and conducts clearance of a predetermined storage area, and the like.

Next, the main CPU 2041 diagnoses and initializes various types of input devices (step S2003-2). In this processing, the main CPU 2041 transmits request signals to the input devices such as the start switch 2023S, the change switch 2024S, the CASHOUT switch 2025S, the 1-BET switch 2026S, the maximum BET switch 2027S, and the touch panel 2069, and then determines whether or not to have received predetermined response signals.

Subsequently, the main CPU 2041 diagnoses and initializes other peripheral devices connected to the main CPU 2041 (step S2003-3). Then the present subroutine is terminated.

Figure 50:
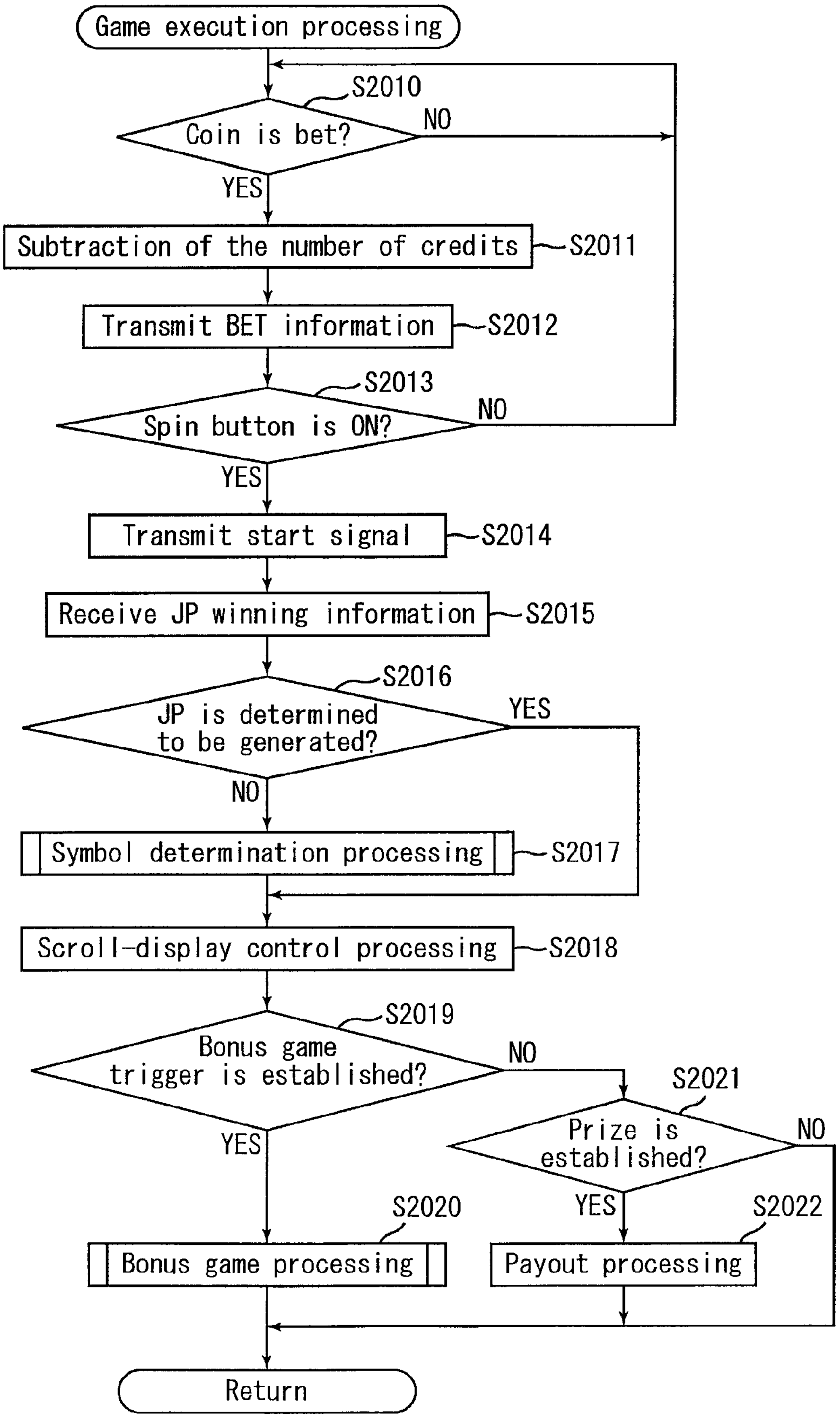
FIG. 50 is a flowchart illustrating a subroutine of game execution processing according to the thirteenth embodiment of the present invention.

FIG. 50 is a flowchart illustrating a subroutine of game execution processing according to the thirteenth embodiment of the present invention.

In the game execution processing, the main CPU 2041 first determines whether or not a coin has been betted (step S2010). In this processing, the main CPU 2041 determines whether or not to have received an input signal that is outputted from the 1-BET switch 2026S when the 1-BET button 2026 is operated, or an input signal that is outputted from the maximum BET switch 2027S when the maximum BET button 2027 is operated. When the main CPU 2041 determines that the coin has not been betted, the processing is returned to step S2010.

On the other hand, when determining that the coin has been betted in step S2010, the main CPU 2041 conducts processing for making a subtraction from the number of credits stored in the RAM 2043 according to the number of betted coins (step S2011). It is to be noted that, when the number of coins to be betted is larger than the number of credits stored in the RAM 2043, the main CPU 2041 does not conduct the processing for making a subtraction from the number of credits stored in the RAM 2043, and the processing is returned to step S2010. Further, when the number of coins to be betted exceeds the upper limit of the number of coins that can be betted in one game (50 coins in the present embodiment), the main CPU 2041 does not conduct the processing for making a subtraction from the number of credits stored in the RAM 2043, and the processing is proceeded to step 52012.

In step S2012, the main CPU 2041 transmits BET information indicative of the bet amount to the server 2200. The server 2200 cumulatively adds 50% of the number of credits indicated by the received BET information in the hard disk drive 2205.

Next, in step S2013, the main CPU 2041 determines whether or not the spin button 2023 has been turned ON. In this processing, the main CPU 2041 determines whether or not to have received an input signal that is outputted from the start switch 2023S when the spin button 2023 is pressed.

When the main CPU 2041 determines that the spin button 2023 has not been turned on, the processing is returned to step 52010. It is to be noted that, when the spin button 2023 is not turned ON (e.g. when the spin button 2023 is not turned ON and a command to end the game is inputted), the main CPU 2041 cancels a subtraction result in step S2011 and transmits a signal indicating that the information transmitted in step S2012 is to be cleared.

On the other hand, in step S2013, the main CPU 2041 shifts the processing to step S2014, when determining that the spin button 2023 has been turned ON.

Next, in step S2014, the main CPU 2041 transmits a start signal indicating that the spin button 2023 has been turned ON to the server 2200.

The server 2200 conducts the JP determination processing relating to the offering of the JP, on receiving the start signal.

Next, in step S2015, the main CPU 2041 receives JP winning information from the server 2200. The JP winning information is information indicative of the determination result about whether or not to generate the JP and the payout amount in the case of generating the JP.

In step S2016, the main CPU 2041 determines whether or not the JP winning information received in step S2015 is information indicating that the JP is to be generated.

When determining that the JP winning information is the information indicating that the JP is to be generated, the main CPU 2041 conducts setting of a control to rearrange five "JACKPOT 7" on the winning line L and shifts the processing to step S2018.

On the other hand, when determining that the JP winning information is the information indicating that the JP is not to be generated, the main CPU 2041 conducts the symbol determination processing in step S2017. In this symbol determination processing, the main CPU 2041 determines the code No. of the symbol by executing the symbol determination program stored in the RAM 2043.

Here, processing of step S2017 will be specifically described later by using FIG. 51.

Next, in step S2018, the main CPU 2041 conducts scroll-display control processing in step S2018.

In the case of generating the JP, the main CPU 2041 conducts the control to display five "JACKPOT 7" on the winning line L after starting scrolling of the symbols. Further, in the case of not generating the JP, the main CPU 2041 conducts display control so as to rearrange the symbols determined in step S2017.

In step S2019, the main CPU 2041 determines whether or not the bonus game trigger has been established, namely, whether or not five "APPLE" are rearranged on the winning line L. When determining that the bonus game trigger has been established, the main CPU 2041 reads a program for conducting the bonus game from the RAM 2043 and executes bonus game processing (step S2020) and terminates the present subroutine. The bonus game processing will be specifically described later by using FIG. 53.

When determining that the bonus game trigger has not been established in step S2019, the main CPU 2041 determines whether or not the prize has been established in step S2021. When determining that the prize has been established, the main CPU 2041 pays out coins in step S2022 based on the number of inserted coins and the rearranged symbols.

When determining that the prize has not been established in step S2021 or after executing the processing of step S2022, the main CPU 2041 completes the present subroutine.

Figure 51:
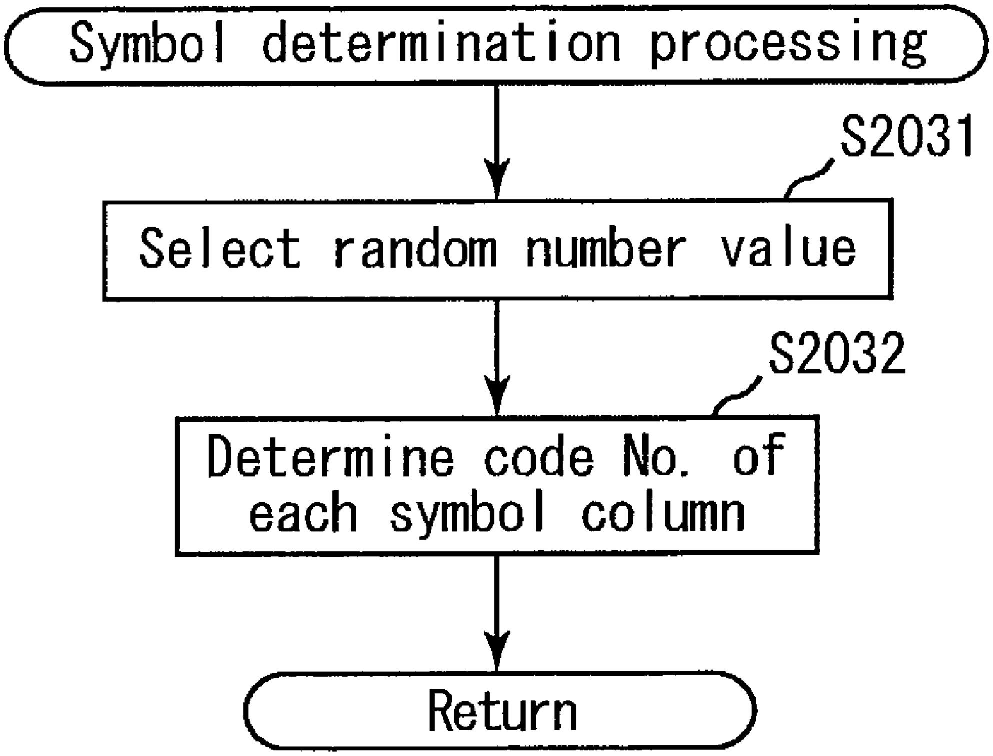
FIG. 51 is a flowchart illustrating a subroutine of the symbol determination processing.

FIG. 51 is a flowchart illustrating a subroutine of the symbol determination processing read and executed in step S2017. The processing is processing conducted by the main CPU 2041 through executing the symbol determination program stored in the RAM 2043.

At first, the main CPU 2041 selects random number values corresponding to respective symbol columns, out of the numerical range of 0 to 255, by executing a random-number generation program included in the symbol determination program (step S2031). In the present embodiment, the case of generating random numbers on a program (the case of using so-called software random numbers) is described. However, in the present invention, a random number generator may be provided, and random numbers may be extracted from the random number generator (so-called software random numbers may be used).

Next, the main CPU 2041 determines code Nos. for the respective symbol columns (see FIG. 44), on the basis of the selected five random number values (step S2032). The code Nos. for the respective symbol columns correspond to the code Nos. of symbols to be rearranged on the winning line L. The main CPU 2041 determines a prize by determining code Nos. for the respective symbol columns. For example, when the code Nos. of the symbol columns are determined to be "02", "05", "02", "01", and "02", that means the main CPU 2041 determines the prize to be "ORANGE".

However, since the present symbol determination processing is conducted when the JP is not to be generated, "JACKPOT 7" is not to be determined as the prize.

Here, the prize in the present embodiment is described.

FIG. 52 is a view illustrating a relationship between a plurality of prizes and possibilities of establishment and numbers of payouts of respective prizes.

In the case where five symbols of "APPLE" are rearranged on the winning line L and the bonus game trigger is won, the bonus game is generated. In the bonus game, the free game is executed for a predetermined number of times based on the random number value obtained through execution of the random-number generation program included in the symbol determination program.

Further, in the case where five symbols of "BLUE 7" are rearranged on the winning line L, 10 coins per bet of one credit are paid out. Similarly, five symbols of "BELL", "STRAWBERRY", "PLUM", "CHERRY", or "ORANGE" are rearranged on the winning line L, the payout corresponding to the prize of each combination is offered.

Figure 53:
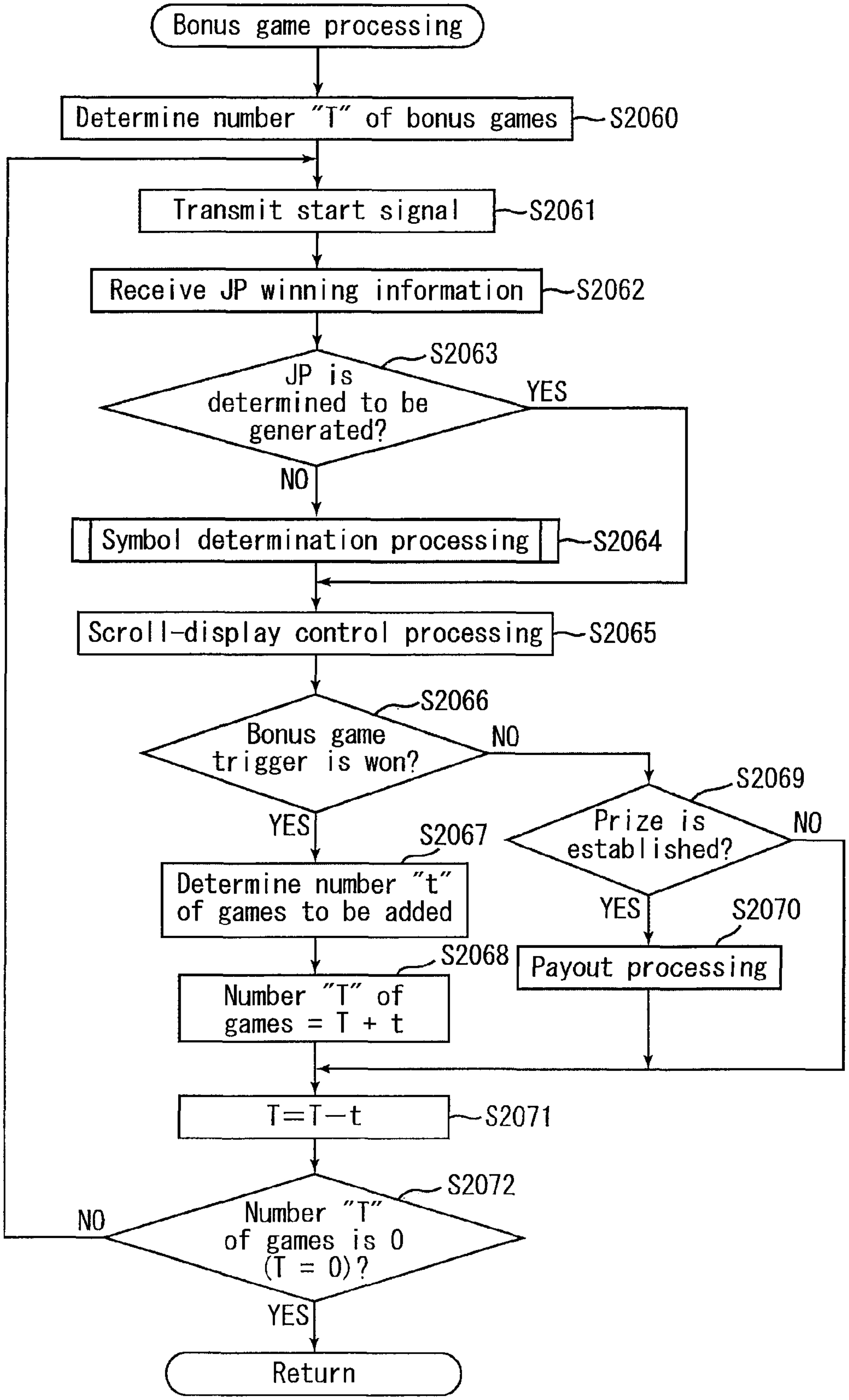
FIG. 53 is a flowchart illustrating a subroutine of bonus game processing according to the thirteenth embodiment of the present invention.

FIG. 53 is a flowchart illustrating a subroutine of bonus game processing according to the thirteenth embodiment of the present invention.

In the bonus game processing, the main CPU 2041 first determines the number of games of the bonus game out of 10 games to 25 games, based on the random number value obtained by executing the random-number generation program included in the symbol determination program stored in the RAM 2043 (step S2060). The main CPU 2041 stores the number of games of the bonus game as data in the RAM 2043.

The subsequent processing of steps S2061 to S2065 is substantially the same as the processing of steps S2014 to S2018 of the game execution processing illustrated in FIG. 50. Since the processing has been already described, the description thereof is omitted here.

Next, the main CPU 2041 determines whether or not the bonus game trigger has been established, namely, whether or not five "APPLE" are stop-displayed on the winning line L (step S2066). When determining that the bonus game trigger has been established, the main CPU 2041 determines a number "t" of repetitions of the bonus game (step S2067) and adds the determined number "t" of repetitions to a current number "T" of the bonus games (step S2068). Accordingly, in the case that the player wins the bonus game during the bonus game, the remaining number of the bonus game is increased. More specifically, in the case that the game is shifted to 20 bonus games for the first time and the player wins 17 bonus games in the $12^{th}$ play of the bonus game, 25(20−12+17) bonus games will be played thereafter.

In the case that the bonus game trigger has not been established, the main CPU 2041 determines whether or not the prize has been established (step S2069). When determining that the prize has been established, the main CPU 2041 conducts the payout of coins corresponding to the number of inserted coins and the prize (step S2070).

When executing the processing of step S2068 or step S2070, or when determining that any prize has not been established in step S2069 (when determining that the game is lost), the main CPU 2041 reads the number "T" of the bonus games stored in the RAM 2043 and subtracts 1 from the read number "T" of the bonus games. Then, the main CPU 2041 stores the number "T" of the bonus games after subtraction in the RAM 2043 again (step S2071).

Next, the main CPU 2041 determined whether or not the number "T" of the bonus games has reached the number determined in step S2060 (step S2072). More specifically, the main CPU 2041 determines whether or not the number "T" of the bonus games stored in the RAM 2043 is zero. In the case that the number "T" of the bonus games is not zero, namely, when determining that the number of the executed bonus games has not reached the number determined in step S2060, the main CPU 2041 returns the processing to step S2061 and repeats the above-described processing. On the other hand, in the case that the number "T" of the bonus games is zero, namely, when determining that the number "T" of the bonus games has reached the number determined in step S2060, the main CPU 2041 terminates the present subroutine.

According to the gaming system 2100 according to the thirteenth embodiment, the gaming system 2100 is provided with a plurality of the gaming machines 10 and the server 2200 capable of communicating with the slot machines 2010. The server 2200 cumulatively accumulates a predetermined percentage of the game media betted in each slot machine 2010 and determines whether or not to generate the jackpot for offering a payout out of the game media. Then, when determining to generate the jackpot, the server 2200 subtracts the payout value indicative of the payout to be offered for the jackpot from the cumulative accumulation value indicative of the amount of the accumulated game media.

Namely, when the jackpot is generated, the cumulative accumulation value indicative of the amount of the accumulated game media is not cleared to zero, but the accumulation of the game media is continued after the payout value corresponding to the payout to be offered for the jackpot is subtracted. Accordingly, it is possible to carry over a part of the accumulated game media until the next time the jackpot is generated, when the payout value is smaller than the cumulative accumulation value. It is therefore possible to provide a possibility of the offer of the larger amount of game media as the payout for the jackpot, compared with the case in which the cumulative accumulation value is cleared to zero every time the jackpot is generated. Consequently, it becomes possible to increase an interest in the game and an expectation for the high payout of the player.

Further, by cumulatively accumulating in the server 2200 the game media betted in the plurality of slot machines 2010, it becomes possible to make the cumulative accumulation value larger, compared with the case where the value is accumulated in each slot machine 2010.

Furthermore, according to the gaming system, the gaming system determines not only whether or not to generate the jackpot, but also the payout (payout amount) for the jackpot in each case. Accordingly, it is possible to vary the payout to be offered, thereby preventing the game from becoming monotonous.

Moreover, according to the gaming system, the gaming system subtracts the payout value from the cumulative accumulation value when the payout value for the jackpot is equal to or less than the cumulative accumulation value. It is therefore possible to prevent the offering of the payout larger than the amount of the accumulated game media for the jackpot.

As above, there has been described the case where the server 2200 determines whether or not to generate the JP. However, in the present invention, each gaming machine forming the gaming system may determine whether or not to generate the JP.

In the following, there will be described the case where each gaming machine determines whether or not to generate the JP as a fourteenth embodiment.

Fourteenth Embodiment

There is described a gaming system according to the fourteenth embodiment. It is to be noted that the constituent elements as same as those of the gaming system 2100 according to the thirteenth embodiment will be provided with the same numerals.

The fourteenth embodiment is different from the thirteenth embodiment in that each gaming machine forming the game system determines whether or not to generate the JP.

The gaming system 2100 according to the fourteenth embodiment has the external appearance, the circuit configuration and the like as same as those of the gaming system 2100 according to the thirteenth embodiment. The description thereof is therefore omitted here, and there will be described game execution processing executed in the slot machine 2010 forming the gaming system 2100 and server-side processing executed in the server 2200 in the following.

Figure 54:
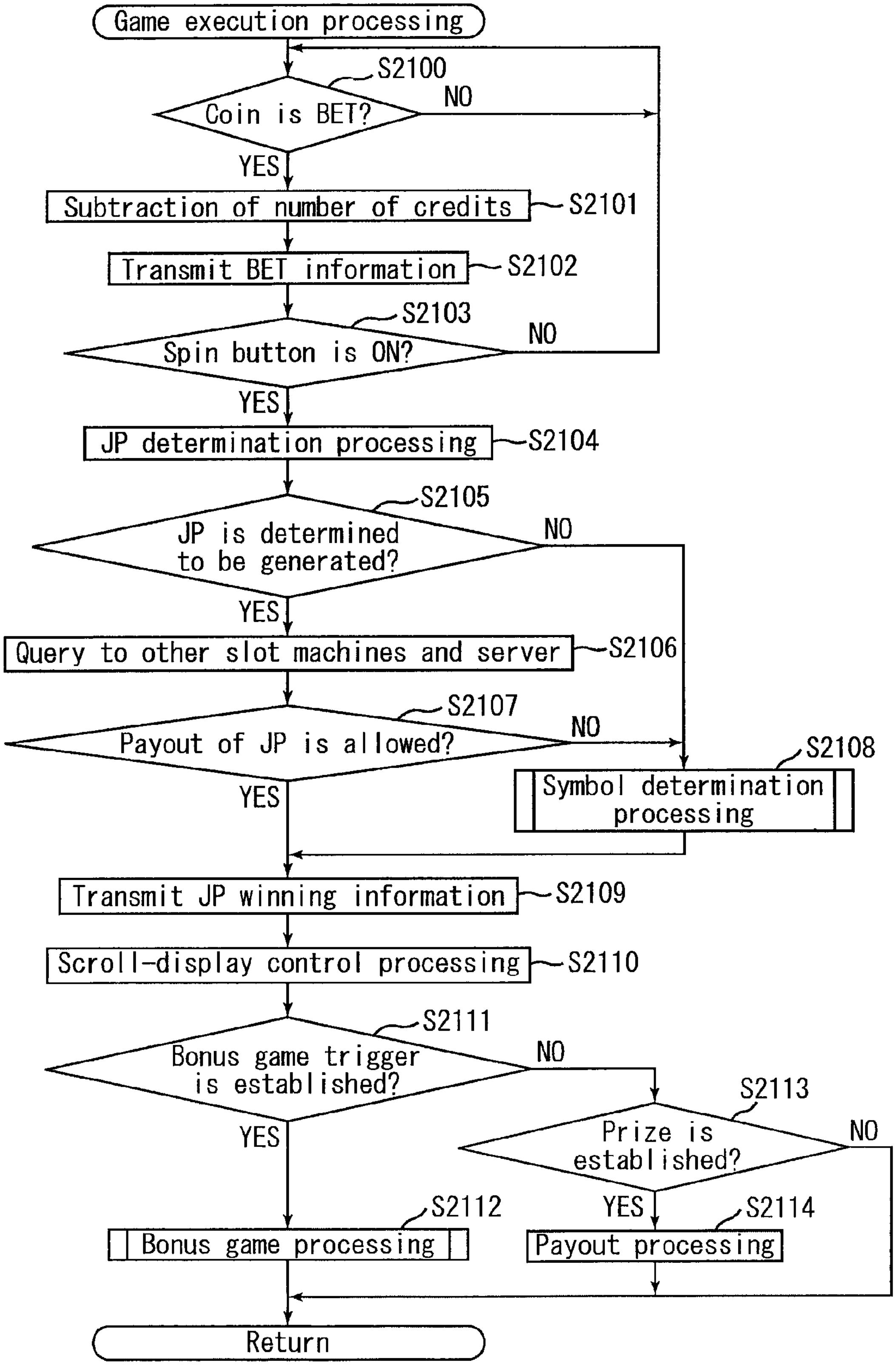
FIG. 54 is a flowchart illustrating a subroutine of game execution processing according to a fourteenth embodiment of the present invention.

FIG. 54 is a flowchart illustrating a subroutine of game execution processing according to the fourteenth embodiment of the present invention.

The processing of steps S2100 to S2103 is substantially the same as the processing of steps S2010 to S2013 in the game execution processing (see FIG. 50) according to the thirteenth embodiment. The processing has been already described, and therefore, the description thereof is omitted here.

Next, in step S2104, the main CPU 2041 conducts the JP determination processing. In the JP determination processing, the main CPU 2041 determines whether or not to generate the JP, and determines the payout amount to be paid out in the case of generating the JP.

Next, in step S2105, the main CPU 2041 determines whether or not the JP has been determined to be generated in the JP determination processing in step S2104.

When determining not to generate the JP, the main CPU 2041 shifts the processing to step S2108.

On the other hand, when determining to generate the JP, in step S2106, the main CPU 2041 transmits a signal for querying if the JP may be generated to other slot machines 2010 forming the gaming system 2100 and the server 2200.

On receiving the signal, each of other slot machines 2010 determines whether or not the JP is determined to be generated in the slot machine. Only in the case that the JP is not determined to be generated, the slot machine 2010 transmits a signal for allowing the generation of the JP to the slot machine 2010 as a transmission source of the query signal.

Further, on receiving the query signal, the server 2200 determines whether or not the payout amount of the determined JP is equal to or less than the cumulative accumulation value of the credits. Only in the case that the payout amount is equal to or less than the cumulative accumulation value, the server 2200 transmits a signal for allowing the generation of the JP to the slot machine as the transmission source of the query signal.

Next, in step S2107, the main CPU 2041 determines whether or not the generation (payout) of the JP is allowed by other slot machines 2010 and the server 2200. Namely, the main CPU 2041 determines whether or not to have received the signal for allowing the generation (payout) of the JP from other slot machines 2010 and the server 2200.

When determining in step S2107 that the generation (payout) of the JP is not allowed, the main CPU 2041 executes the symbol determination processing in step S2108. This processing is the same as the processing of step S2017 in the game execution processing (see FIG. 50) according to the thirteenth embodiment. The processing has been already described, and therefore, the description thereof is omitted here.

When determining in step S2107 that the generation (payout) of the JP is allowed, or after executing the processing of step S2108, the main CPU 2041 transmits JP winning information to the server 2200. The JP winning information is information indicative of the determination result about whether or not to generate the JP and the payout amount in the case of generating the JP.

The subsequent processing of steps S2110 to S2114 is the same as the processing of steps S2018 to S2022 in the game execution processing (see FIG. 50) according to the thirteenth embodiment. The processing has been already described and the description thereof is omitted here.

It is to be noted that, in the bonus game processing of step S2112, the same processing as the above processing of steps S2104 to S2109 is conducted, instead of the processing of steps S2061 to S2064 in the bonus game processing (see FIG. 53) according to the thirteenth embodiment.

Figure 55:
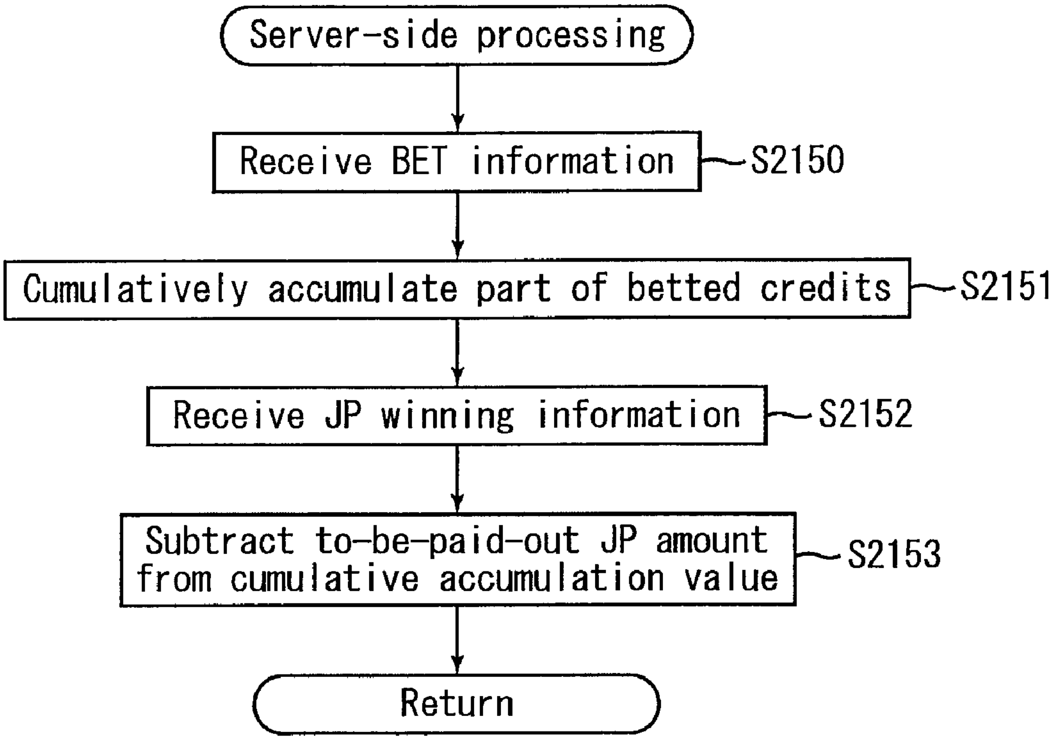
FIG. 55 is a flowchart illustrating a subroutine of server-side processing according to the fourteenth embodiment of the present invention.

FIG. 55 is a flowchart illustrating a subroutine of server-side processing according to the fourteenth embodiment of the present invention.

First, in step S2150, the CPU 2201 included in the server 2200 receives BET information indicative of a bet amount from the slot machine 2010.

Next, in step S2151, the CPU 2201 cumulatively stores 50% of the credit corresponding to the betted coin in the hard disk drive 2205. In the present embodiment, when the JP is generated, the payout is conducted out of the credits stored in the hard disk drive 2205.

Next, in step S2152, the CPU 2201 receives the JP winning information from each slot machine 2010. The JP winning information is information indicative of the determination result about whether or not to generate the JP and the payout amount in the case of generating the JP.

Next, in step S2153, the CPU 2201 subtracts the amount of JP to be paid out from the cumulative accumulation value stored in the hard disk drive 2205.

After executing the processing of step S2153, the CPU 2201 terminates the present subroutine.

As above, there has been described the gaming system 2100 according to the fourteenth embodiment.

In the thirteenth embodiment and the fourteenth embodiment, there have been described the cases where a part of the credit betted in the slot machine 2010 is cumulatively accumulated in the server 2200. However, in the present invention, the betted credit may be stored in each gaming machine. In this case, a server is not required to be provided.

Further, in the thirteenth embodiment and the fourteenth embodiment, there have been described the cases where the input device is a physical button (push-button switch) provided in the gaming machine. However, in the present invention, the input device may be, for example, a touch panel.

Furthermore, in the thirteenth embodiment and the fourteenth embodiment, there have been described the cases where the number of the slot machines generating the JP in one game among the slot machines forming the gaming system 2100 is one at most. However, in the present invention, the gaming system may be configured such that the specific winning is generated in two or more gaming machines in one game.

Moreover, in the thirteenth embodiment and the fourteenth embodiment, there have been described the cases where the gaming machine is the slot machine. However, the gaming machine in the present invention is not limited to the slot machine and may be a roulette gaming machine or a card gaming machine.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step should become apparent from the above descriptions.

What is claimed as new and desired to be secured by Letters Patent of the United States is:

1. A gaming system comprising:

a plurality of slot machines each including a symbol display capable of variably displaying symbols including a special symbol, and a controller;

a control device including a processor; and a network enabling communication between said plurality of slot machines and said control device, wherein said controller is programmed to execute the processing of (a) accepting a bet of a game medium, and (b) transmitting number-of-game-media information about the number of game media betted as the bet accepted in said processing (a), to said control device, said processor is programmed to execute the processing of (A) cumulatively counting a part of the number of betted game media, as a cumulative value, based on said number-of-game-media information received from a slot machine, and (B) transmitting cumulative-value information based on said cumulative value, to said plurality of slot machines, and said controller is programmed to execute the processing of (c) determining the number of special symbols that can be displayed to said symbol display, based on said cumulative-value information received from said control device, and (d) variably displaying and thereafter stop-displaying, to said symbol display, said symbols including said special symbol in number equal to or less than the number of said special symbols determined in said processing (c).

2. A gaming system comprising:

a plurality of slot machines each including a symbol display capable of variably displaying symbols including a special symbol, and a controller;

a control device including a processor; and a network enabling communication between said plurality of slot machines and said control device, wherein said controller is programmed to execute the processing of (a) accepting a bet of a game medium, and (b) transmitting number-of-game-media information about the number of game media betted as the bet accepted in said processing (a), to said control device, said processor is programmed to execute the processing of (A) cumulatively counting a part of the number of betted game media, as a cumulative value, based on said number-of-game-media information received from a slot machine, (B) determining the number of special symbols that can be displayed to said symbol display, based on said cumulative value, and (C) transmitting number-of-special-symbols information indicative of the number of said special symbols determined in said processing (B), to said plurality of slot machines, and said controller is programmed to execute the processing of (c) variably displaying and thereafter stop-displaying, to said symbol display, said symbols including said special symbol in number equal to or less than the number of said special symbols indicated by said number-of-special-symbols information received from said control device.

3. The gaming system according to claim 1, wherein said processor is further programmed to execute the processing of (C) determining whether or not said cumulative value has reached a predetermined value set in advance, and said processing (B) is the processing of transmitting said cumulative-value information based on said cumulative value, to said plurality of slot machines, when determined in said processing (C) that said cumulative value has reached said predetermined value.

4. The gaming system according to claim 1, wherein said processing (c) is the processing of (c') increasing the number of said special symbols that can be displayed to said symbol display, based on said cumulative-value information received from said control device, and said processing (d) is the processing of variably displaying and thereafter stop-displaying, to said symbol display, said symbols including said special symbol in number equal to or less than the number of said special symbols increased in said processing (c').

5. The gaming system according to claim 3, wherein a plurality of said predetermined values exist.

6. The gaming system according to claim 4, wherein said processor is further programmed to execute the processing of (C') determining whether or not said cumulative value has reached a predetermined value set in advance, and said processing (B) is the processing of transmitting said cumulative-value information based on said cumulative value, to said plurality of slot machines, when determined in said processing (C') that said cumulative value has reached said predetermined value.

7. The gaming system according to claim 6, wherein a plurality of said predetermined values exist.

8. The gaming system according to claim 2, wherein said processor is further programmed to execute the processing of (D) determining whether or not said cumulative value has reached a predetermined value set in advance, and said processing (B) is the processing of determining the number of said special symbols that can be displayed to said symbol display, based on said cumulative value, when determined in said processing (D) that said cumulative value has reached said predetermined value.

9. The gaming system according to claim 2, wherein said processing (B) is the processing of (B') increasing the number of said special symbols that can be displayed to said symbol display, based on said cumulative value, and said processing (C) is the processing of transmitting number-of-special-symbols information indicative of the number of said special symbols increased in said processing (B'), to said plurality of slot machines.

10. The gaming system according to claim 8, wherein a plurality of said predetermined values exist.

11. The gaming system according to claim 9, wherein said processor is further programmed to execute the processing of (D') determining whether or not said cumulative value has reached a predetermined value set in advance, and said processing (B') is the processing of increasing the number of said special symbols that can be displayed to said symbol display, based on said cumulative value, when determined in said processing (D') that said cumulative value has reached said predetermined value.

12. The gaming system according to claim 11, wherein a plurality of said predetermined values exist.

* * * * *